US007706036B2

United States Patent
Yoshida et al.

(10) Patent No.: US 7,706,036 B2
(45) Date of Patent: Apr. 27, 2010

(54) COLOR CONVERSION PROGRAM, APPARATUS, AND METHOD ENABLING HIGH PRECISION COLOR CONVERSION

(75) Inventors: Seishin Yoshida, Nagano-ken (JP); Yukimitsu Fujimori, Nagano-ken (JP); Toshiaki Kakutani, Nagano-ken (JP); Koichi Yoshizawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1109 days.

(21) Appl. No.: 10/495,618

(22) PCT Filed: Nov. 12, 2002

(86) PCT No.: PCT/JP02/11756

§ 371 (c)(1),
(2), (4) Date: Apr. 19, 2005

(87) PCT Pub. No.: WO03/043306

PCT Pub. Date: May 22, 2003

(65) Prior Publication Data
US 2005/0174586 A1    Aug. 11, 2005

(30) Foreign Application Priority Data

Nov. 13, 2001  (JP)  ............................. 2001-347665
Jan. 10, 2002  (JP)  ............................. 2002-003231

(51) Int. Cl.
*G03F 3/08*  (2006.01)
*G06K 9/00*  (2006.01)
*G06K 1/00*  (2006.01)

(52) U.S. Cl. ........................ 358/521; 358/1.9; 358/518; 382/167

(58) Field of Classification Search .................. 358/1.9, 358/518, 521; 382/167
See application file for complete search history.

(56) References Cited

U.S. PATENT DOCUMENTS 5,412,491 A    5/1995    Bachar (Continued)

FOREIGN PATENT DOCUMENTS

EP    1 014 685    6/2000

(Continued)

OTHER PUBLICATIONS

Abstract of Japanese Patent Publication No. 03-276965, Pub. Date: Dec. 9, 1991, Patent Abstracts of Japan.

(Continued)

*Primary Examiner*—Twyler L Haskins
*Assistant Examiner*—Fred Guillermety
(74) *Attorney, Agent, or Firm*—Martine Penilla & Gencarella, LLP

(57) ABSTRACT

A one-dimensional LUT has been incapable of color matching. A three-dimensional LUT has been incapable of ensuring a color conversion accuracy enough to reproduce fine changes in color tone on a monochrome image. It has been impossible to suppress a storage capacity for a color conversion table by ensuring the accuracy.

There is provided a color conversion table which has a plurality of pieces of reference color image data making correspondence between color data for a first image device and color data for a second image device and comprises a specified total information amount. The color conversion table is used to distribute the reference color image data over a prescribed area in a specified color space. Color data information for each reference color image data is increased more than a specified amount within a limit of the specified total information amount. Further, a color conversion table is created using an original table which highly accurately defines colors in part of the color conversion table. If these color conversion tables are referenced for color conversion, it is possible to suppress the storage capacity, provide color matching, and perform high accuracy color conversion.

14 Claims, 45 Drawing Sheets

U.S. PATENT DOCUMENTS

| | | | |
|---|---|---|---|
| 5,483,360 A | | 1/1996 | Rolleston et al. |
| 5,930,388 A | | 7/1999 | Murakami et al. |
| 6,625,324 B1 * | | 9/2003 | Tsai ............................ 382/254 |
| 6,831,756 B1 * | | 12/2004 | Ushiroda .................... 358/1.9 |

FOREIGN PATENT DOCUMENTS

| | | |
|---|---|---|
| JP | 03-276965 | 12/1991 |
| JP | 05-048884 | 2/1993 |
| JP | 05-091307 | 4/1993 |
| JP | 08-056292 | 2/1996 |
| JP | 08-116456 | 5/1996 |
| JP | 10-145626 | 5/1998 |
| JP | 10-191090 | 7/1998 |
| JP | 10-200772 | 7/1998 |
| JP | 10-200776 | 7/1998 |
| JP | 10-276337 | 10/1998 |
| JP | 11-017963 | 1/1999 |
| JP | 11-205620 | 7/1999 |
| JP | 2000-261679 | 9/2000 |
| JP | 2001-036754 | 2/2001 |
| JP | 2001-144974 | 5/2001 |

OTHER PUBLICATIONS

Abstract of Japanese Patent Publication No. 05-048884, Pub. Date: Feb. 26, 1993, Patent Abstracts of Japan.
Abstract of Japanese Patent Publication No. 05-091307, Pub. Date: Apr. 9, 1993, Patent Abstracts of Japan.
Abstract of Japanese Patent Publication No. 08-056292, Pub. Date: Feb. 27, 1996, Patent Abstracts of Japan.
Abstract of Japanese Patent Publication No. 08-116456, Pub. Date: May 7, 1996, Patent Abstracts of Japan.
Abstract of Japanese Patent Publication No. 10-145626, Pub. Date: May 29, 1998, Patent Abstracts of Japan.
Abstract of Japanese Patent Publication No. 10-191090, Pub. Date: Jul. 21, 1998, Patent Abstracts of Japan.
Abstract of Japanese Patent Publication No. 10-200772, Pub. Date: Jul. 31, 1998, Patent Abstracts of Japan.
Abstract of Japanese Patent Publication No. 10-200776, Pub. Date: Jul. 31, 1998, Patent Abstracts of Japan.
Abstract of Japanese Patent Publication No. 11-017963, Pub. Date: Jan. 22, 1999, Patent Abstracts of Japan.
Abstract of Japanese Patent Publication No. 11-205620, Pub. Date: Jul. 30, 1999, Patent Abstracts of Japan.
Abstract of Japanese Patent Publication No. 2001-144974, Pub. Date: May 25, 2001, Patent Abstracts of Japan.
Abstract of Japanese Patent Publication No. 2000-261679, Pub. Date: Sep. 22, 2000, Patent Abstracts of Japan.
Abstract of Japanese Patent Publication No. 10-276337, Pub. Date: Oct. 13, 1998, Patent Abstracts of Japan.
Abstract of Japanese Patent Publication No. 2001-036754, Pub. Date: Feb. 9, 2001, Patent Abstracts of Japan.

* cited by examiner

FIG. 4

| LUT15b | | | | C | M | Y | K | lc | lm |
|---|---|---|---|---|---|---|---|---|---|
| sR | G | B | | | | | | | |
| 0 | 0 | 0 | | 0 | 0 | 0 | 255 | 0 | 0 |
| 0 | 0 | 16 | | 3 | 3 | 0 | 250 | 0 | 0 |
| 0 | 0 | 32 | | 4 | 6 | 0 | 245 | 0 | 0 |
| ... | ... | ... | | ... | ... | ... | ... | ... | ... |
| 255 | 0 | 0 | | 0 | 0 | 0 | 0 | 252 | 255 |
| 0 | 16 | 16 | | 3 | 3 | 3 | 250 | 0 | 0 |
| 0 | 16 | 16 | | 3 | 3 | 3 | 240 | 0 | 0 |
| 16 | 16 | 16 | | 4 | 6 | 3 | 230 | 0 | 0 |
| ... | ... | ... | | ... | ... | ... | ... | ... | ... |
| 255 | 255 | 255 | | 255 | 0 | 0 | 0 | 0 | 0 |
| 255 | 255 | 255 | | 240 | 0 | 0 | 0 | 0 | 0 |
| 255 | 255 | 255 | | 230 | 0 | 0 | 0 | 0 | 0 |
| ... | ... | ... | | ... | ... | ... | ... | ... | ... |
| 255 | 255 | 255 | | 0 | 0 | 0 | 0 | 0 | 0 |

$17^3$ points; 0~255; 0~255

FIG. 6

LUT15c

| sR | G | B | C | M | Y | K | lc | lm |
|---|---|---|---|---|---|---|---|---|
| 0 | 0 | 0 | 0 | 0 | 0 | 1023 | 0 | 0 |
| 0 | 0 | 16 | 12 | 12 | 0 | 1000 | 0 | 0 |
| 0 | 0 | 32 | 16 | 24 | 0 | 980 | 0 | 0 |
| 0 | 16 | 0 | 12 | 0 | 15 | 1000 | 0 | 0 |
| 0 | 16 | 16 | 18 | 12 | 15 | 980 | 0 | 0 |
| 64 | 96 | 96 | 400 | 240 | 640 | 0 | 400 | 480 |
| 80 | 96 | 96 | 360 | 240 | 620 | 0 | 400 | 480 |
| 96 | 96 | 96 | 240 | 240 | 620 | 0 | 440 | 480 |
| 112 | 96 | 96 | 180 | 220 | 620 | 0 | 400 | 480 |
| 128 | 96 | 96 | 120 | 220 | 600 | 0 | 360 | 480 |
| 255 | 255 | 255 | 0 | 0 | 0 | 0 | 0 | 0 |

{ 0~255 (sR, G, B) }
{ 0~1023 (C, M, Y, K, lc, lm) }
13³ points

COLOR CONVERSION PROGRAM, APPARATUS, AND METHOD ENABLING HIGH PRECISION COLOR CONVERSION

TECHNICAL FIELD

The present invention relates to a medium recording a color conversion program, a medium recording color conversion table data, a color conversion apparatus, a color conversion method, a color conversion program, a color conversion table, a medium recording a color conversion table creation program, a medium recording a interpolation program, a color conversion table creation program, an interpolation program, a color conversion table creation apparatus, an interpolation apparatus, a color conversion table creation method, an interpolation method, a partial color conversion table, a printing apparatus, and a printing method.

BACKGROUND ART

A process of printing a monochrome image references a one-dimensional LUT (lookup table) or a three-dimensional LUT to convert RGB data (R: red, G: green, B: blue) on a display into CMYKlclm data (C: cyan, M: magenta, Y: yellow, K: black, lc: light cyan, lm: light magenta) and the like used on a printer. The one-dimensional LUT maintains correspondence between gradation value data of the monochrome image as 256 gradations of brightness components and gradation values of CMYKlclm ink. The three-dimensional LUT is similar to an LUT used for the color conversion of ordinary color images. The three-dimensional LUT evenly divides an sRGB to form cubic lattices and maintains correspondence between RGB data and CMYKlclm data at a given lattice point.

DISCLOSURE OF THE INVENTION

The above-mentioned conventional color conversion program has the following problems.

That is to say, the one-dimensional LUT is incapable of color matching. The three-dimensional LUT may not be able to ensure the sufficient color conversion accuracy to reproduce fine color tone changes in a monochrome image. Specifically, monochrome images include not only strictly achromatic images, but also images having low-saturation colors provided with various color tones such as warm or cool tones. The one-dimensional LUT is capable of printing various color tones by previously creating LUTs for a warm tone and the like. However, the LUT itself contains data comprising only brightness components, not RGB color components. Accordingly, there is no color matching between the monochrome image displayed on a display and the color as a print result. There has been a need for repeating trial and error for the purpose of printing user-specified colors.

On the other hand, the three-dimensional LUT itself contains data of RGB components. When a monochrome image, i.e., having the warm tone, is displayed on the display for printing, the printing is available in a color approximate to the color of the displayed monochrome image. However, the conventional LUT defines CMYKlclm gradation values as 256-gradation data. There have been cases where the use of these gradation values cannot reproduce fine changes in color tones of monochrome images. Simply increasing the number of gradations for CMYKlclm data unnecessarily increases the capacity for storing the LUT.

Generally, there is a need for improving the accuracy of color conversion along with the recent trend of improving the printer performance and increasing the amount of information about image colors. However, just increasing the amount of information about the color conversion table unnecessarily increases the storage capacity of hard disks and the like for storing data. There is a little need for high color conversion accuracy for all colors in an image. Just increasing the accuracy for specific colors can greatly improve the image quality. For this reason, it is unpreferable to uniformly increase the amount of information about the color conversion table stored on hard disks and the like.

The present invention has been made in consideration of the foregoing. It is therefore an object of the present invention to provide a medium recording a color conversion program, a medium recording color conversion table data, a color conversion apparatus, a color conversion method, a color conversion program, a color conversion table, a medium recording a color conversion table creation program, a medium recording a interpolation program, a color conversion table creation program, an interpolation program, a color conversion table creation apparatus, an interpolation apparatus, a color conversion table creation method, an interpolation method, a partial color conversion table, a printing apparatus, and a printing method capable of increasing color matching capability and the number of gradations and suppressing the necessary storage capacity at the same time and performing color conversion at a high precision.

In order to achieve the above-mentioned objects, in one embodiment the present invention is configured to provide a medium recording a color conversion program which allows a computer to perform a color conversion function for the purpose of converting first color image data used for a first image device into second color image data used for a second image device in such a manner as to previously store reference color image data as a color conversion table defining correspondence between both color image data in a specified storage area and to perform color conversion by referencing the color conversion table, wherein the color conversion function exclusively uses a prescribed area in a color space for making correspondence between the first color image data and the second color image data and performs color conversion by referencing a color conversion table which improves accuracy of the correspondence within the area.

In the present invention configured as mentioned above, a specified storage area previously stores the color conversion table which defines correspondence between first color image data used for the first image device and second color image data used for the second image device. The color conversion function references the color conversion table to perform color conversion. Here, the a color conversion table exclusively uses a prescribed area in a color space for making correspondence between the first color image data and the second color image data to improve accuracy of the correspondence within the area.

That is to say, it is unnecessary to use all color areas for the first image device and the second image device so as to perform color conversion for an image with limited available colors. Accordingly, even if the color conversion table exclusively uses the area capable of color conversion for that image's colors as an area in the color space for making correspondence between the first color image data and the second color image data, the color conversion is available for colors within the area. The storage area saved by the limitation is distributed to areas for specifying colors. In this manner, it is possible to more highly accurately define color image data in the area. Accordingly, the color conversion accuracy improves. Though the area is limited to a prescribed area in the color space, the color correspondence is defined three-dimensionally. In this manner, it is possible to directly ensure the color correspondence between the first and second image devices with respect to colors within the limited area. The color conversion is available by keeping color matching active without the need for a process of converting three-color components into brightness components.

In another embodiment, the present invention is configured to provide a medium recording a color conversion program which has a plurality of pieces of reference color image data and allows a computer to perform a color conversion function of referencing a color conversion table comprising a specified total information amount to convert first color image data used for a first image device into second color image data used for a second image device, wherein the color conversion function distributes the reference color image data over a prescribed area in a specified color space and performs color conversion by referencing a color conversion table which increases color data information about each reference color image data over a specified amount within a limit of the specified total information amount.

In the present invention configured as mentioned above, the color conversion function references the color conversion table having a plurality of pieces of reference color image data maintaining correspondence between color data for the first image device and color data for the second image device and converts the first color image data used for the first image device into the second color image data used for the second image device. Here, there is a limitation on the total information amount in the color conversion table. However, the color conversion table distributes the reference color image data over the prescribed area in the specified color space. In this manner, the color data information about each reference color image data is increased over a specified amount within the limit of the specified total information amount.

Though the reference color image data distributes over the prescribed area in the color space, the data information amount exceeds the specified amount with respect to colors in the area. Consequently, the high accuracy color conversion is available for colors in the prescribed area. Though the color data information amount for reference color image data is increased, there is a limitation on the distribution area for the reference color image data. Accordingly, the color conversion table can be defined without increasing the storage capacity needed for storing the color conversion table over the limitation on the total information amount. Also in this case, the correspondence is defined by the reference color image data in the three-dimensional space. In this manner, it is possible to directly ensure the color correspondence between the first and second image devices with respect to colors within the prescribed area in the color space. The color conversion is available by keeping color matching active without the need for a process of converting three-color components into brightness components.

The limitation on the total information amount in the color conversion table depends on relative relationship among various factors. There is not an absolute limitation to be assumed for all cases. That is to say, it may be preferable to use a conventional three-dimensional LUT as a reference and use the storage capacity for storing the LUT as a limitation. When a specific RAM area is available, the capacity of the available area may be used as a limitation. When the color conversion program according to the present invention is executed on a printer and the like in a standalone manner, it may be preferable to use the capacity of an available ROM area provided for the printer as a limitation.

Various known techniques can be used for referencing the reference color image data for color conversion. For example, an interpolation operation and the like can be used to compute color image data at any point from the reference color image data. The color conversion table may maintain one-to-one correspondence between color image data for the first image device and color image data for the second image device. The color conversion table may maintain correspondence between both via the color conversion into the absolute color space.

The color conversion table can use various color spaces. When the table defines one-to-one correspondence between a color area for the first image device and a color area for the second image device, it is possible to employ color areas used for these devices, e.g., an RGB color specification space and CMY-based color specification spaces such as CMY, CMYK, CMYKlclm, CMYKlclmDY (dark yellow), and the like. When the table defines the correspondence via the color conversion into the absolute color space, it may be preferable to maintain correspondence among the Lab color specification space, the RGB color specification space, and the CMY-based color specification spaces. Further, there is no limitation on the first and second image devices. These devices may process specified images using color image data. For example, various image devices are available such as a display, a printer, a scanner, a digital camera, and the like. The first and second image devices need not be provided independently. For example, a fax machine can be considered to be a combination of a scanner as the first image device and a printer as the second image device. The present invention can be applied to such fax machine.

In one embodiment of the present invention, the prescribed area in a color space is a specified monochrome area including a low saturation area. That is to say, the present invention uses a low saturation area in the color space as a prescribed area. Accordingly, the monochrome area includes not only strictly achromatic areas, but also an image which appears to be monochrome for human eyes but has a certain degree of saturation. The present invention can highly accurately perform color conversion for such image.

More particularly, the monochrome area includes various monochromes such as a sepia image that is generated by slightly emphasizing an R component and suppressing a G component against the neutral gray R=G=B in the RGB three primary colors, a warm black tone monochrome based on the warm-color gray, a cool black tone monochrome based on the bluish gray, etc. Human eyes are sensitive to a fine color variation in such monochrome images. An unnatural monochrome image may result from inconsistency in the color tone due to an error of the color conversion accuracy. Devotees of monochrome photos are very particular about fine color tones and request no inconsistency in an intended color tone. Accordingly, the use of the configuration according to the present invention can appropriately satisfy requests for monochrome images that highly accurately reproduce fine color tones.

In another embodiment of the present invention, the prescribed area in a color space is configured to be an area containing a flesh color. When the present invention attaches importance to the conversion of colors approximate to the flesh color and defines the flesh color and its peripheral area as a prescribed area, the high accuracy color conversion is available for the flesh color and near flesh colors. The flesh color is especially often used for human faces. If the flesh color is subdued or is subject to an unsmooth change in the color, the image quality appears to be very degraded. The present invention can express the very smoothly changing flesh color by highly accurately converting the flesh color, providing an image with excellent image quality.

Here, an area including the flesh color just needs to satisfy the following requirements. That is to say, ensuring an area containing the flesh color in the color space improves the accuracy of correspondence between the first and second color image data for the flesh color and its peripheral colors. Alternatively, it is necessary to increase color data information about the flesh color and its peripheral colors using the total information amount in the color conversion table as a limitation. It is possible to change the prescribed area size in accordance with colors needed as near flesh colors, the total information amount, and the image type.

In yet another embodiment of the present invention, the prescribed area in a color space is configured to be an area containing a blue color. When the present invention attaches importance to the conversion of the blue and near blue colors and defines the blue color and its peripheral area as a prescribed area, the high accuracy color conversion is available for the blue color and near blue colors. A printing apparatus may provide a wider color area than a display or a digital camera particularly with respect to the blue color and near blue colors. It is possible to perform high accuracy color conversion and provide a more brilliant result using a wider color area. Here, also, an area including the blue and near blue colors just needs to satisfy the following requirements. That is to say, an area containing the blue and near blue colors improves the accuracy of correspondence between the first and second color image data. Alternatively, it is necessary to increase color data information about the blue and near blue colors using the total information amount in the color conversion table as a limitation. It is possible to change the prescribed area size in accordance with colors needed as near blue colors, the total information amount, and the image type. Of course, the present invention can use the prescribed area comprising an area other than the monochrome area including a low saturation area and the area including the flesh color or the blue color. The prescribed area can be a red area for color conversion of, e.g., an image of the setting sun or can be a green area for color conversion of, e.g., an image of woods.

In one embodiment of the present invention, there are several to over ten pieces of reference color image data around a specified axis in a specified color space. The present invention just needs to limit a distribution area for the reference color image data and increase the data about colors. Though there is no particular limitation on the number of pieces of reference color image data in the color conversion table, it is sufficient to provide several to over ten pieces of reference color image data around a specified axis in many cases. For example, an achromatic axis in the color space corresponds to the specified axis when a color conversion table is created for processing a monochrome image including the low saturation area. Extracting several to over ten pieces of reference color image data around the achromatic axis can define the color conversion table that is applicable to almost all monochrome images. Here, straight lines in various color spaces correspond to the achromatic axis, e.g., the R=G=B line in the RGB space, the C=M=Y line in the CMYK space, and the L axis in the Lab space.

For example, a blue axis in the color space corresponds to the specified axis when a color conversion table is created for processing an image including the blue color. It just needs to extract several to over ten pieces of reference color image data around the blue axis that corresponds to a straight line set to R=G=0 and any value for B in the RGB space, for example. When a color conversion table is created for processing an image containing the flesh color, let as assume a specified curve across the area containing the flesh color. Using this curve as the specified axis, it just needs to extract reference color image data around this axis.

In one embodiment of the present invention, the reference color image data distributes from a specified axis in a specified color space within a specified gradation value. The present invention just needs to limit a distribution area for the reference color image data and increase the data about colors. Though there is no particular limitation on the distance from the specified axis, it is possible to easily extract the reference color image data in consideration for gradation values from the specified axis. For example, it just needs to extract lattice points for 256-gradation data within 50 gradations from the specified axis. The specified axis here is the same as that described above.

Though there is no particular limitation on the manner of selecting the reference color image data, one embodiment of the present invention provides a preferred example. The reference color image data is formed by excluding lattice points other than those in the prescribed area with respect to cubic lattice points formed by almost evenly dividing an almost entire area in a specified color space. Coordinates in the color space can be very easily defined by approximately evenly dividing almost all areas in the color space. The reference color image data can be easily extracted from the prescribed area by excluding unnecessary coordinates from the defined coordinates. A conventional method of creating LUTs uses the technique of approximately evenly dividing almost all areas in the color space. Accordingly, the reference color image data according to the present invention can be provided by excluding reference color image data for the conventional LUT.

In another embodiment of the present invention, the reference color image data is subject to a change in the distribution density depending on brightness in a specified color space. As mentioned above, the color conversion accuracy increases by improving the accuracy of the correspondence in the prescribed area or increasing the color data information. However, the prescribed area may request different color conversion accuracies. For the purpose of solving this problem, the brightness in the color space is controlled to change the distribution density of the reference color image data and to increase the density in an area that requires the high accuracy color conversion. In this manner, performing an interpolation operation or the like for a specific color in the area can provide high accuracy color conversion.

One embodiment of the present invention provides a preferred example of changing the density of reference color image data in accordance with the color space brightness so that the reference color image data densely distributes in a high brightness area. That is to say, human eyes can easily perceive saturation changes of colors in the high brightness area. It is often necessary to reproduce fine color variations. Densely distributing the reference color image data in the high brightness area can faithfully reproduce fine color variations in such area.

When an inkjet printer is used as the image device, it often uses only CMYK inks or lm, lc, and Y inks for colors in the high brightness area. In addition, the ink ejection amount is small. Accordingly, it is necessary to express color variations due to gradation value changes by means of the ink amount change. Increasing the reference color image data in this area can highly accurately convert colors that use a few inks and a small amount of ejection. It is possible to faithfully reproduce fine color variations.

In one embodiment of the present invention, the reference color image data densely distributes in a low brightness area. While human eyes hardly perceive saturation changes of colors in the low brightness area, human eyes can sensitively perceive brightness changes. Accordingly, it is important to accurately control the ejection amount of CMYK or K ink also for colors in the low brightness area. Increasing the reference color image data in the low brightness area can highly accurately convert low brightness colors, making it possible to control fine brightness gradations.

One embodiment of the present invention provides specific examples of improving the correspondence in a prescribed area and increasing the color data information. In the present invention, the first color image data and the second color image data contain gradation value data for color components either or both the first color image data and the second color image data have a larger gradation range than 256 gradations. In many cases, an image device expresses color components of color image data with 256 gradations. In addition, three or more color components are combined to express an intended color. When the reference color image data defines correspondence between the first and second color image data, increasing the gradation range more than 256 gradations can improve the accuracy of correspondence in a specified area and increase the color data information. As a result, the color conversion accuracy can be further improved.

Here, the gradation range may be increased more than 256 gradations for either or both the first and second color image data. The first color image data may define display colors. The second color image data may define printer colors. In this case, it is possible to increase gradation values more than 256 gradations for both. However, in many cases, increasing gradation values more than 256 gradations just for either can sufficiently provide an effect of improving the color conversion accuracy. Since the color image data is often processed on a computer, it is preferable to increase the gradation range on a double basis when gradation values are increased more than 256 gradations. While 256 gradations can be expressed in 8-bit data, it is preferable to expand the gradation range to 512 gradations (9 bits), 1024 (10 bits), and so on.

In one embodiment of the present invention, the second image device is a printing apparatus and the second color image data defines an ink ejection amount of the printing apparatus. When the color conversion is performed by improving the accuracy of correspondence in the prescribed area or increasing the color data information, the second image device needs to have sufficient capability of reflecting a result of the accurate color conversion. Recent printing apparatuses provide very high output resolutions and use halftoning to express gradations. Many printing apparatuses have sufficient capability of expressing gradations finer than 256 gradations for color output. When the present invention is applied to a printing apparatus as the second image device, the device can exactly reflect an effect of high accuracy color conversion according to the present invention.

Of course, the above-mentioned color conversion program may be recorded on magnetic recording media, magnetic optical media, or any recording media that will be developed in the future. Obviously, the same applies to replica stages such as for primary or secondary replicas. Unlike the above-mentioned media, a communication line can be used to deliver the color conversion program. In this case, the communication line functions as a transmission medium for using the present invention. When the function of the color conversion program is implemented partly by software and partly by hardware, such configuration does not deviate completely from the concept of the invention. Part of the function may be stored in a recording medium and may be appropriately read out for execution as needed.

As mentioned above, the color conversion function references the reference color image data during color conversion. If the reference color image data is provided as color conversion table data, it can be used for a general-purpose color conversion program. This makes it possible to perform the color conversion according to the present invention. Accordingly, it is possible to consider that the technical concept of the present invention is applied to the table itself as a collection of representative points to be referenced. The present invention can be specified as a medium recording color conversion table data that is referenced during color conversion and comprises reference color image data distributed over a prescribed area in the color space. Of course, the present invention also can be embodied as a medium recording the color conversion table data.

Further, it can be easily understood that the color conversion program can be embodied on a computer and the present invention is applicable as a substantial apparatus including such computer. Accordingly, embodiments of the invention provide basically the same operations. It is also possible to embody the present invention as a color conversion apparatus. Obviously, the color conversion apparatus may be embodied independently or along with the other methods in such a manner as to be installed in a certain device. The concept of the invention is not limited thereto but may be otherwise variously embodied and modified appropriately.

The color conversion program references the reference color image data according to the present invention to perform processes naturally on the basis of a procedure according to the present invention. It can be easily understood that the present invention is also applicable as a method. Accordingly, embodiments of the invention as a method provide basically the same operations. It is also possible to embody the invention as a color conversion method. That is to say, the present invention is not necessarily limited to a substantial medium but is also effective as its method. Of course, the present invention functions as not only a medium recording the color conversion program, but also a color conversion program. It is also possible to embody the invention as a color conversion program. Further, it is possible to consider that the technical concept of the present invention is applied to the table itself as a collection of representative points to be referenced. The present invention can be specified as a color conversion table. Of course, it is also possible to embody the invention as a color conversion table.

One embodiment of the invention is configured to provide a medium recording a color conversion table creation program to create a color conversion table which defines correspondence between first color image data used for a first image device and second color image data used for a second image device with respect to a plurality of reference points, wherein the program allows a computer to implement: an original table storage function which stores an original table having part of information in a color conversion table to be created; and a color conversion table generation function which can generate the color conversion table by combining at least two original tables defining different color accuracies and by supplementing information missing from the plurality of reference points.

This signal is generated as follows. Each 50 bps transmission data is spectrum-spread by means of a PN code (spread code) that has a pattern unique to each GPS satellite and features a transmission signal rate of 1.023 MHz and a code length of 1023. The spectrum spread signal is a C/A code whose carrier has a frequency of 1575.42 MHz. This carrier is BPSK modulated to generate the above-mentioned high-frequency GPS signal.

The invention configured as mentioned above creates a color conversion table that defines correspondence between first color image data used for the first image device and second color image data used for the second image device for a plurality of reference points. The original table storage function stores an original table that has part of information in the color conversion table to be created. The color conversion table generation function uses at least two original tables having different accuracies of colors defined in the original table. The above-mentioned color conversion table is created by combining these original tables and supplementing information missing from the plurality of reference points.

Generation of the color conversion table uses a combination of at least two original tables having different color accuracies. If the color conversion table is created by using information about colors included in the high accuracy original table, it is possible to increase the color conversion accuracy contained in the high accuracy original table. The high accuracy original table is configured to define correspondence for colors that remarkably exhibit an effect of improving the image quality in response to an increase in the conversion accuracy. In this manner, if the color conversion accuracy is unchanged for colors other than the relevant color, human eyes can perceive an effect of remarkably improving the image quality. That is to say, it is possible to suppress the storage capacity and improve the conversion accuracy at the same time.

Specifically, it has been a conventional practice to reference an original table comprising 173 reference points stored in a hard disk, where xy signifies x to the yth power hereinafter. An interpolation operation is performed to interpolate reference points and generate a color conversion table comprising 333 reference points. In addition, the present invention provides an original table that has a higher color accuracy and fewer reference points than the above-mentioned original table comprising 173 reference points. The present invention combines these tables. Increasing the color accuracy for all the 17**3 reference points unnecessarily increases the storage capacity needed for the original table storage function. According to the present invention, however, information of the original tables constitutes part of the color conversion table. One of the original tables provides a higher color conversion accuracy than the other. The needed storage capacity can be suppressed by assuming the high accuracy color area to be an intended area. In addition, it is possible to improve the accuracy of the color conversion to be performed for the color conversion table associated with the intended color. Consequently, the image quality can be improved.

Of course, there is no particular limitation on the number of reference points in the original table, the number of color components for specifying colors, and the number of bits for expressing colors in gradations. The original tables just need to have part of the color conversion table to be created during the color conversion. There needs a difference between accuracies for at least two original tables. The color conversion table generation function just needs to be able to supplement information missing from a plurality of reference points provided for the color conversion table. The present invention also includes a configuration of increasing the number of reference points, e.g., by means of an interpolation operation and a configuration of increasing the number of bits for expressing colors in gradations.

One embodiment of the invention provides an example of the above-mentioned original tables. According to the invention, the original table storage function stores at least two original tables having different gradations for color image data. If the original tables have different numbers of gradations for expressing colors associated with the color image data, the table having more gradations can define an intended color more accurately. Therefore, the color conversion table generation function can generate a color conversion table capable of highly accurately converting colors in the original table that defines colors with many gradations.

Another embodiment of the invention provides an example of the above-mentioned original tables. According to the invention, the original table storage function stores at least two original tables having different reference point densities for defining correspondence. The original table or the color conversion table does not define the correspondence of a specific color, but defines the reference point thereof. During the color conversion, an interpolation operation or the like is performed to compute the correspondence of the specific color.

When the color conversion is used to compute color image data for a specific color, the following can be presumed. That is to say, when more reference points are found around a color to be converted and are positioned more approximately to it, the conversion accuracy of the interpolation operation or the like improves, highly accurately defining the color. In consideration for this, assigning different reference point densities to two original tables can provide both tables with different color accuracies. The table having a higher reference point density can more accurately define an intended color than the other. Therefore, the color conversion table generation function can generate a color conversion table capable of highly accurately converting colors in the original table that has a higher reference point density.

One embodiment of the invention provides a configuration example of assigning different reference point densities to the original tables. According to the invention, one of the original tables has a higher reference point density than a reference point density in the other original table and has a lower reference point density than a reference point density in the color conversion table. As mentioned above, the two original tables are assigned different reference point densities. If the reference point density of the original table is higher than that of the color conversion table that is generated by the color conversion table generation function, however, some of the reference points are not reflected on the color conversion table. It is sufficient to set the upper bound of the original table's reference point density equal to the color conversion table's reference point density.

The original tables are configured to have different reference point densities. In this configuration, the table having a higher reference point density is assigned fewer reference points than the table having a lower reference point density. This makes it possible to suppress the storage capacity needed for the original table storage function. Accordingly, it is possible to improve the color conversion accuracy without unnecessarily increasing the storage capacity.

In one embodiment of the invention, the second image device is configured to be a printing apparatus capable of using a plurality of colors of ink. Further, the original table storage function is configured to express a gradation change of a specified color component in the second color image data by identifying a color component using a smaller number of inks than the other color components and, for this color component, storing an original table having a higher accuracy than for the other color components.

When the printing apparatus expresses a color, dark and light inks may be used for a certain color component. While the present printing apparatus normally uses inks comprising CMYK color components such as cyan, magenta, yellow, and black, for example, there may be a case of further using an lc (light cyan) ink for the C ink and an lm (light magenta) ink for the M ink. When the dark and light inks are used, each of these types of inks is assigned the same range of gradations as for the other color components, making it possible to more highly accurately express colors than the other color components.

When the accuracy is increased for color components (black and cyan in the above-mentioned example) that use fewer inks than the other color components, it is possible to create a color conversion table that can perform the high accuracy color conversion for these color components. Of course, the accuracy just needs to be increased for a color that uses a smaller amount of ink than the other color components. When a light ink is used for black, the accuracy needs to be increased for colors other than black. When DY (dark yellow) is used for yellow and no light ink is used for the C and M inks in the above-mentioned example, the accuracy needs to be increased for the C and M inks. When a user can select inks available on the printing apparatus, it is obviously possible to change color components requiring the high accuracy depending on the selected inks.

One embodiment of the invention provides an example of increasing the accuracy for a specific ink. According to the invention, the color component using a smaller number of inks than the other color components is yellow. That is to say, some of currently available printing apparatuses use the lclm inks in addition to the CMYK inks. Increasing the accuracy for the Y ink can generate a color conversion table that can be suitably used for many commercially available printing apparatuses.

In one embodiment of the invention, the second image device is configured to be a printing apparatus capable of using a plurality of colors of ink. Further, the original table storage function is configured to identify a color component having a wider range of displayable brightness than the other color components and stores an original table having a higher accuracy than the other color components. If the original table uses only the specified number of reference points to define a color for the ink of color components having a wide expressible brightness range, the definition accuracy degrades relatively to the ink of color components having a narrow expressible brightness range.

If a small number of reference points are used to define colors for a portion that causes a nonlinear relationship between the ink ejection amount and the brightness in the printing apparatus, the color definition accuracy especially degrades during an interpolation operation or the like to compute the ink ejection amount for reference points other than the specific reference point. To solve this problem, a higher accuracy is given to the color component having a wider expressible brightness range than the other color components. In this manner, it is possible to create a color conversion table capable of highly accurately converting the color that exhibits remarkable nonlinearity.

There can be alternatives to the above-mentioned configuration of increasing the color accuracy in the original table in terms of ink colors. It may be preferable to determine a high accuracy area in terms of a color expressed as a combination of colors, i.e., an image color. One embodiment of the invention provides a specific example. According to the invention, a high brightness color in one of the original tables is given a higher accuracy than an accuracy for defining colors in the other original table.

An image device such as the printing apparatus that uses the subtractive color mixing only uses a small amount of ink to express high brightness colors. It is necessary to express color variations resulting from gradation value changes by means of changes in the small amount of ink. Accordingly, highly accurately defining such high brightness colors makes it possible to create a color conversion table capable of accurately expressing fine color changes. Highly accurately defining high brightness colors in the original table includes not only defining part of the colors defined in the original table, but also defining all of the colors defined therein.

In one embodiment of the invention, a low brightness color in one of the original tables is given a higher accuracy than an accuracy for defining colors in the other original table. The amount of ink increases and the brightness decreases on an image device such as the printing apparatus that uses the subtractive color mixing. Generally, the increasing amount of ink is not proportional to the decreasing amount of brightness. The brightness drastically decreases after the ink amount exceeds a specified value. The rate of increase in the ink amount drastically changes mainly at an area of low brightness color. Such color easily decreases the conversion accuracy for obtaining image data of any color by means of an interpolation. To solve this problem, there is provided an original table that highly accurately defines low brightness colors. The use of such original table can create a color conversion table capable of highly accurately converting low brightness colors. Of course, also in this case, highly accurately defining low brightness colors in the original table includes attributing the low brightness to not only part of the colors defined in the original table, but also all of the colors defined therein.

In one embodiment of the invention, a low saturation color in one of the original tables is given a higher accuracy than an accuracy for defining colors in the other original table. A low saturation color has hues but appears like almost monochrome to human eyes. Human eyes are very sensitive to fine color changes in an image containing a large proportion of such color. Highly accurately defining such low brightness colors makes it possible to create a color conversion table capable of accurately expressing fine color changes.

In another embodiment of the invention, any of or a combination of a flesh color and its peripheral colors, a blue color and its peripheral colors, and a red color and its peripheral colors in one of the original tables is given a higher accuracy than an accuracy for defining colors in the other original table. The present invention attributes the high accuracy to some colors in the color space for saving the storage capacity. Therefore, the accuracy of the original table should be improved for colors that remarkably exhibit an effect of improving the accuracy.

Examples such colors include the flesh color and its specified peripheral colors, the blue color and its specified peripheral colors, and the red color and its specified peripheral colors. The flesh color and its specified peripheral colors are often used for human faces, for example. When the flesh color is subdued or is subject to an unsmooth color variation, the image quality appears to be very degraded. Since the present invention creates a color conversion table capable of highly accurately converting the flesh color, it is possible to express the very smoothly varying flesh color and to obtain an image of excellent image quality.

A printing apparatus may provide a wider color area than a display or a digital camera particularly with respect to the blue color and near blue colors. It is possible to perform high accuracy color conversion and provide a more brilliant result using a wider color area. A pseudo contour easily occurs with respect to the blue color and near blue colors and the red and near red colors constituting an image like a sunset, for example. In such case, it is possible to prevent occurrence of a pseudo contour and obtain images of excellent image quality by generating a color conversion table capable of the high accuracy color conversion for these colors. In addition to these colors, of course, the prescribed area can be a green area for color conversion of, e.g., an image of woods.

As mentioned above, the original table highly accurately defines high brightness colors, low brightness colors, the flesh color and its specified peripheral colors, the blue color and its specified peripheral colors, the red color and its specified peripheral colors, and the like. In this case, it is preferable to be able to highly accurately convert intended colors by suppressing the storage capacity of the original table. Accordingly, it is possible to change areas containing the colors in the original table in accordance with the sufficient size of an area in the color space for well expressing images, the total information amount available for the original table, types of images, and the like.

In one embodiment of the invention, the color conversion table generation function allows a user to select whether or not to generate a color conversion table by means of the combination. That is to say, the user can determine whether or not to generate a color conversion table capable of highly accurately converting specified colors. When the present invention is applied to a conventional printing apparatus or computer, it is possible to provide an option that enables users to select whether or not to highly accurately convert specified colors. Accordingly, this increases options for users. It becomes possible to satisfy various user's needs such as highly accurately converting specified colors in one case or performing the color conversion without attributing the high accuracy to specified colors in another case. When a user is allowed to select generation of a color conversion table by combination, it is also possible to prepare a plurality of original tables with different areas of colors and make the areas of colors selectable.

In one embodiment of the invention, the selection enables generation of a color conversion table using at least two original tables having different gradations for the color image data, generation of a color conversion table using at least two original tables having different reference point densities for defining the correspondence, and generation of a color conversion table using both of these conditions.

There are provided techniques of improving the original table accuracy by increasing gradations for color image data and increasing the reference point density. Either or both techniques can be performed to generate a color conversion table. As a result, a user can select the color conversion table from various choices in accordance with the needed color conversion accuracy.

In one embodiment of the invention, there are provided an image data acquisition function to obtain image data comprising the first color image data and a specific color ratio computation function to compute a ratio of a specific color to the obtained image data as a whole. When a ratio computed by the specific color ratio computation function exceeds a specified threshold value, the color conversion table generation function, generates a color conversion table according to the selection using an original table which highly accurately defines colors including the specific color.

When a user is allowed to select whether or not to generate a color conversion table by combination, as mentioned above, it is possible to provide the color conversion table according to the present invention as an option. In addition to this embodiment, it would be convenient if a highly accurate interpolation is automatically performed without user's specification. For example, this is implementable by referencing a proportion of a specific color in the image data for which the color conversion should be performed. When the image targeted for the color conversion contains a large proportion of the specific color, a color conversion table is created by combining an original table highly accurately defining the specific color and an original table less highly accurately defining that color. In this manner, the color conversion table can be used to automatically perform the high accuracy color conversion for the specific color.

The proportion of the specific color contained is computed based on image data. Therefore, it is possible to automatically determine an area capable of high accuracy color conversion. When the image contains the specific color whose proportion is greater than a specified threshold value, the specific color can be highly accurately converted. The high accuracy color conversion is available on many or important portions of the image. It is possible to automatically improve the image quality on the second image device. Various techniques are available for computing a proportion of a specific color in image data. An example of such technique is to compute a histogram for the first color image data in which a specific color component or a combination thereof has a specified value. The histogram is then compared with the number of all pixels.

According to the present invention, an interpolation operation may be performed to find correspondence between any colors when a color conversion table is created or the color conversion is performed by referencing the color conversion table. The accuracy to define colors in the color conversion table itself is important for improving the color conversion accuracy. In addition, the accuracy of the interpolation operation is also important during the color conversion. Generally, a nonlinear interpolation provides higher accuracy than a linear interpolation but requires more operation time.

One embodiment of the invention provides a preferred example of interpolation operations. According to the invention, there is provided a medium recording an interpolation program to store an original table having some information about a color conversion table to be created, combine at least two original tables defining different color accuracies defined in the original table, interpolate information missing from the plurality of reference points, and execute interpolation using either or both an interpolation operation for creating a color conversion table defining correspondence between first color image data used for a first image device and second color image data used for a second image device with respect to a plurality of reference points and an interpolation operation for color conversion using the color conversion table. In this case, the program executes an interpolation operation by selecting a linear interpolation technique or a nonlinear interpolation technique in accordance with high or low brightness of a color to be referenced during execution of the interpolation operation.

An interpolation operation is performed when a color conversion table according to the present invention is created and when the color conversion is performed with reference to the color conversion table. Interpolation operation techniques are configured to be selectable so that interpolations are changed in accordance with high or low brightness of a color at the reference point. According to the subtractive color mixing used for printing apparatuses and the like, high brightness colors expressed by a small amount of ink maintain proportional relationship between a change in the ink amount and a change in the brightness. Even a linear interpolation can ensure high accuracy and therefore is used from the viewpoint of a higher operation speed. When the ink amount exceeds a specified value, however the proportional relationship is not maintained between a change in the ink amount and a change in the brightness. Accordingly, the accuracy of the linear interpolation degrades relatively. To solve this problem, the present invention performs a nonlinear interpolation (e.g., spline interpolation) capable of high accuracy interpolation operations despite the nonlinear relationship. Consequently, the high accuracy color conversion can be performed for the entire image without degrading the operation speed.

Of course, it is possible to add the configuration according to the present invention to the other configurations mentioned above. One embodiment of the invention exemplifies a specific configuration to change the interpolation techniques in accordance with high or low brightness of a color. According to the invention, the second color image data defines the amount of ink. In this case, a nonlinear interpolation is executed when execution of the interpolation operation references a color to detect that any of color components or a combination of ink amounts exceeds a specified threshold value.

For example, a printing apparatus expresses colors by combining a plurality of colors of inks. In such case, it is possible to say that increasing the ink amount for each of color components decreases the brightness of the corresponding color or that increasing a combination of ink amounts also decreases the brightness. Therefore, if a threshold value is checked with respect to the ink amount for each of color components or for a combination thereof, it is possible to easily change the interpolation techniques in accordance with high or low brightness of a color.

One embodiment of the invention provides another configuration example of changing the interpolation techniques. According to the invention, there is provided a medium recording an interpolation program to store an original table having some information about a color conversion table to be created, combine at least two original tables defining different color accuracies defined in the original table, interpolate information missing from the plurality of reference points, and execute interpolation using either or both an interpolation operation for creating a color conversion table defining correspondence between first color image data used for a first image device and second color image data used for a second image device with respect to a plurality of reference points and an interpolation operation for color conversion using the color conversion table. In this case, the program executes a nonlinear interpolation when referencing a color in an original table defining colors with a relatively low accuracy and executes a linear interpolation when referencing a color in an original table defining colors with a relatively high accuracy.

Interpolation operation techniques are configured to be selectable when a color conversion table according to the present invention is created and when the color conversion is performed with reference to the color conversion table. In addition, the interpolation operation techniques are changed in accordance with accuracies of the original tables. When the original table highly accurately defines colors, it is often possible to satisfactorily maintain the good image quality after the color conversion. In such case, the linear interpolation is performed. Even if the original table relatively less accurately defines colors, performing the nonlinear interpolation can provide a high accuracy interpolation. The good image quality can be maintained in accordance with the color conversion. As a result, the high accuracy color conversion can be performed for the entire image without degrading the operation speed. Of course, it is also possible to add the configuration according to the present invention to the other configurations mentioned above.

Of course, the above-mentioned color conversion table creation program or the interpolation program mentioned above may be recorded on magnetic recording media, magnetic optical media, or any recording media that will be developed in the future. Obviously, the same applies to replica stages such as for primary or secondary replicas. Unlike the above-mentioned media, a communication line can be used to deliver the color conversion program. In this case, the communication line functions as a transmission medium for using the present invention. When the function of the color conversion program is implemented partly by software and partly by hardware, such configuration does not deviate completely from the concept of the invention. Part of the function may be stored in a recording medium and may be appropriately read out for execution as needed.

The present invention functions not only as the medium recording the color conversion table creation program and the interpolation program, but also as the color conversion table creation program and the interpolation program. It is possible to embody the invention in accordance with various embodiments of the color conversion table creation program and various embodiments of the interpolation program.

Further, it can be easily understood that the color conversion table creation program and the interpolation program can be embodied on a computer and the present invention is applicable as a substantial apparatus including such computer. It is also possible to embody the invention as a color conversion table creation apparatus and as an interpolation apparatus. Obviously, the color conversion apparatus may be embodied independently or along with the other methods in such a manner as to be installed in a certain device. The concept of the invention is not limited thereto but may be otherwise variously embodied and modified appropriately.

The color conversion table creation program and the interpolation program reference the reference color image data according to the present invention to perform processes naturally on the basis of a procedure according to the present invention. It can be easily understood that the present invention is also applicable as a method. It is also possible to embody the invention as a color conversion table creation method and as an interpolation method. Further, it is possible to consider that the technical concept of the present invention is applied to the table itself as a collection of representative points to be referenced for creation of the color conversion table. The present invention can be specified as a partial color conversion table. Of course, it is also possible to embody the invention as a color conversion table.

Moreover, it is possible to consider that the technical concept of the present invention is applied to apparatuses and methods for the color conversion using the color conversion table created by the present invention. The present invention can be also specified as the color conversion apparatus and the color conversion method. Of course, it is also possible to embody the color conversion apparatus and the color conversion method in accordance with various embodiments of the invention. Furthermore, it is possible to consider that the technical concept of the present invention is applied to apparatuses and methods for printout using the color conversion table created by the present invention. The present invention can be also specified as a printing apparatus and a printing method. Still further, it is possible to consider that the technical concept of the present invention is applied to apparatuses and methods for printout using the interpolation operations according to the present invention. The present

BRIEF DESCRIPTION OF DRAWINGS

FIG. 4 shows an LUT example;

FIG. 6 shows an LUT example;

BEST MODE FOR CARRYING OUT THE INVENTION

Figure 1:
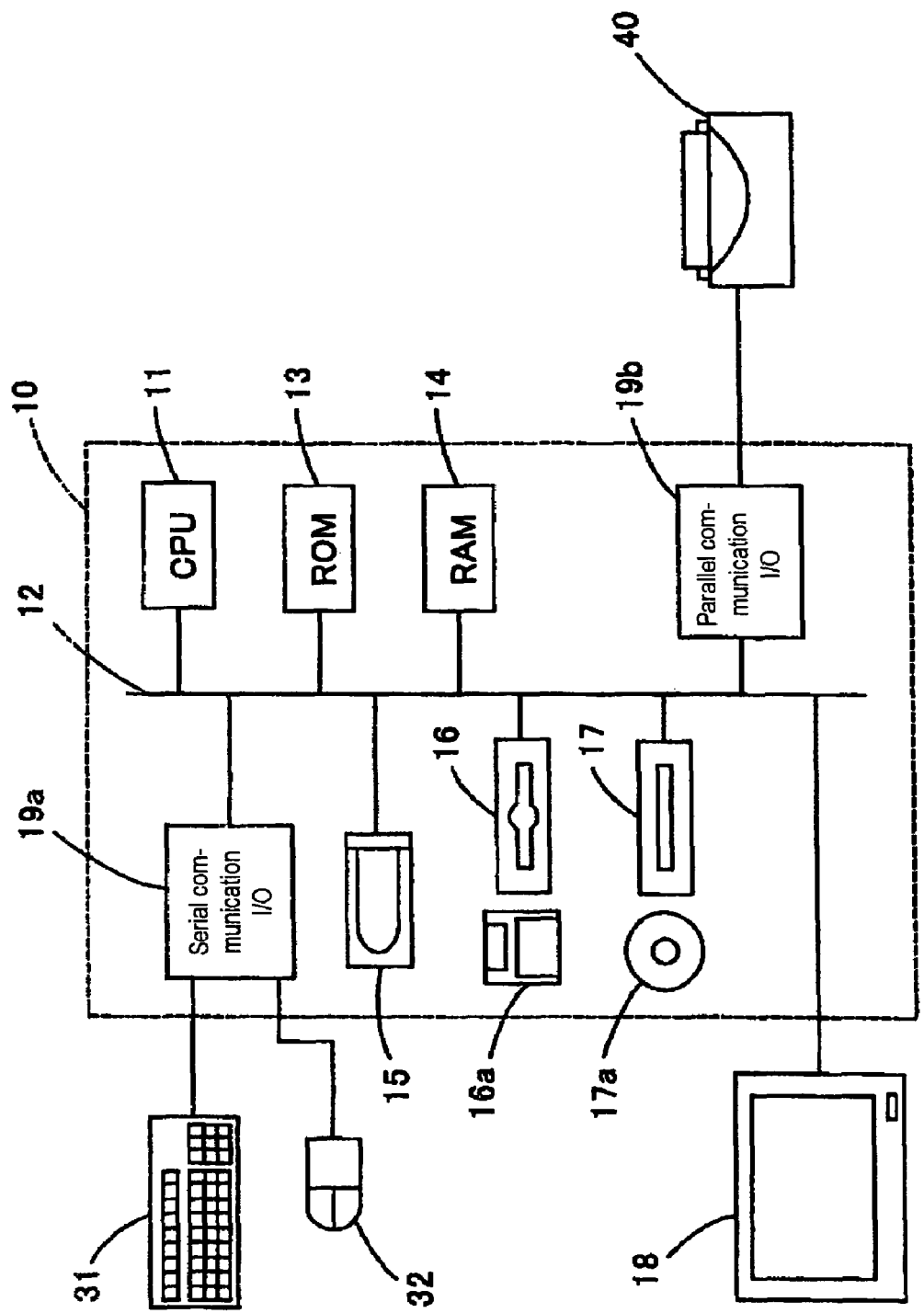
FIG. 1 is a block diagram showing a schematic configuration of a computer capable of executing a color conversion program according to an embodiment of the present invention.

Embodiments of the present invention will now be described in the following sequence.

(1) Configuration of the present invention
(2) LUT configuration
(3) Print process
(4) Printing a monochrome image
(5) Highly accurate color conversion
(6) Second embodiment
(7) Third embodiment
(8) Fourth and fifth embodiments
(9) Sixth embodiment
(10) LUT configuration according to the sixth embodiment
(11) Print process according to the sixth embodiment
(12) Printing an image according to the sixth embodiment
(13) Highly accurate color conversion according to the sixth embodiment
(14) Seventh embodiment
(15) Eighth embodiment
(16) Other embodiments

(1) Configuration of the Present Invention

Figure 2:
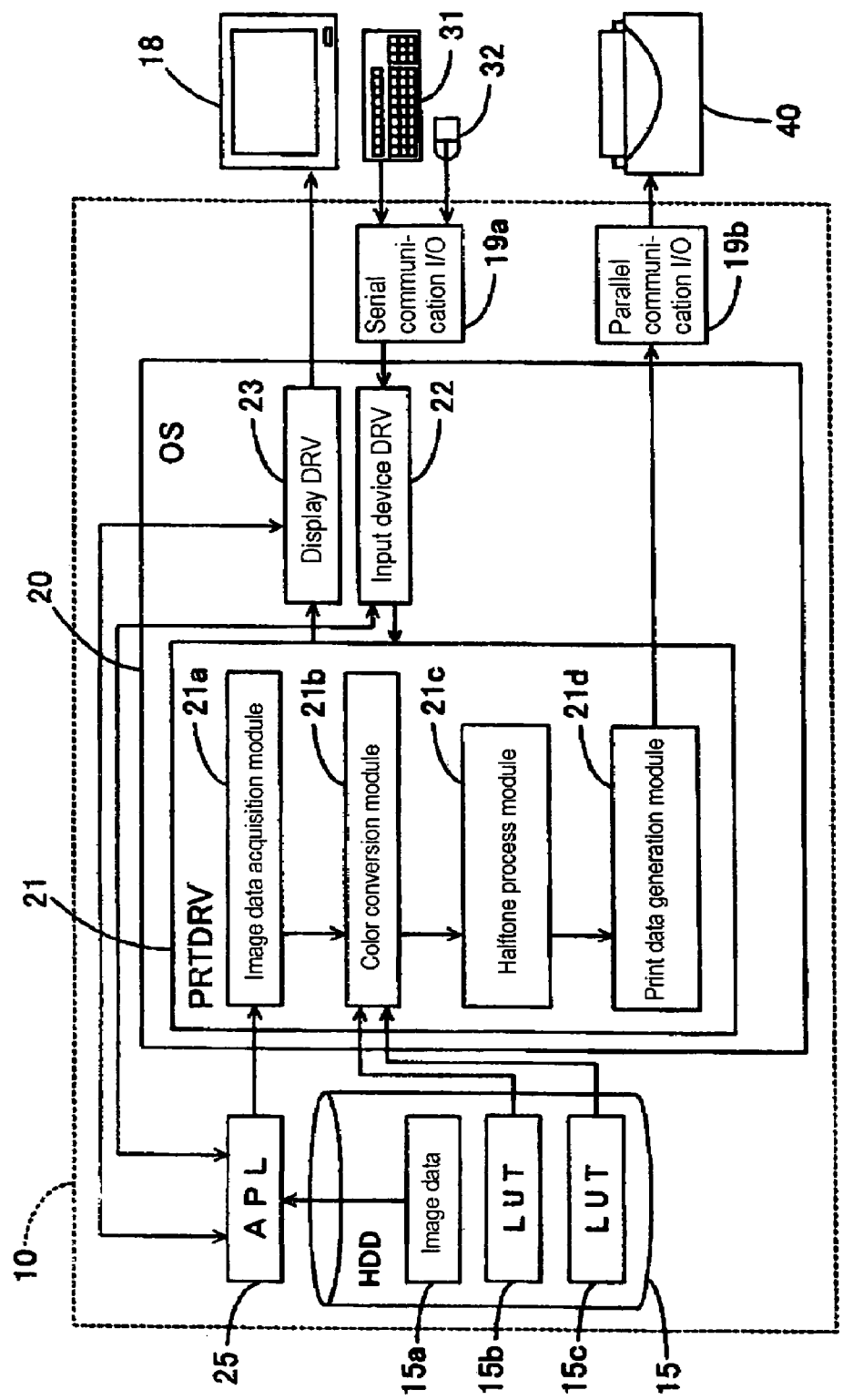
FIG. 2 shows a schematic configuration with a color conversion program implemented as a color conversion module.

FIG. 1 schematically shows a hardware configuration of a computer capable of executing a color conversion program according to the present invention. FIG. 2 shows a schematic configuration in which the color conversion program is implemented as a color conversion module 21b on a printer driver installed in the computer's OS. A computer 10 has a CPU 11 as the center of processes. The CPU 11 can make access to ROM 13 containing BIOS and the like and to RAM 14 via a system bus 12.

The system bus 12 connects with a hard disk drive (HDD) 15, a flexible disk drive 16, and CD-ROM drive 17 as external storages. The HDD 15 stores an OS 20, an application program (APL) 25, and the like which are then transferred to the RAM 14. The CPU 11 accesses the ROM 13 and the RAM 14 as needed to execute the software. That is to say, the RAM 14 is used as a temporary work area for executing a variety of programs.

The computer 10 connects with input operation devices such as a keyboard 31 and a mouse 32 via a serial communication I/O 19a. The computer 10 also connects with a display 18 for monitoring via a video board (not shown). The computer 10 can connect with a printer 40 via a parallel communication I/O 19b. While the configuration of the computer 10 is simplified, it is possible to employ a general configuration as a personal computer. Of course, the present invention is not limited to personal computers. While the embodiment uses a so-called desktop computer, it may be preferable to use notebook or mobile computers. In addition, the present invention is not limited to the above-mentioned connection interface between the computer and the printer 40. It is possible to use various connection forms such as a serial interface, SCSI, USB connections, and any connection forms to be developed in the future.

While the HDD 15 stores programs in this example, the storage medium is not limited thereto. For example, it may be preferable to use a flexible disk 16a or a CD-ROM 17a. A program recorded on these recording media is read into the computer 10 via the flexible disk drive 16 or a CD-ROM drive 17 and is installed into HDD 15. The program is read into the RAM 14 via the HDD 15 to control the computer. The recording media are not limited thereto. A magnetic optical disk may be used. As a semiconductor device, it is possible to use nonvolatile memory such as a flush card. When an external file server is accessed for downloading via a modem or a communication line, the communication line works as a transmission medium for using the present invention.

As shown in FIG. 2, the OS 20 of the computer 10 according to the embodiment is installed with a printer driver (PRT-DRV) 21, an input device driver (DRV) 22, and a display driver (DRV) 23. The DRV 23 controls display of image data and the like on the display 18. The input device DRV 22 receives code signals supplied from the keyboard 31 or the mouse 32 via the serial communication I/O 19a and accepts specified input operations.

An APL 25 is an application program capable of executing color image retouching and the like. By executing the APL 25, a user can operate the above-mentioned input devices to print an intended color image from the printer 40. According to a user's instruction, the APL 25 reads image data 15a recorded on the HDD 15 and allows the display DRV 23 to display an image based on the image data 15a on the display 18. When the user operates the above-mentioned input devices, the operation contents are obtained via the input device DRV 22 to interpret the contents. The APL 25 performs various processes such as a print instruction and a retouch in accordance with the operation contents.

Figure 3:
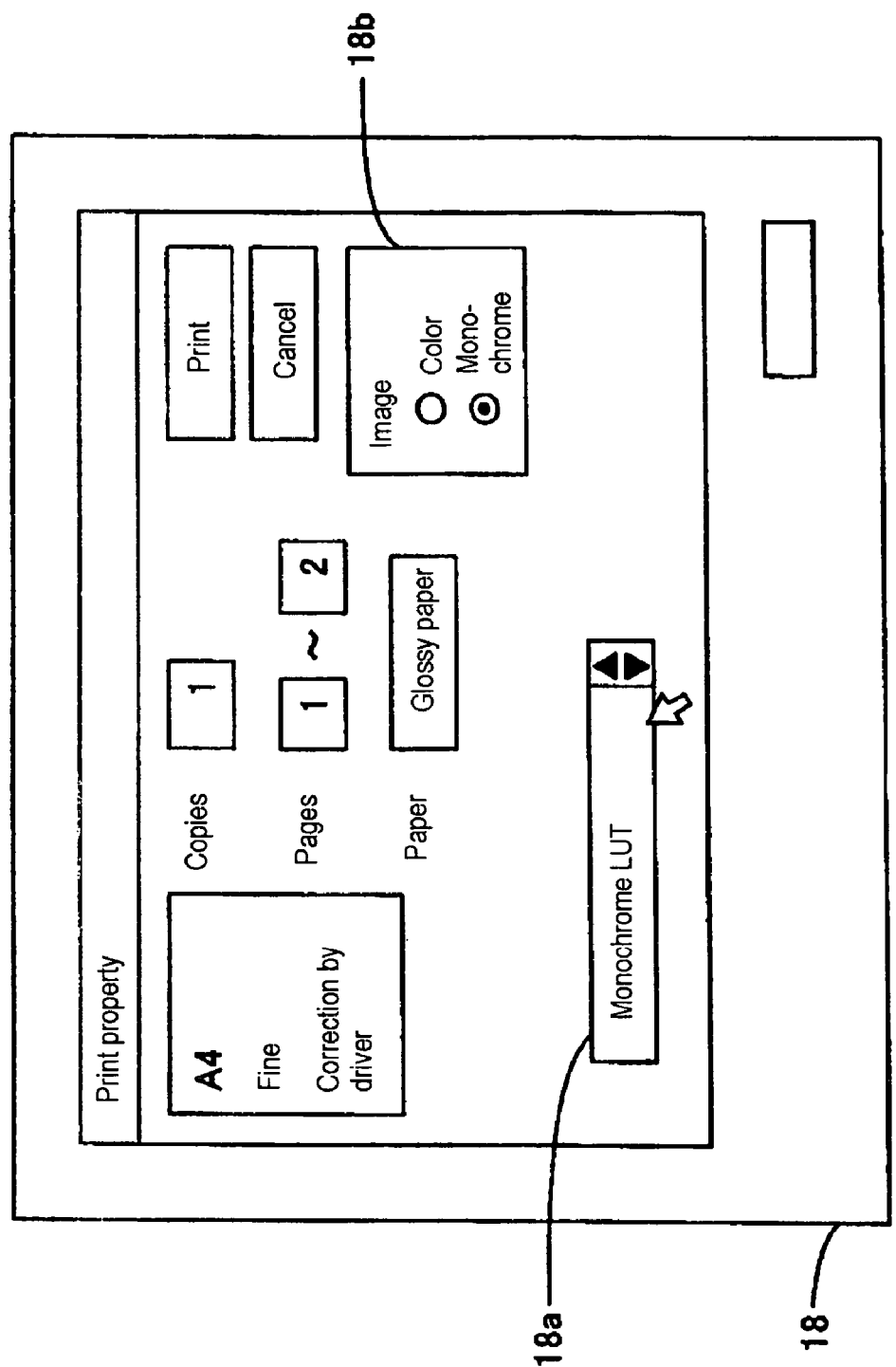
FIG. 3 shows a print property screen.

The APL 25 issues a print instruction to drive the PRTDRV 21. The PRTDRV 21 sends data to the display DRV 23 to display a UI for entering information needed for printing. FIG. 3 shows a print property screen as the UI. The PRTDRV 21 accepts various information inputs via the input device DRV 22. The print property screen in FIG. 3 allows input of various parameters to be specified for printing. The print property screen contains various input boxes for entering the number of copies and the number of pages and various buttons for performing print or cancel instructions. There is provided an LUT selection box 18a as one of input boxes at the bottom left of the property screen. The user can modify the display contents of the LUT selection box 18a via a pointer or the like using the mouse 32. The LUT selection box 18a can display available LUTs from which the user can select an intended LUT.

At the right center of the property screen, there is provided an image selection box 18b for selecting image types. Using radio buttons, the user can select a color image or a monochrome image to be printed. The selection here automatically selects an appropriate LUT. Obviously, the above-mentioned print properties are an example. It may be preferable to display either the LUT selection box 18a or the image selection box 18b. Further, it is possible to provide various modifications in such a manner as to generate a specified alarm when an attempt is made to select a color image from the image selection box 18b though a color LUT is selected in the LUT selection box 18a. Moreover, the selection of LUTs can be variously configured in such a manner as to not only use the print property screen under control of the PRTDRV 21, but also display a specified setup screen as one of functions of the APL 25.

In any case, the embodiment can provide printing by selecting an LUT 15b for ordinary color image printing and an LUT 15c for monochrome image printing that are previously created and are saved on the HDD 15. Of course, it is possible to create different LUTs for media or ink sets available for the printer 40 and make these LUTs selectable. In this embodiment, the image data 15a is sRGB-standard compliant dot matrix data that expresses RGB color components in gradations. The LUT is a table that keeps correspondence between gradation values for the sRGB and gradation values for six CMYKlclm colors used on the printer 40.

In the embodiment, the sRGB-standard compliant data is the first color image data used for the first image device (display 18). The CMYKlclm data is the second color image data used for the second image device (printer 40). A set of both gradation values defined in the LUT is reference color image data. The monochrome image according to the embodiment includes low saturated colors that range from neutral gray comprising achromatic color to warm or cool tones having some degree of saturations. Accordingly, the LUT 15c maintains correspondence between R=G=B data as well as data containing adjacent colors and CMYKlclm gradation values. On the other hand, the LUT 15b for ordinary color image printing maintains correspondence between gradation value data evenly distributed over all the RGB gradation values and CMYKlclm gradation values.

(2) LUT Configuration

Figure 5:
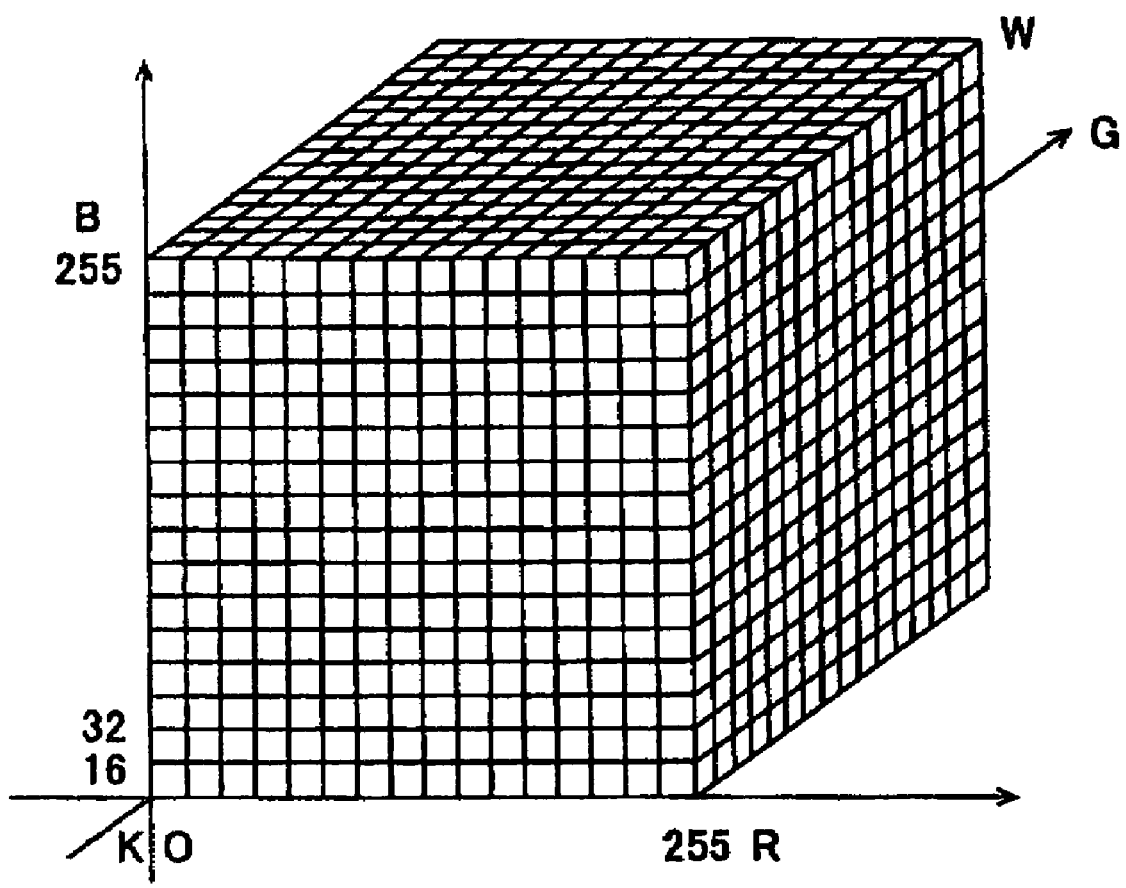
FIG. 5 is a perspective view showing a color solid in the sRGB space.

FIG. 4 shows an example of the LUT 15b. As shown in FIG. 4, the LUT 15b contains RGB data and CMYKlclm data each containing values 0 through 255. Each color provides 256 gradations (8 bits). For each RGB component of sRGB data, gradation values are evenly divided into 16 to form reference points. A color solid defined in sRGB space is formed in the orthogonal space using axes corresponding to RGB colors. As shown in FIG. 5, each axis of the color solid is given 17 lattice points to configure cubic lattices that work as reference points. Therefore, there are 173 reference points in total. The LUT 15b defines correspondence between sRGB data and CMYKlclm data with reference to 173 colors. In FIG. 5, origin 0 indicates black point K. A vertex opposite origin 0 represents white point W. Colors along a line (gray axis) connecting both points become achromatic.

FIG. 6 shows an example of the LUT 15c. As shown in FIG. 6, the LUT 15c maintains RGB data each containing values 0 through 255. Each color provides 256 gradations. The CMYKlclm data has an increased gradation range. That is to say, each CMYKlclm color can be more finely tuned. The embodiment decreases the number of reference points instead of increasing the gradation range for the CMYKlclm data to keep the limit of the storage capacity needed to store the LUT 15b.

The LUT 15c in FIG. 6 has a gradation range of 0 to 1023 (1024 gradations, i.e., 10 bits) for CMYKlclm data. The LUT 15c requires more storage capacity by two digits in binary than the LUT 15b. The RAM 14 handles storage information on a byte basis, i.e., in units of eight bits. It is preferable to allocate 16 bits for storing 10-bit information from the viewpoint of the configuration of the RAM 14, a computing speed, and the like. The embodiment allocates the 16-bit storage capacity for 10-bit information expressing CMYKlclm data and requires twice as much storage capacity as the LUT 15b. Accordingly, the number of reference points is kept to 173/2 (approximately 133) so as not to exceed the storage capacity of the LUT 15b. Even if the number of reference points is decreased, the LUT 15c is used for monochrome image printing and therefore just needs to have reference points needed for printing colors included in a monochrome area.

Figure 7:
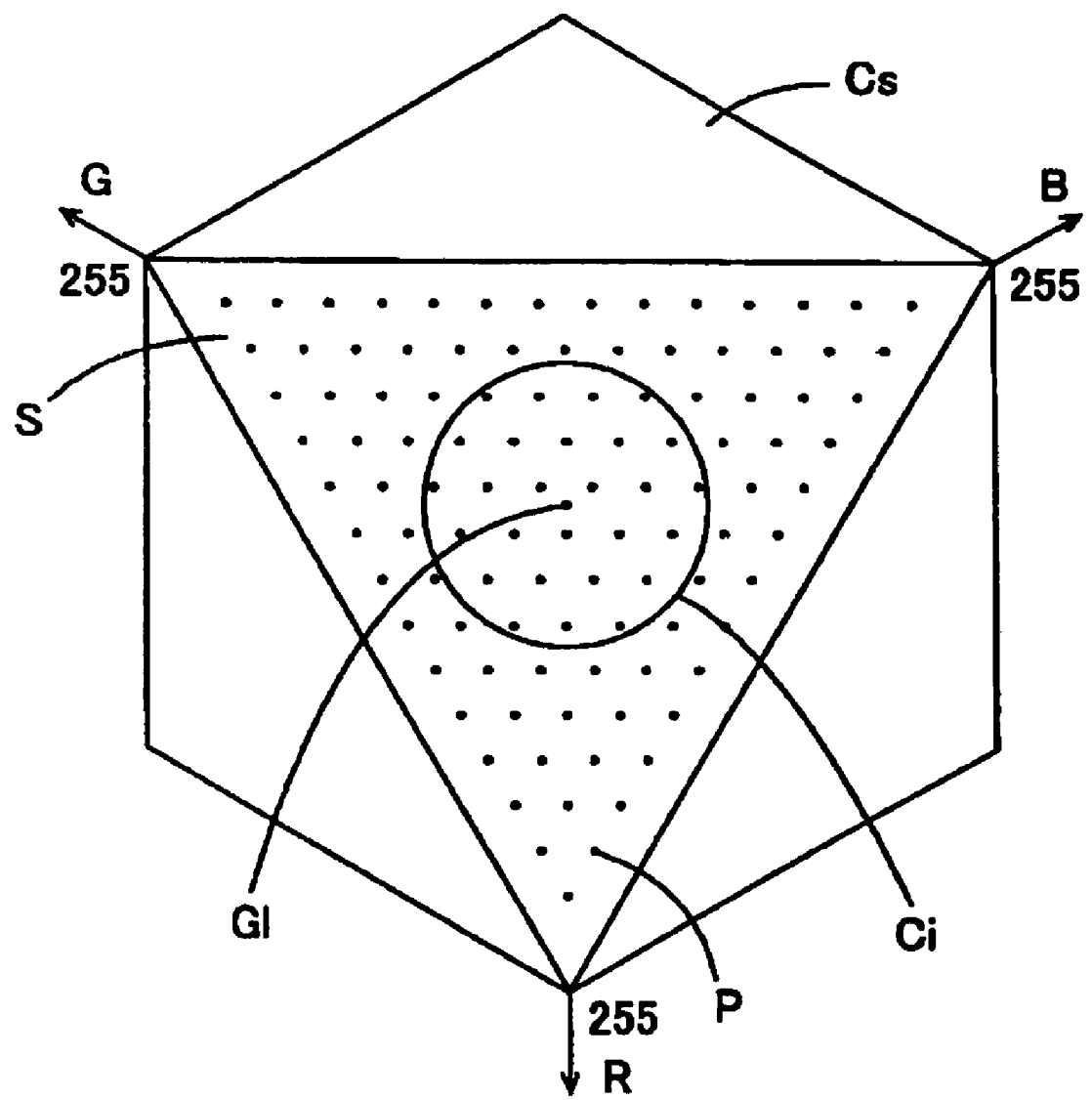
FIG. 7 is a cross sectional perspective view showing the color solid in the sRGB space viewed along a gray axis.

According to the embodiment, reference points in the sRGB space for the LUT 15c comprise lattice points for R=G=B and several to over ten lattice points nearby. Specifically, the reference points for the LUT 15c may include the gray axis in FIG. 5 and surrounding several to over ten lattice points. FIG. 7 shows an example. FIG. 7 is a perspective view of the color solid in the sRGB space of FIG. 5. The color solid is cut on a plane crossing three points (RGB)=(0,0,255), (0,255,0), and (255,0,0), and is viewed from the origin 0 along the gray axis.

A plurality of lattice points P on a cross section S in FIG. 7 corresponds to cubic lattice points configured by giving 17 lattice points to each axis of a color solid Cs in the sRGB as mentioned above. A center Gl of the cross section S is an intersecting point between the gray axis and the cross section S. The LUT 15c according to the embodiment assumes a circle Ci having the center Gl to extract several to over ten points around the center Gl. Lattice points P within the circle are extracted as reference points for the LUT 15c.

It is possible to consider a cylinder around the gray axis by assuming the other circles Ci along the gray axis on the cross sections other than the cross section S. If lattice points within this cylinder are assumed to be reference points for the LUT 15c, it is possible to extract lattice points around the gray axis. The color solid in the sRGB space narrows near both ends of the gray axis, i.e., the black point K and the white point W. Lattice points decrease in the cylinder around the gray axis toward the end from the intersecting point between the outside periphery of the cylinder and the outside surface of the color solid. As a solution, it is possible to extract several points outside the cylinder as reference points at both ends for adjustment not to decrease the color conversion accuracy in these areas. Of course, the above-mentioned method of creating the LUT 15c is an example. Rather than extracting several to over ten lattice points around the gray axis, it may be preferable to extract lattice points within a specified gradation value from the gray axis when the sRGB gradation range complies with 256 gradations. Further, it is possible to use various selection methods to be described later.

Figure 8:
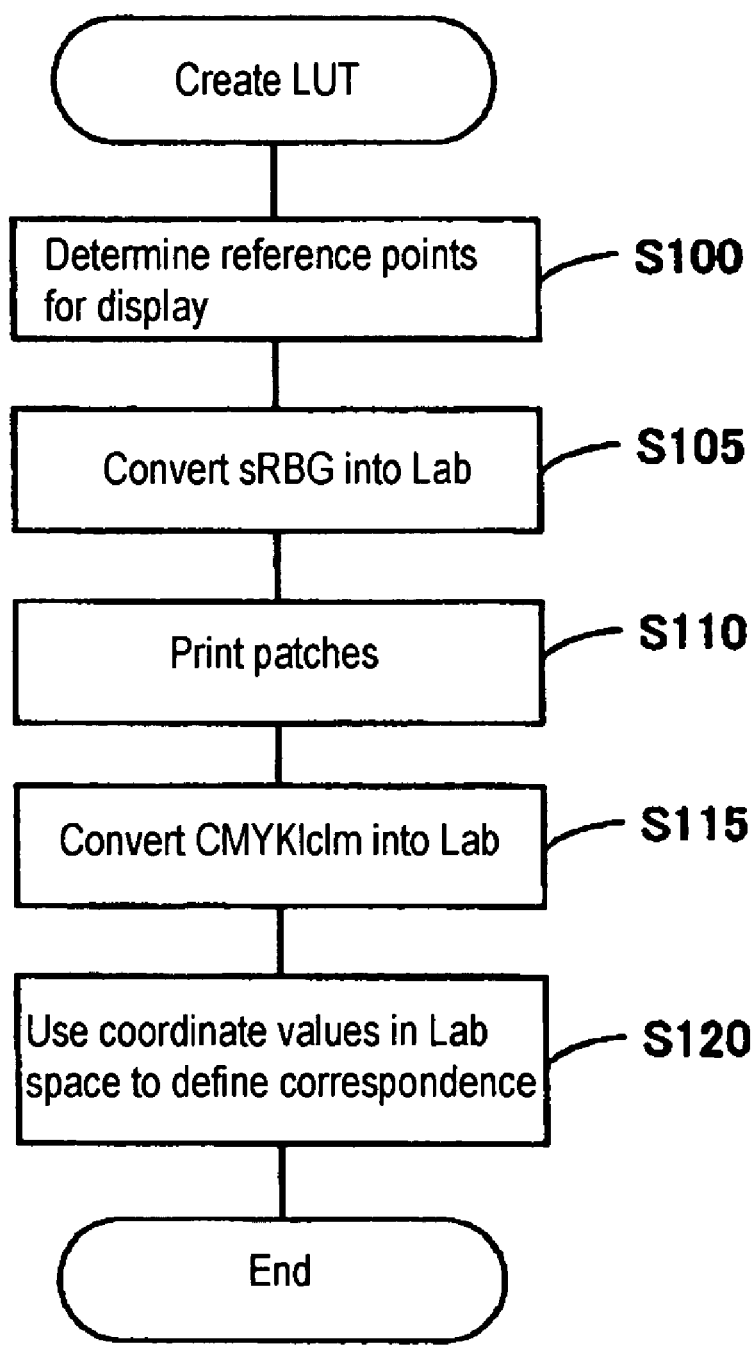
FIG. 8 is a flowchart showing a process of creating a LUT.

It is possible to create the LUT 15c by following a sequence of processes as indicated by a flowchart in FIG. 8. Since the process needs many computation processes, it is preferable to perform computation using a computer. The LUT 15c defines the correspondence between sRGB data and CMYKlclm data in the monochrome area comprising low-saturation colors. The LUT 15c converts colors represented by sRGB data used for the display 18 and CMYKlclm data used for the printer 40 into coordinate values in a Lab space for correspondence between the sRGB data and the CMYKlclm data in a specified monochrome area in the Lab space. To create an LUT, the process extracts reference points for the display 18 at step S100. At this time, the process extracts lattice points P not only in the cylinder around the gray axis, but also outside the cylinder at both ends of the gray axis. This extraction determines 13**3 sRGB gradation values shown at the left of FIG. 6.

At step S105, the determined sRGB gradation values are converted into coordinate values in the Lab space. It is possible to convert sRGB-standard compliant image data into coordinate values in the Lab space through the use of a known conversion equation. It may be preferable to convert the data into Lab coordinates based on the conversion equation at step S105. Alternatively, it may be preferable to display a color according to the reference points on the display 18 and obtain Lab coordinates using a color measuring device and the like. At step S110, the printer 40 actually prints many color patches in the monochrome area. The process obtains CMYKlclm data for printing the color patches. At step S115, the color measuring device is used to measure the color patches to convert the data into coordinate values in the Lab space.

As a result, there are provided Lab coordinate values for colors corresponding to sRGB reference points and many Lab coordinate values corresponding to CMYKlclm data in the monochrome area. At step S120, the process uses these Lab coordinate values to define correspondence between sRGB data and CMYKlclm data. The coordinate values in the Lab space found at step S105 do not always match those found at step S115. The correspondence between both data can be found by means of the interpolation, the optimum value retrieval method, and the like. When the interpolation is used, the accurate correspondence can be defined by printing many color patches and obtaining Lab coordinate values about many colors. As a result, it is possible to create the LUT 15c that defines correspondence between sRGB and CMYKlclm gradation values as shown at the left in FIG. 6.

Figure 9:
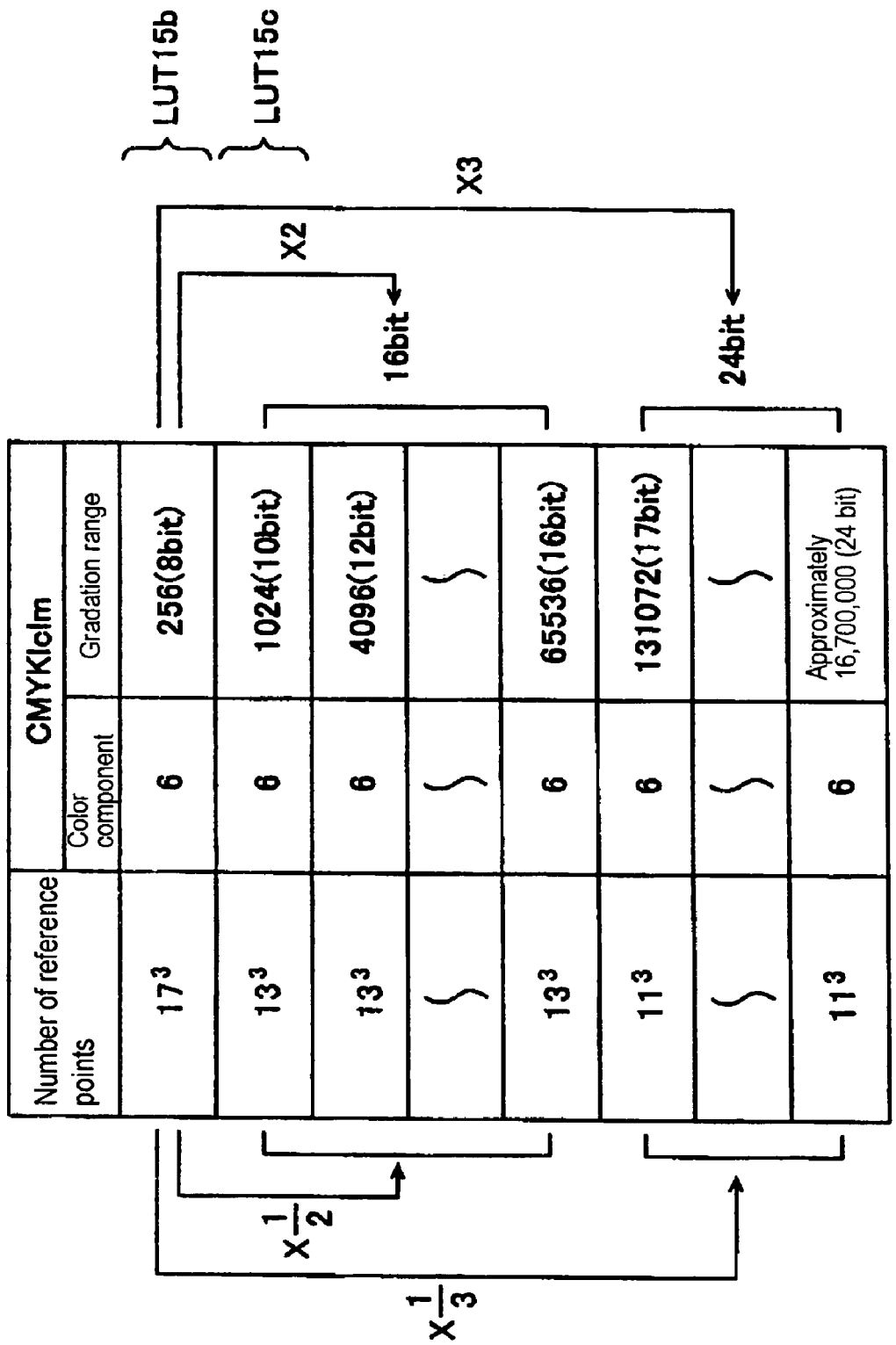
FIG. 9 is an explanatory diagram showing how to vary gradation ranges and the number of reference points in a plurality of LUTs.

The LUT 15c just needs to be able to decrease the number of reference points and increase the gradation range. It is possible to provide various gradation ranges as well as a gradation range of 1024 gradations for CMYKlclm data as available in the LUT 15c according to the embodiment. FIG. 9 shows how to vary the gradation range and the number of reference points in a plurality of LUTs so as not to exceed the storage capacity of the LUT 15b. FIG. 9 shows the number of color components in the CMYKlclm data and the gradation range out of two pieces of color image data to be associated with each other in each LUT. There are six color components. As mentioned above, the embodiment provides the sRGB gradation range of 256 gradations and three color components. FIG. 9 is configured to give no change to sRGB.

The top row in FIG. 9 shows the LUT 15b. The second row from the top shows the LUT 15c. Middle rows in FIG. 9 show the LUT for monochrome image printing corresponding to the gradation range of CMYKlclm data from 1024 gradations (10 bits) to 65536 gradations (16 bits). There are 133 reference points each. As mentioned above, the RAM 14 handles storage information on a byte basis, i.e., in units of eight bits. When the gradations of CMYKlclm data are expressed in 9 to 16 bits, it is preferable to use the 16-bit storage capacity for expressing the gradations of each reference point. When the storage capacity of 16 bits is used, approximately 133 reference points are used to ensure as much storage capacity as possible so as not to exceed the storage capacity of the LUT 15b. Though not shown in FIG. 9, the same obviously applies to 9 or 11 bits.

When information more than 16 bits is needed to express gradations of each reference point, it is preferable to use the 24-bit storage capacity for expressing 17-bit to 24-bit gradations for the same reason as mentioned above. When the 24-bit storage capacity is used, the necessary storage capacity becomes three times larger than the storage capacity for the CMYKlclm data in the LUT 15b. By limiting the number of reference points to 173/3 or less, it is possible not to exceed the storage capacity for the LUT 15b. Specifically, it just needs to use 113 reference points as shown in FIG. 9. In this manner, it is possible to increase or decrease the number of reference points and the gradation range within the capacity needed to store the LUT 15b. The number of reference points and the gradation range for LUTs may be determined by increasing or decreasing the gradation range in accordance with the accuracy needed for the color conversion and by increasing or decreasing the number of reference points in accordance with areas in a color space needed for the color conversion.

Of course, the present invention may be configured to not only increase the above-mentioned gradation range of CMYKlclm data from specified 256 gradations, but also increase the gradation range of sRGB data from specified 256 gradations. When the printer 40 uses an ink set other than six colors, the number of color components becomes other than six. If CMYK data is used, for example, the number of colors becomes four. If DY is added to CMYKlclm, the number of colors becomes seven. The above-mentioned description is provided on the basis of the total information amount for the LUT 15b. The embodiment is configured to increase or decrease the number of reference points and the gradation range in the other LUT so as not to exceed the total information amount. If the storage capacity is sufficient, the LUT 15b need not be used as a criterion. It is possible to adjust the number of reference points and the gradation range in accordance with the storage capacity. For example, it is possible to use a configuration that uses 153 reference points and a gradation range of 4096 gradations. While it is practical to configure the RAM 14** whose storage capacity is ensured in units of bytes, such configuration is not mandatory. It is still possible to ensure the storage capacity in units of bits.

(3) Print Process

According to the embodiment, the PRTDRV 21 appropriately uses the above-mentioned LUTs for color conversion and allows the printer 40 to perform printing. For the purpose of printing, the PRTDRV 21 comprises an image data acquisition module 21a, a color conversion module 21b, a halftone process module 21c, and a print data generation module 21d as shown in FIG. 2. When a user clicks on a print button of the print property in FIG. 3 to start printing, a print process is executed in accordance with a flowchart in FIG. 10. When the print process starts, the image data acquisition module 21a obtains the image data 15a stored in the RAM 14 at step S200.

At step S210, the image data acquisition module 21a starts the color conversion module 21b. The color conversion module 21b converts an RGB gradation value into a CMYKlclm gradation value. At step S210, the color conversion module 21b converts each dot data in the image data 15a into CMYKlclm dot data. At this time, the color conversion module 21b performs interpolation by referencing the LUT selected from the LUT selection box 18a in FIG. 3. The color conversion module 21b performs color conversion based on either the LUT 15b or 15c. When the color conversion module 21b performs the color conversion to generate CMYKlclm gradation data, the halftone process module 21c starts at step S220. The CMYKlclm gradation data is passed to the halftone process module 21c.

The halftone process module 21c performs a halftone process that converts each dot's CMYKlclm gradation to be expressed in the recording density of ink droplets. The halftone process module 21c generates head drive data to apply ink at the recording density after the conversion at step S220. The print data generation module 21d receives the head drive data and rearranges it in the order used on the printer at step S230. The printer 40 is mounted with a jet nozzle array (not shown) as an ink jet device. Since a plurality of jet nozzles is parallel provided on the nozzle array along a vertical scanning direction, the nozzle array simultaneously uses data that is separated from each other by several dots along the vertical scanning direction.

Then, the rasterization is performed to sort data arranged along the vertical scanning direction so that data to be used simultaneously can be simultaneously buffered to the printer. After the rasterization, the process generates print data by adding specified information such as the image resolution. At step S240, the print data is output to the printer 40 via the parallel communication I/O 19b. The printer 40 prints the image displayed on the display 18 based on the print data. The printer 40 ejects ink of CMYKlclm colors onto a print medium based on the CMYKlclm gradation value data as mentioned above.

(4) Printing a Monochrome Image

Figure 11:
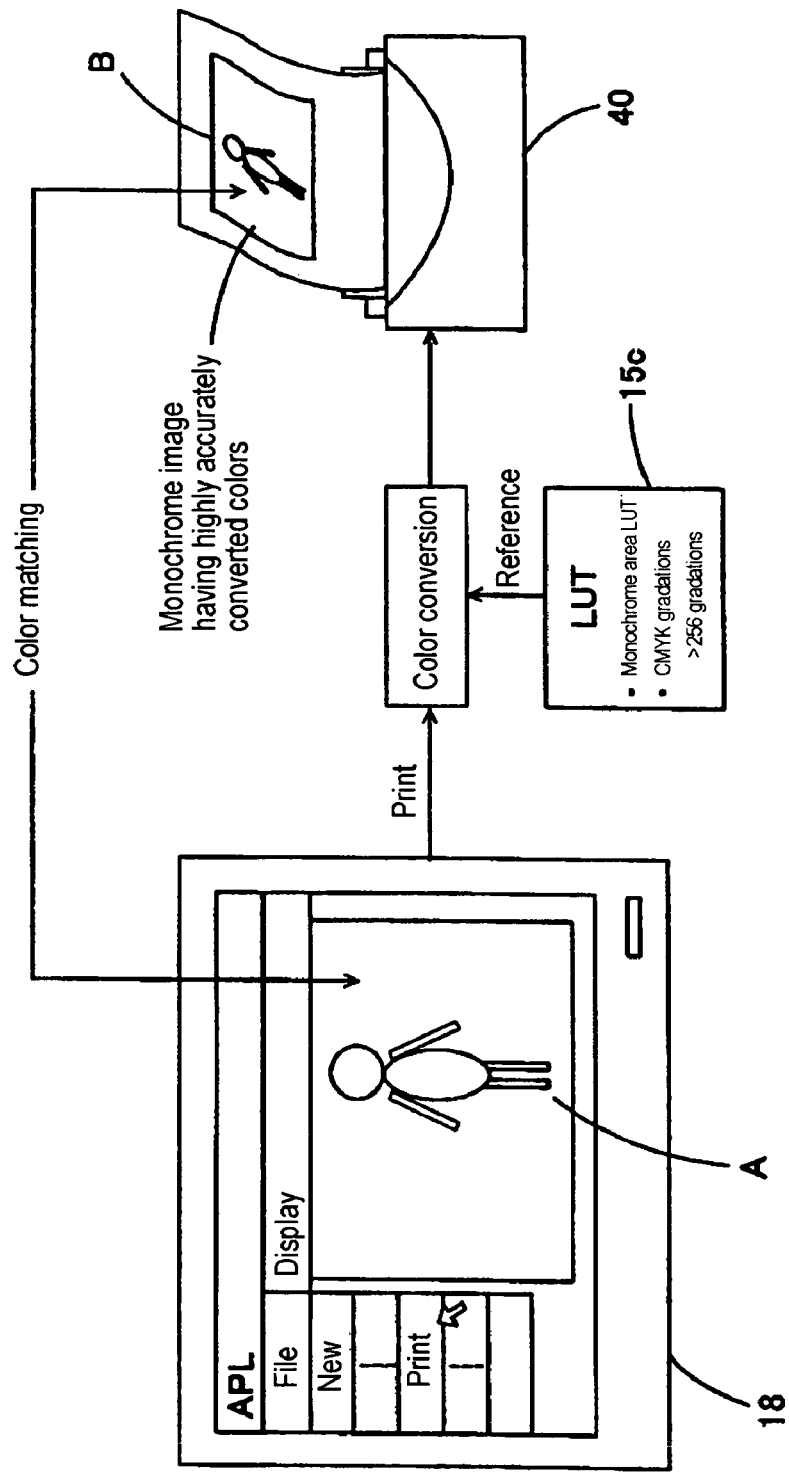
FIG. 11 is a schematic diagram showing operations for printing a monochrome image.

The following describes operations for printing a monochrome image according to the above-mentioned configuration based on a schematic operation diagram in FIG. 11. The display 18 in FIG. 11 displays a screen for executing the APL 25. When the APL 25 reads the image data 15a, the image data 15a is stored in the RAM 14. A process by the display DRV 23 displays an image A based on the image data 15a on the display 18. The APL 25 is capable of performing various retouches for the image A displayed on the display 18 and giving an instruction to print the image A. The screen for executing the APL 25 in FIG. 11 shows a situation to read the image data 15a stored in the HDD 15 and issue a print instruction. Using the mouse 32, a user can select a print tab from the file menu and issue the print instruction.

Let us consider that the user executes the APL 25 for image processing and prints the image A that is configured as a monochrome image comprising low-saturation colors. The image A comprising low-saturation colors is approximately seen like a monochrome image to human eyes. By fine-tuning the saturation, however, the image A can be changed to an image with different color tones such as a warm tone or a cool tone. As mentioned above, the LUT 15c has not only reference points enough to perform the color conversion in a monochrome area, but also 1024 gradation values of CMYKlclm data more than 256 gradations. Accordingly, performing the color conversion by referencing the LUT 15c can convert colors in the monochrome area with high precision.

The printer 40 prints an image B using the colors after conversion. The image B is printed based on 1024 gradations more than 256 gradations. It is possible to faithfully reproduce subtle changes in colors. A printout is available by faithfully reproducing fine color tones such as the warm tone and the cool tone in a monochrome image. Almost the same color tone is applied to the image A displayed on the display 18 and the printed image B. In this sense, both are color-matched.

There is a case where a monochrome image is expressed with brightness data only and the printer driver is controlled to select color tones such as the cool tone and print monochrome images with various color tones. In this configuration, the original data comprises only brightness data. A print result is given a specified color tone despite displaying a neutral monochrome image on the display. Accordingly, no color matching is provided. Some trial and error is needed so as to obtain an intended result. However, the present invention provides basically the same color to the image A displayed on the display 18 and the printed image B. It is possible to obtain a printout result as it is seen on the display without trial and error.

As shown in FIG. 7, the LUT 15c maintains correspondence between sRGB-standard compliant RGB gradation data with respect to reference points in a specified monochrome area and CMYKlclm gradation data used for the printer 40. At step S210, the process performs an interpolation based on these reference points to make correspondence between any RGB gradation value and CMYKlclm gradation value. Various known technologies are applicable as an interpolation technique. For example, it is possible to use a linear interpolation, a spline interpolation, and the like. Further, the following configuration is also available. An interpolation is performed to expand the reference points in the LUT 15 to more reference points. The expanded reference points are buffered to the RAM 14. In addition, a further interpolation is performed by referencing the reference points in the RAM 14.

(5) Highly Accurate Color Conversion

Figure 12:
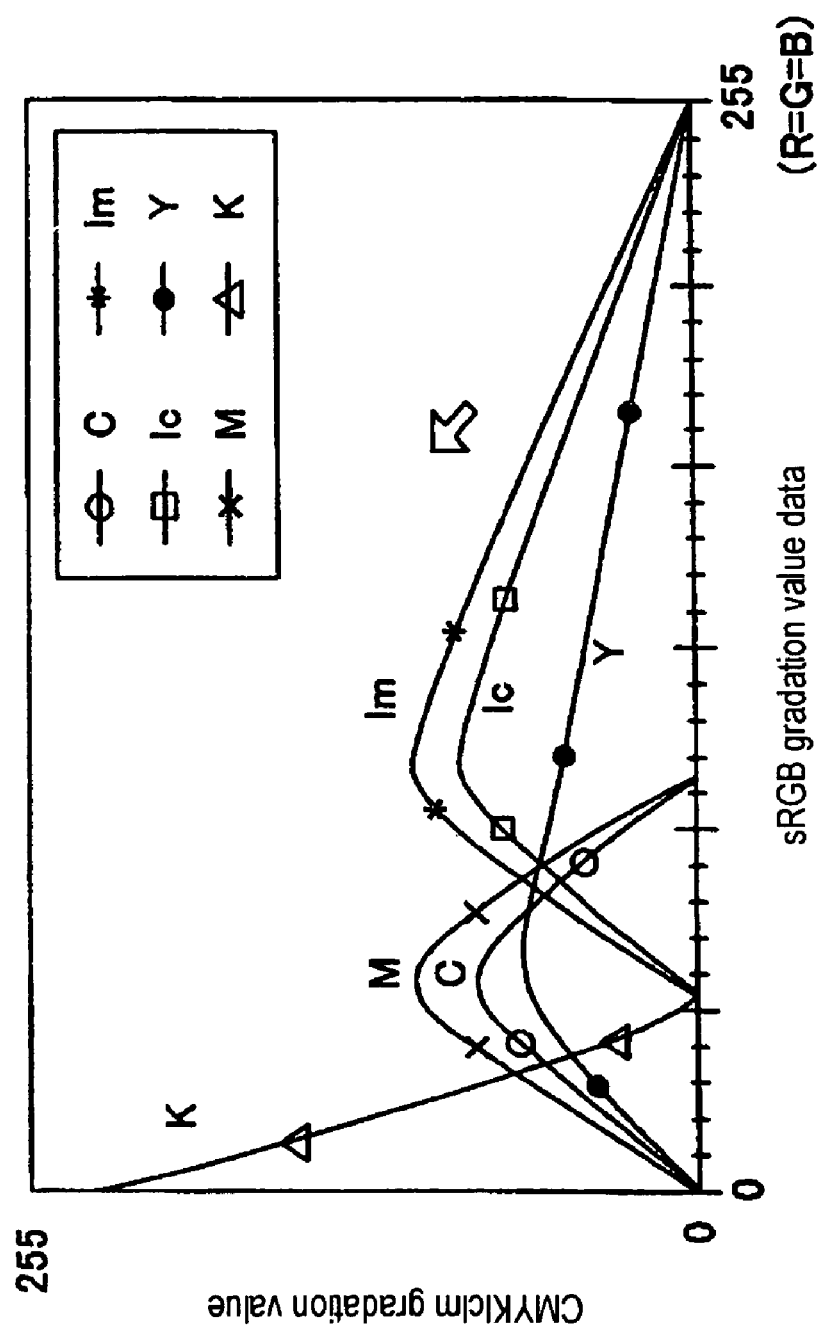
FIG. 12 shows ideal CMYKlclm gradation value data with reference to sRGB gradation value data for neutral gray.

The following describes in detail a capability of printing by faithfully reproducing fine color tones such as the warm tone and the cool tone in monochrome images. FIG. 12 shows ideal CMYKlclm gradation value data corresponding to sRGB gradation value data indicating R=G=B, i.e., neutral gray. In FIG. 12, increasing the sRGB gradation values provides finite values to gradation values for inks other than the K ink having an achromatic color. For the purpose of obtaining an achromatic printout result, a plurality of chromatic inks is combined to be applied to a medium. As mentioned above, colors are represented by combining chromatic inks. Accordingly, it is possible to apply color tone variations such as the warm tone and the cool tone to a monochrome image comprising low-saturation chromatic colors by changing a balance of chromatic inks.

The LUT is a table that maintains correspondence between sRGB gradation value data and CMYKlclm gradation value data based on the ideal correspondence as shown in FIG. 12. Since the LUT 15b provides 256 gradations of CMYKlclm gradation value data, the LUT 15b may be insufficient to accurately define the ideal correspondence as shown in FIG. 12. To solve this problem, the gradation range of CMYKlclm data is increased like the LUT 15c to enable highly accurate color conversion. The following describes the gradation value data R=G=B with reference to FIG. 12. In addition, the color conversion accuracy improves even for the color in the monochrome area according to the present invention, i.e., the low-saturation chromatic color for the same reason.

Figure 13:
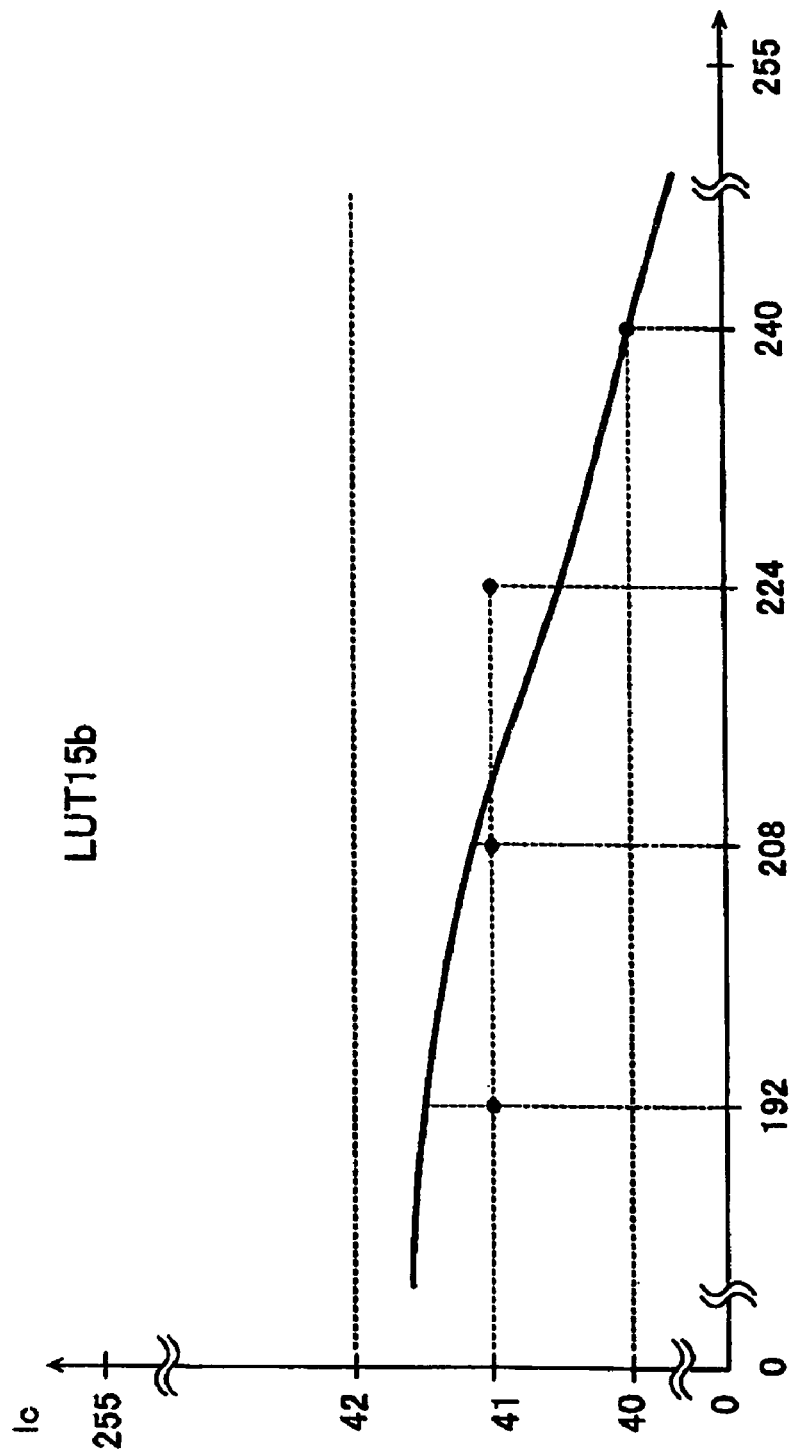
FIG. 13 shows ideal CMYKlclm gradation value data with reference to sRGB gradation value data for neutral gray.

FIG. 13 is a partial enlargement of FIG. 12, showing an ideal change of lc ink gradation values with reference to sRGB gradation values for neutral gray. FIG. 13 shows the enlargement near sRGB gradation values 192, 208, 224, and 240 in the LUT 15b. In this area, the lc ink shows gradation values 40 to 42. An ideal change of lc approximates to a curve. As the sRGB gradation value decreases from 240, the gradation value of the lc ink continuously increases from 40 to 42. At sRGB gradation value 224, the ideal gradation value for the lc ink is neither 40 nor 41. Since the lc ink gradation values follow 256 gradations, however, it is impossible to specify a unit smaller than 40 or 41. In FIG. 13, gradation value 41 for the lc ink is allocated to sRGB gradation value 224. The same applies to gradation values 208 and 192. The ideal gradation value for the lc ink is neither 41 nor 42. The more approximate gradation value 41 is allocated to gradation values 208 and 192.

Figure 14:
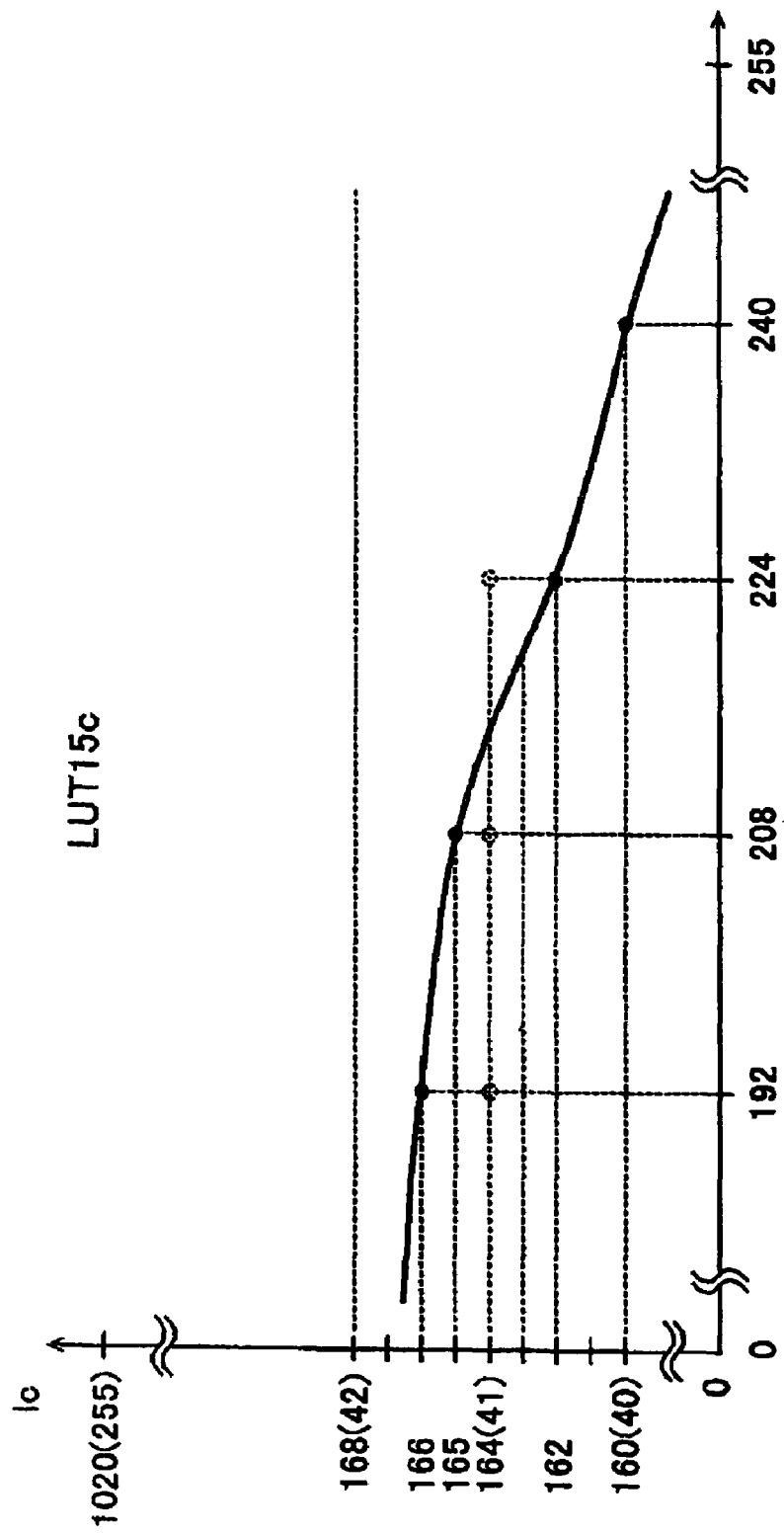
FIG. 14 shows ideal CMYKlclm gradation value data with reference to sRGB gradation value data for neutral gray.

Like FIG. 13, FIG. 14 shows an ideal change of lc ink gradation values defined in the LUT 15c with reference to gradation values for neutral gray. As mentioned above, the LUT 15c extracts lattice points within the cylinder around the gray axis. The neutral gray contains reference points similar to those in the LUT 15b. The sRGB gradation values 192, 208, 224, and 240 become reference points. Since the LUT 15c provides 1024 gradation values for CMYKlclm data, gradation value 40 through 42 in FIG. 13 are equivalent to gradation values 160 through 168. Accordingly, it is possible to allocate accurate lc ink gradation value 162 to sRGB gradation value 224 that cannot correspond to an accurate value in the LUT 15b. Likewise, it is possible to allocate accurate lc ink gradation values 165 and 166 to gradation values 208 and 192, respectively. Here, values in parentheses for abscissas indicate lc ink gradation values in 256 gradations. White dots on dotted lines in the graph denote gradation values corresponding to those in the LUT 15b.

Since the LUT 15c increases the gradation range of CMYKlclm data, it is possible to define accurate gradation values for reference points in the LUTs. The present invention can improve not only the gradation value accuracy of reference points in the LUTs, but also the color conversion accuracy in the color conversion module 21b. That is to say, a linear interpolation is used to compute the correspondence between any colors for color conversion by referencing reference points in the LUTs. Further, the LUTs according to the present invention also improve the accuracy of the linear interpolation.

Figure 15:
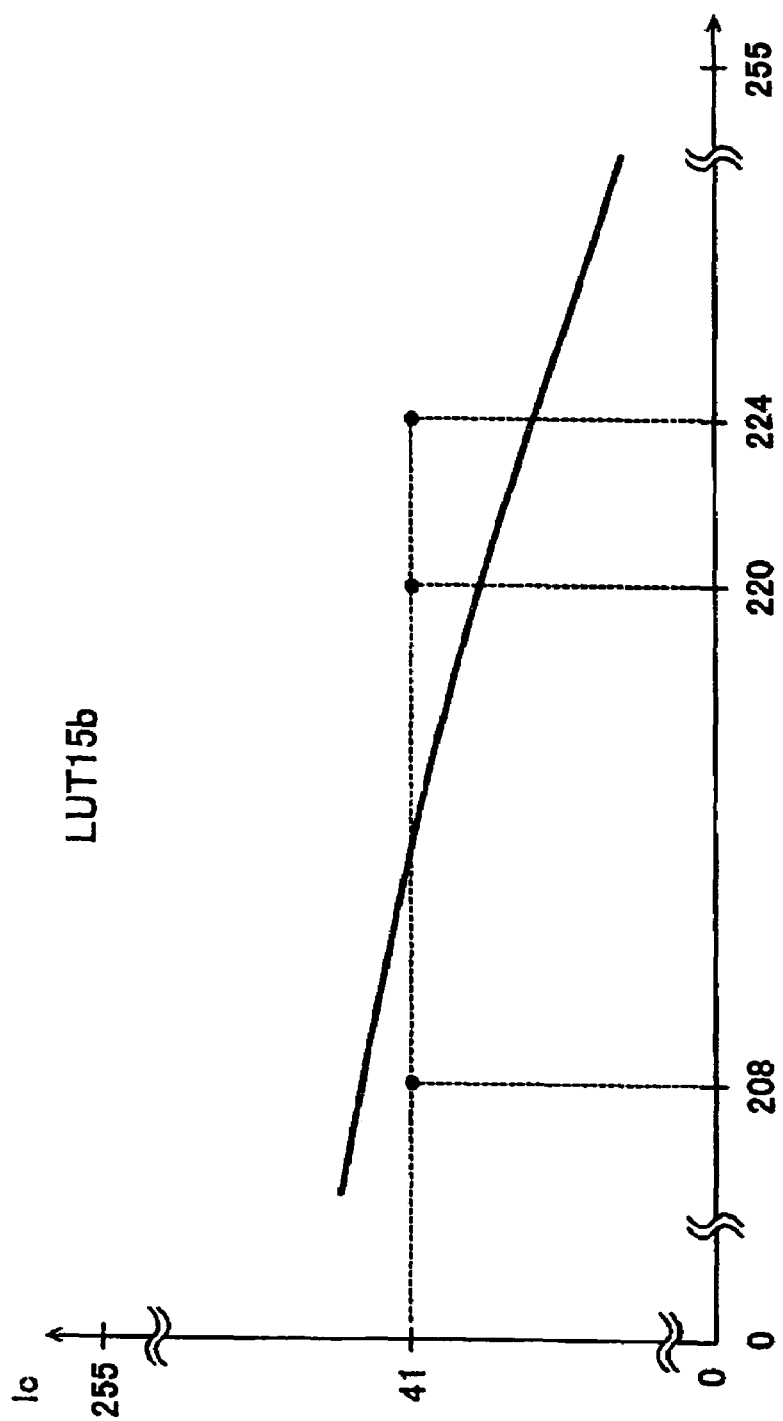
FIG. 15 shows ideal CMYKlclm gradation value data with reference to sRGB gradation value data for neutral gray.

FIG. 15 is an explanatory diagram illustrating a manner of computing the correspondence between sRGB and CMYKlclm gradation values by means of a linear interpolation. FIG. 15 further enlarges an area near sRGB gradation values 208 and 224 in FIG. 13. The correspondence for any color is determined by three-dimensionally observing LUT reference points and performing a linear interpolation using a triangular pyramid comprising the reference points. The two-dimensional description is provided here based on FIG. 15 for simplicity. As shown in FIG. 15, the LUT 15b allocates gradation value 41 for the lc ink to both sRGB gradation values 208 and 224. Accordingly, it is impossible to extract information that gradation values for the lc ink actually vary in sRGB gradations between both points. Even if a linear interpolation is performed for any sRGB in this area, e.g., sRGB gradation value 220, the corresponding gradation value for the lc ink becomes 41.

Figure 16:
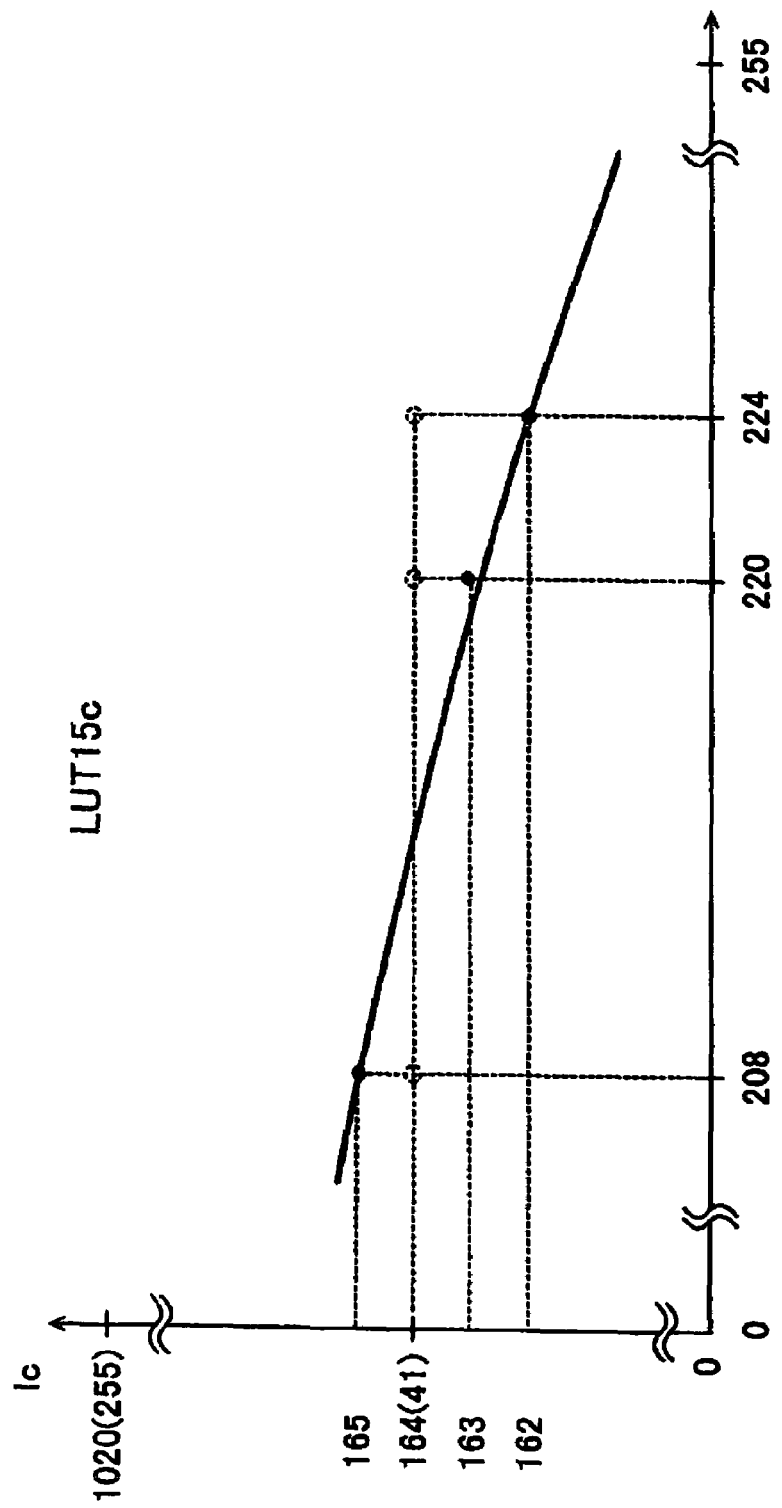
FIG. 16 shows ideal CMYKlclm gradation value data with reference to sRGB gradation value data for neutral gray.

FIG. 16 is an explanatory diagram showing an interpolation for the LUT 15c. Like FIG. 15, FIG. 16 enlarges an area near sRGB gradation values 208 and 224 in FIG. 13. The LUT 15c defines lc ink's gradation value 165 for sRGB gradation value 208; lc ink's gradation value 162 for sRGB gradation value 224. It is possible to perform an interpolation by reflecting an ideal variation of the lc ink. The linear interpolation finds a weighted average of lc ink's gradation values 165 and 162 using, as weights, relative differences between sRGB gradation values 208 and 220 and between sRGB gradation values 224 and 220. As a result, gradation value 163 is computed for sRGB gradation value 220. This value is very approximate to the lc ink's ideal gradation value for sRGB gradation value 220.

In this manner, increasing the gradation range of CMYKlclm data improves the accuracy of the LUT itself and the interpolation accuracy, making it possible to highly accurately perform the color conversion. A highlighted portion especially indicates an effect of improving the color conversion accuracy. The highlighted portion is an area that has a large sRGB gradation value in FIG. 12. This area just uses the lmlc Y inks whose gradation values are small, requiring a small amount of ink ejection during printing. Accordingly, it is necessary to express color changes in response to gradation value changes by means of changes in a small amount of ink. A large ink gradation range can provide the LUT that appropriately reflects fine changes in the ink amount. While FIG. 12 concerns the achromatic color, the accuracy improvement is obviously very effective at highlighted portions for chromatic colors as well.

Like the present invention, the configuration to increase the ink gradation range greatly contributes not only to accuracy improvement of the highlighted portion, but also to accuracy improvement of medium-brightness areas and a shadow portion. Since a large amount of K ink is ejected to the shadow portion, saturation changes are hardly perceptible to human eyes. On the other hand, even slight changes in the brightness can be perceived. It is necessary to control fine brightness gradations so as to obtain printout results with high image quality. Since the present invention highly accurately defines CMYK ink's gradation values, the present invention also can greatly contribute to accuracy improvement of the shadow portion.

A high-resolution printer remarkably shows an effect of the accuracy improvement by increasing the ink gradation range. Further, comparison between the LUT 15$b$ and the LUT 15$c$ gives an effect of the accuracy improvement to many printers without improving resolutions of the printers themselves. The halftone process module 21$c$ performs a halftone process for the printer 40. The halftone process greatly affects the gradation expression by means of ink droplets. The halftone process uses the so-called dither method or error diffusion method. These process methods determine whether or not to eject dots by using a specified threshold value for gradation values of CMYKlclm data. The gradation after the process is subject to a great effect depending on whether the threshold value is available for 256 gradations (LUT 15$b$) or more gradations (LUT 15$c$).

Figure 17:
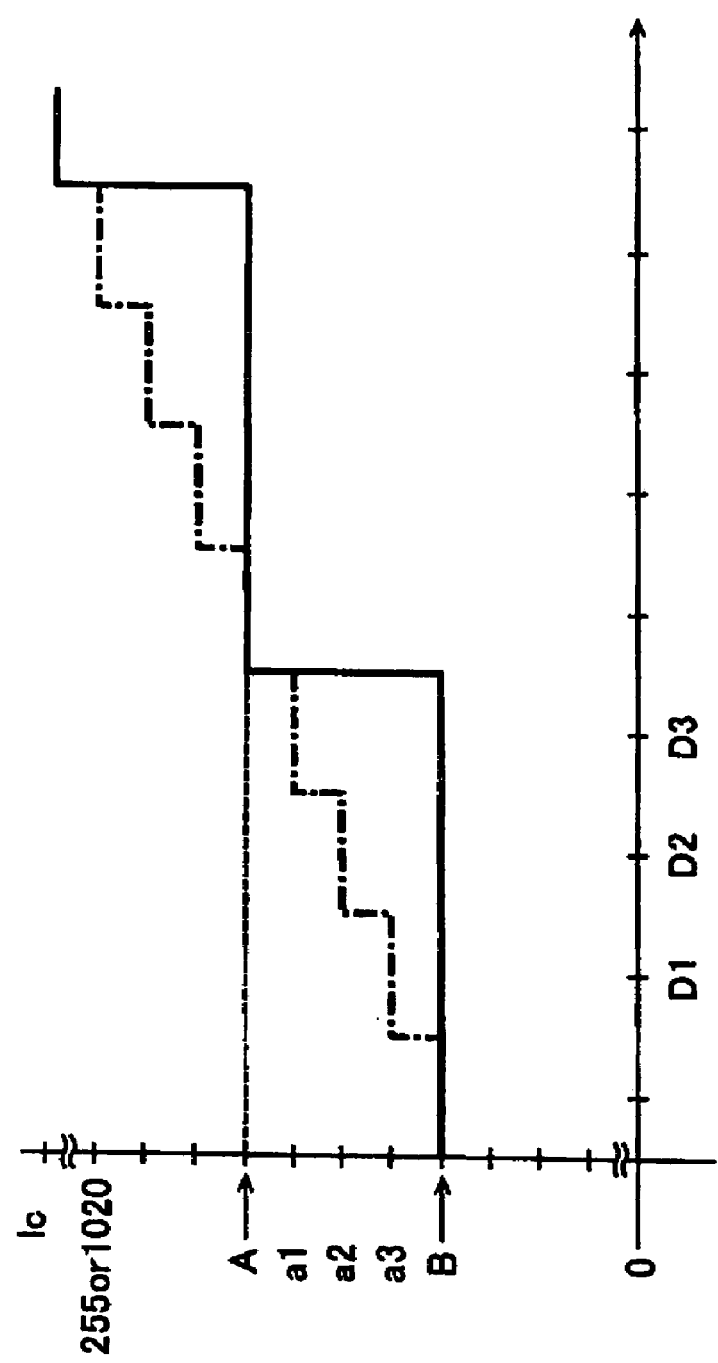
FIG. 17 is an explanatory diagram showing accuracy improvement on the same printer.

FIG. 17 is an explanatory diagram showing a smooth gradation after the halftone process that uses threshold values greater than 256 gradations. A solid line in FIG. 17 one-dimensionally depicts ink gradation values for 256 gradations applied to an image. The abscissa axis shows an array of dots. The ordinate axis shows ink gradation values. A dot-dash line indicates an ink gradation for 1024 gradations. When the ink gradation values belong to 256 gradations, threshold values for the halftone process also belong to 256 gradations. The threshold values are marked with A and B in FIG. 17. When the ink gradation values belong to 1024 gradations, the ink gradation values vary more smoothly than for 256 gradations. The threshold values can be assigned to a1 through a3 between A and B.

When threshold values are defined between A and B for 1024 gradations, it is possible to very finely determine threshold values for dots D1 through D3. In the case of 256 gradations, the threshold value is just A or B, causing coarser determination than 1024 gradations. After the halftone process, the condition whether or not to eject dots may be reversed completely. This difference has a great effect on the image quality when the printed image is viewed macroscopically. As a result, a larger gradation range can provide finer gradation expression.

(6) Second Embodiment

Figure 18:
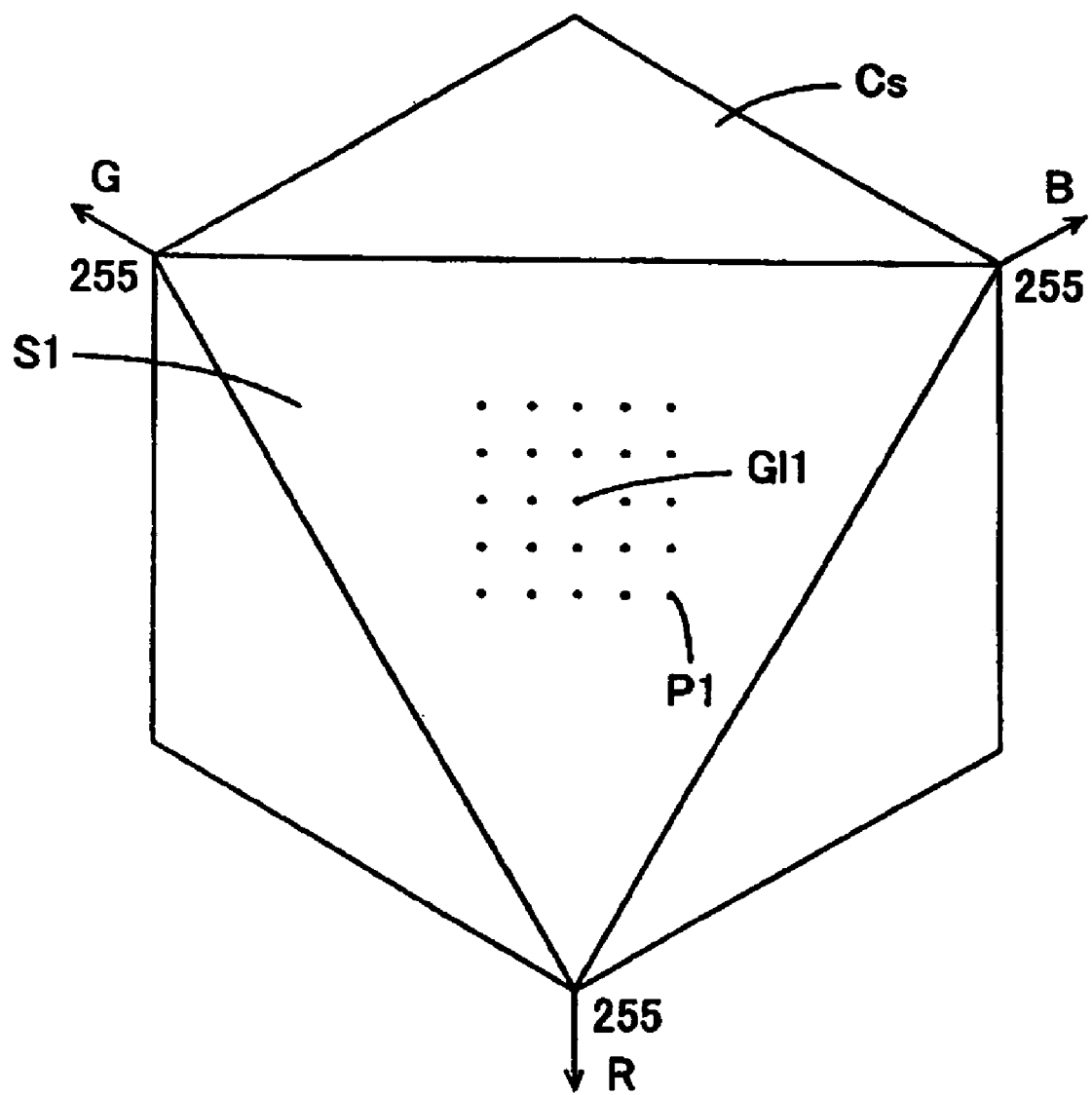
FIG. 18 is a cross sectional perspective view showing the color solid in the sRGB space viewed along a gray axis.
Figure 19:
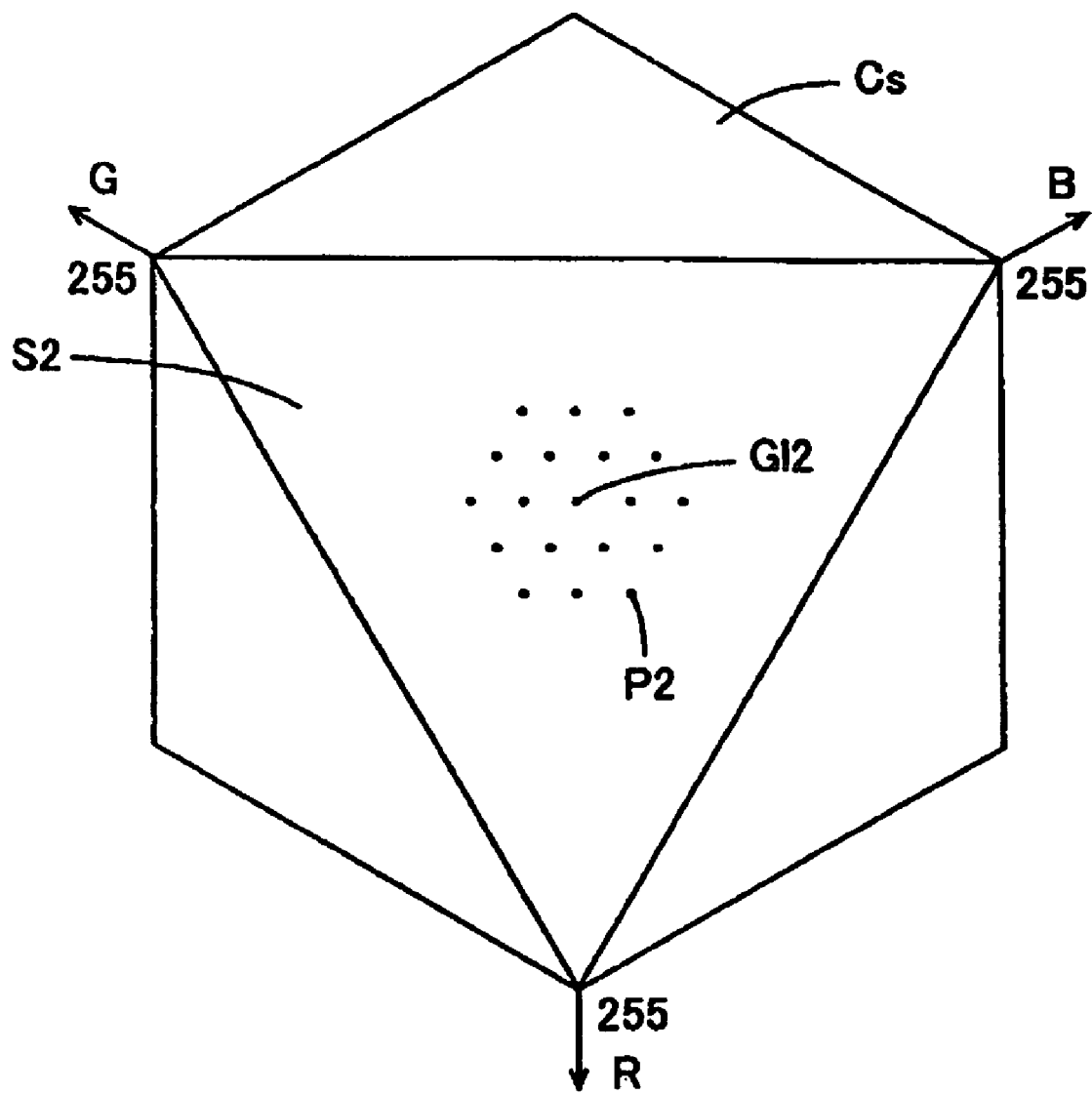
FIG. 19 is a cross sectional perspective view showing the color solid in the sRGB space viewed along a gray axis.

As mentioned above, the present invention just needs to define colors for reference points with more gradations by decreasing the number of reference points in the LUT. There are available various techniques for decreasing the number of reference points in the LUT in addition to the above-mentioned technique that extracts several to over ten reference points near the gray axis from the reference points in the LUT 15$b$ by assuming the color solid in the sRGB space to be a cubic lattice. FIGS. 18 and 19 illustrate techniques of defining reference points in the LUT 15$c$ independently of reference point positions in the LUT 15$b$ and providing a smaller number of reference points than that of the LUT 15$b$.

FIGS. 18 and 19 are perspective views showing a color solid Cs in the sRGB space. The color solid Cs is cut on a plane crossing three points (RGB)=(0,0,255), (0,255,0), and (255,0,0), and is viewed from the origin 0 along the gray axis. FIG. 18 extracts 5-by-5 square lattice points P1 around a center G11 of a cross section S1. In this manner, the lattice points P1 can be defined at any positions independently of the reference points in the LUT 15$b$. The lattice points P1 can be easily adjusted to include colors needed for a monochrome area. For example, it is easy to appropriately adjust an interval between the lattice points P1 so as to improve the color conversion accuracy in the monochrome area.

FIG. 19 extracts lattice points P2 at positions corresponding to vertexes and sides and a center G12 of a hexagon formed around the center G12 of a cross section S2. Also in this case, the lattice points P2 can be defined at any positions independently of the reference points in the LUT 15$b$. It is possible to extract lattice points approximately symmetric with reference to the center G12, making it possible to more easily cover a monochrome area according to the present invention. In FIGS. 18 and 19, the color solid narrows at both ends of the gray axis. Modifications can be appropriately made to both ends in such a manner as to narrow an interval between the lattice points P1 and P2 or incorporate lattice points by deforming the square lattice or the hexagonal lattice.

(7) Third Embodiment

Figure 20:
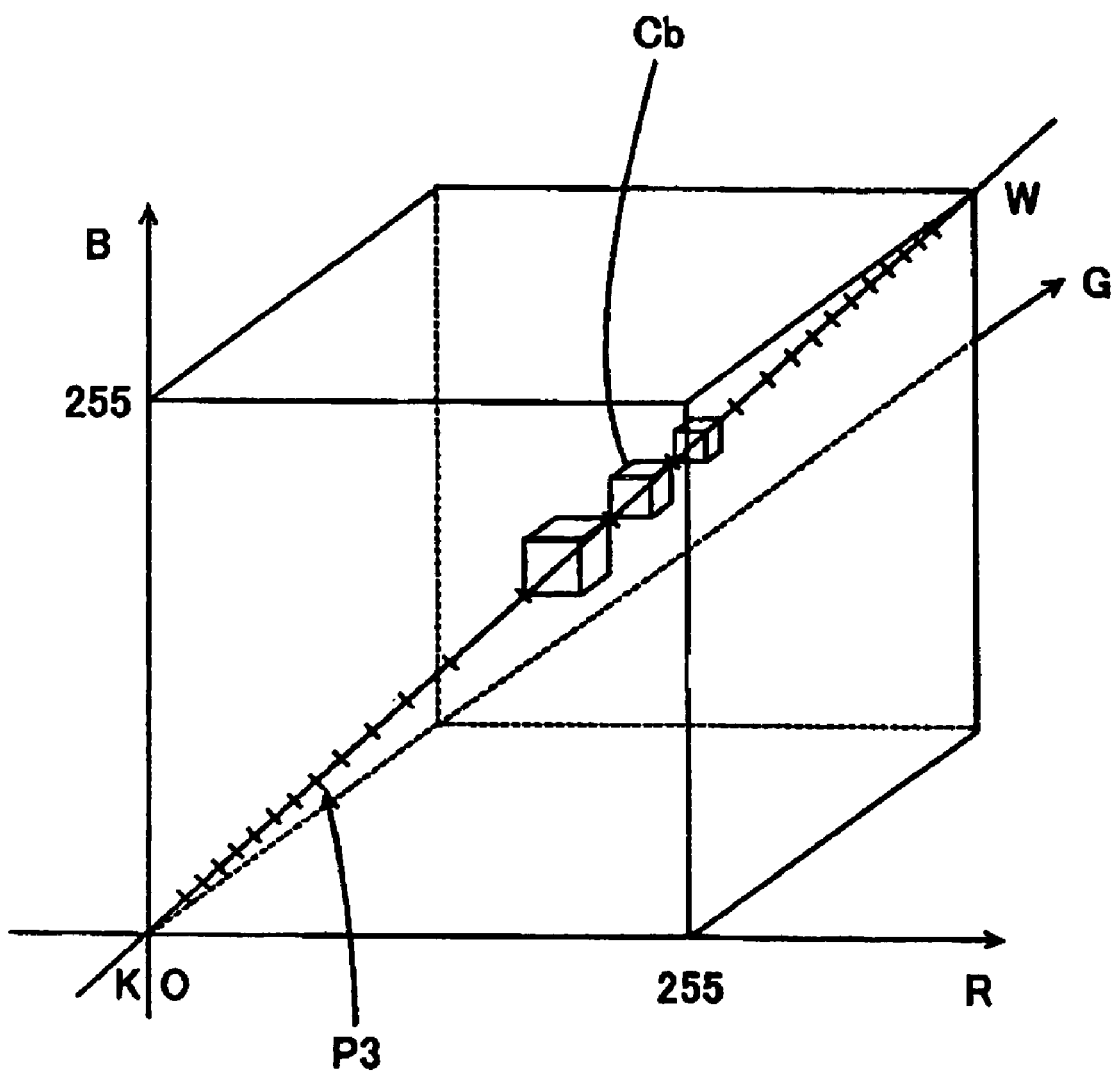
FIG. 20 is a perspective view showing color solids in the sRGB space.

When the number of reference points in the LUT is decreased, the present invention enables to freely determine positions of the reference points. It is possible to further improve the color conversion accuracy in a monochrome area by appropriately changing positions of the reference points. FIG. 20 shows how to select reference points so as to improve the color conversion accuracy for the entire monochrome image by using more reference points in the highlighted portion and the shadow portion than in a medium-brightness area. FIG. 20 is a perspective diagram showing a color solid in the sRGB space having a gray axis comprising a line connecting a black point K (origin 0) and a white point W.

Figure 21:
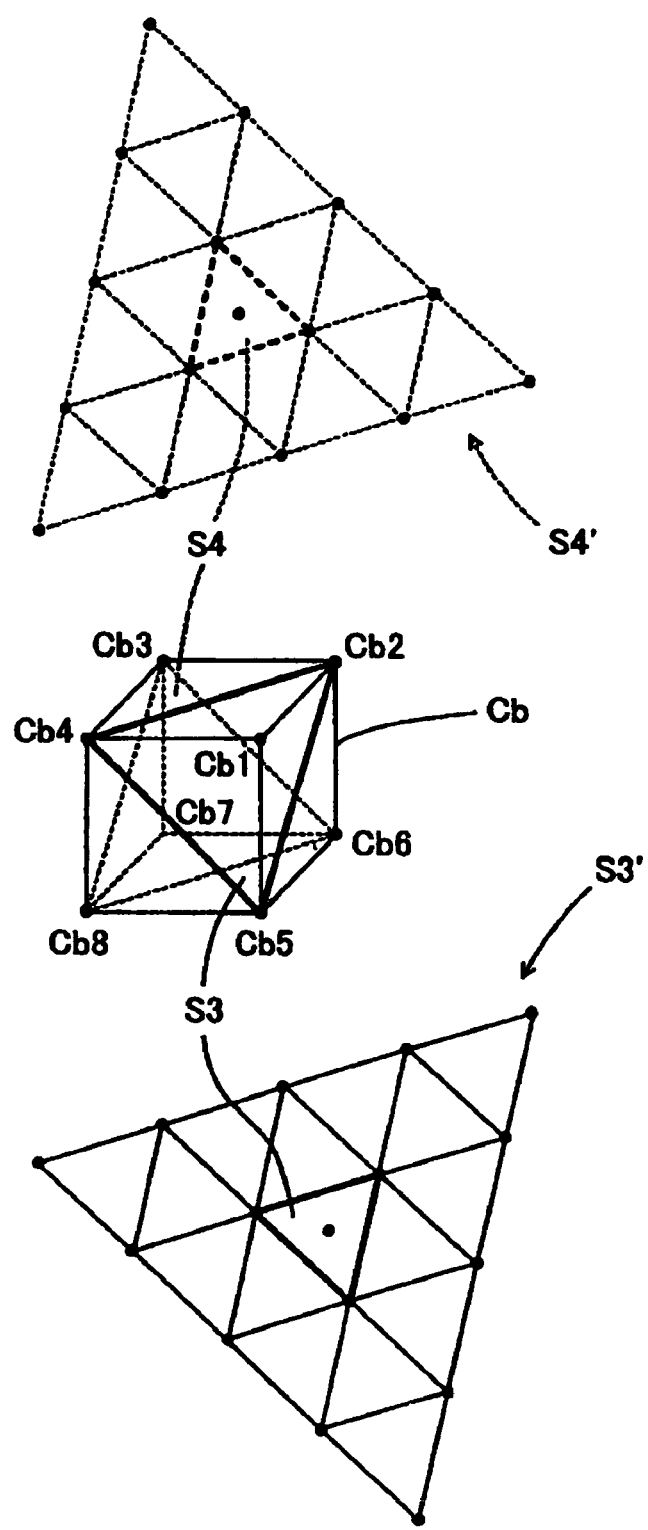
FIG. 21 is a perspective view showing a cube formed along the gray axis.

Points P3 on the gray axis in FIG. 20 belong to a plurality of coordinate points extracted as reference points in the LUT 15$c$ on the gray axis. An interval between the points P3 is configured to narrow as the points approach both ends of the gray axis. The reference points around the gray axis are selected on the basis of a plurality of cubes Cb whose opposite vertexes allow the gray axis to pass. FIG. 21 is a perspective view showing one of the cubes Cb. FIG. 21 shows vertexes Cb1 through Cb8 of the cube Cb and vertexes Cb1 and Cb7 on the gray axis.

The embodiment assumes a plurality of planes orthogonal to the gray axis and extracts reference points on the planes. One of the planes is a plane S3 containing a triangle formed by the vertexes Cb2, CM, and Cb5 of the cube Cb. The vertexes Cb2, Cb4, and Cb5 are reference points on the plane S3. The plane S3 is expanded to form a plane S3' so as to extract more reference points by adjacently arranging triangles each of which has the same size as the triangle formed by the vertexes Cb2, Cb4, and Cb5. As shown in FIG. 21, triangles are placed on the plane S3' to extract vertexes of the triangles as the reference points for the LUT 15c. The same concept is applied to a plane S4 containing a triangle formed by the vertexes Cb3, Cb6, and Cb8 of the cube Cb. The plane S4 is expanded to form a plane S4' comprising triangles whose vertexes are extracted as reference points.

The above-mentioned configuration extracts vertexes of triangles on the planes S3' and S4' as reference points. Since an interval between the vertexes Cb1 and Cb7 of the cube Cb varies with a position of the gray axis in this configuration, intervals between reference points on the planes S3' and S4' also vary. Since there is a small distance between the vertexes Cb1 and Cb1 of the cube Cb near the highlighted portion or the shadow portion, each plane of the cube Cb will also have a short diagonal (e.g., Cb2-Cb4). Accordingly, small triangles are formed on the planes S3' and S4', resulting in a narrow interval between reference points. A narrow interval between reference points allows interpolations such as a triangular pyramid interpolation by referencing spatially approximate reference points, improving the interpolation accuracy.

The above-mentioned configuration is an example. The present invention may be configured to narrow an interval between points P3 on the gray axis only for the highlighted portion or the shadow portion. When a position approaches the end of the gray axis too much to ensure the plane S3' or S4' around the gray axis, it is possible to decrease the number of triangles formed on the plane S3' or S4'. Alternatively, it is possible to appropriately change reference point positions by parallel moving these positions along the gray axis.

(8) Fourth and Fifth Embodiments

Figure 22:
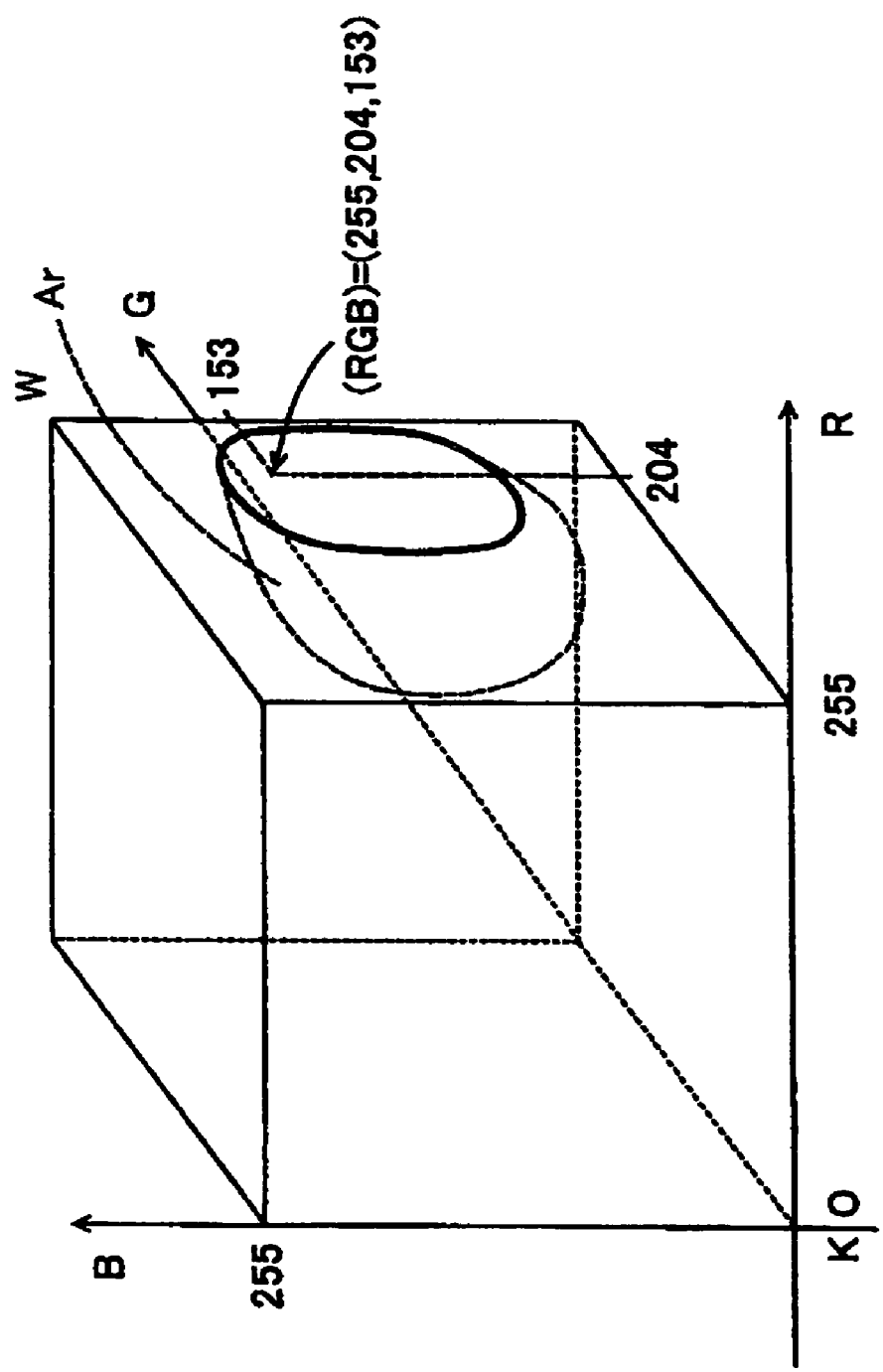
FIG. 22 is a perspective view showing color a solid in the sRGB space.
Figure 23:
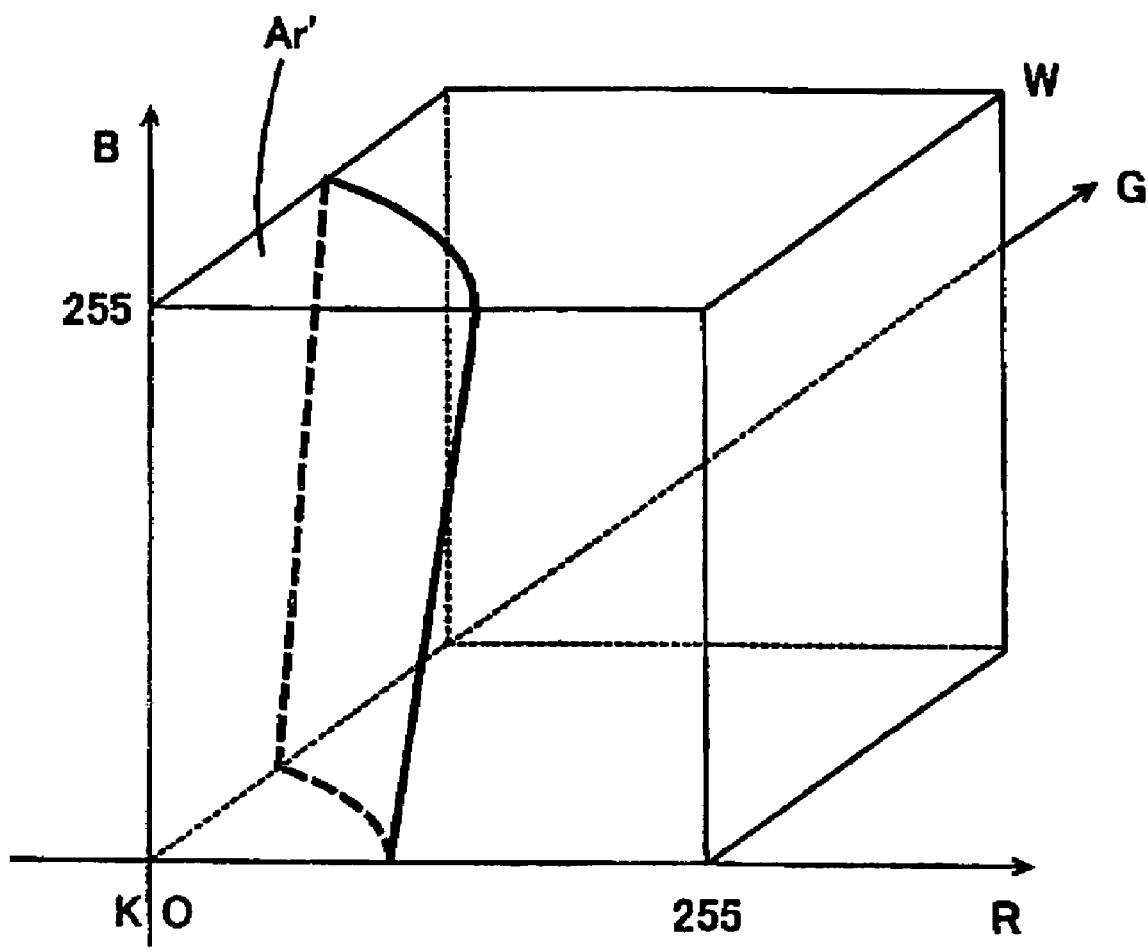
FIG. 23 is a perspective view showing color a solid in the sRGB space.

The present invention just needs to define colors for reference points with more gradations by decreasing the number of reference points in the LUT. A prescribed area to which the reference points having many gradations is not limited to the above-mentioned monochrome area. For example, such prescribed area can be an area that contains a flesh color requiring highly accurate color conversion so as to obtain excellent image quality or an area that contains a blue color capable of brilliant coloring by more efficiently using a color gamut of a printing apparatus. FIGS. 22 and 23 each show a color solid in the sRGB space formed in an orthogonal space whose axis represents each of RGB colors. FIG. 22 ensures a prescribed area that contains the flesh color. FIG. 23 ensures a prescribed area that contains the blue color.

A prescribed area Ar in FIG. 22 contains the flesh color (R=255, G=204, B=153), not only the flesh color itself, but also near-flesh colors. That is to say, the area Ar is a solid body containing RGB values for the flesh color and relatively many colors whose B and G components are few with reference to the flesh color. Various techniques are available for selecting reference points in the area Ar. For example, the area Ar is cut into a plurality of planes parallel to the GB plane to select a plurality of reference points on the cross section. Alternatively, there is assumed a specified curve piercing the area Ar therein to select several to over ten reference points around the curve.

Let us assume the storage area for the conventional three-dimensional LUT to be a limit to the total information amount. Limiting the area Ar in the sRGB space provides a storage capacity equivalent to the saved information amount. This storage capacity can be used to express colors for reference points in the area Ar according to more gradations, enabling more accurate color conversion. When the color conversion table is configured to enable the conversion so that the flesh color changes more smoothly, it is possible to express fine changes of the flesh color on a digital camera image containing a human being. This can provide better image quality to images after the color conversion. Of course, the area Ar in FIG. 22 is an example. It is possible to, for example, widen or narrow the shape in FIG. 22 in accordance with the number of reference points, the total information amount, and the like that are requested.

A prescribed area Ar' in FIG. 23 contains the blue color and spreads around a B axis comprising any B component and R=G=0. The area Ar' contains not only the blue color itself, but also near-blue colors. Various techniques are available for selecting reference points in the area Ar'. For example, the area Ar' is cut into a plurality of planes parallel to the RG plane to select a plurality of reference points on the cross section. Alternatively, there is assumed a specified straight line piercing the area Ar' therein to select several to over ten reference points around the straight line.

Also in this case, limiting the area for selecting reference points provides a storage capacity equivalent to the saved information amount. This storage capacity can be used to express colors for reference points according to more gradations, enabling more accurate color conversion. When the color conversion table is configured to associate the blue color with a more brilliant color, the color conversion becomes available so as to produce a brilliant blue that cannot be expressed on a display or a digital camera. It is possible to provide better image quality after the color conversion to images that contain a large proportion of the sea or green leaves. Of course, the area Ar' in FIG. 23 is an example. It is possible to, for example, widen or narrow the shape in FIG. 23 in accordance with the number of reference points, the total information amount, and the like that are requested.

(9) Sixth Embodiment

Figure 24:
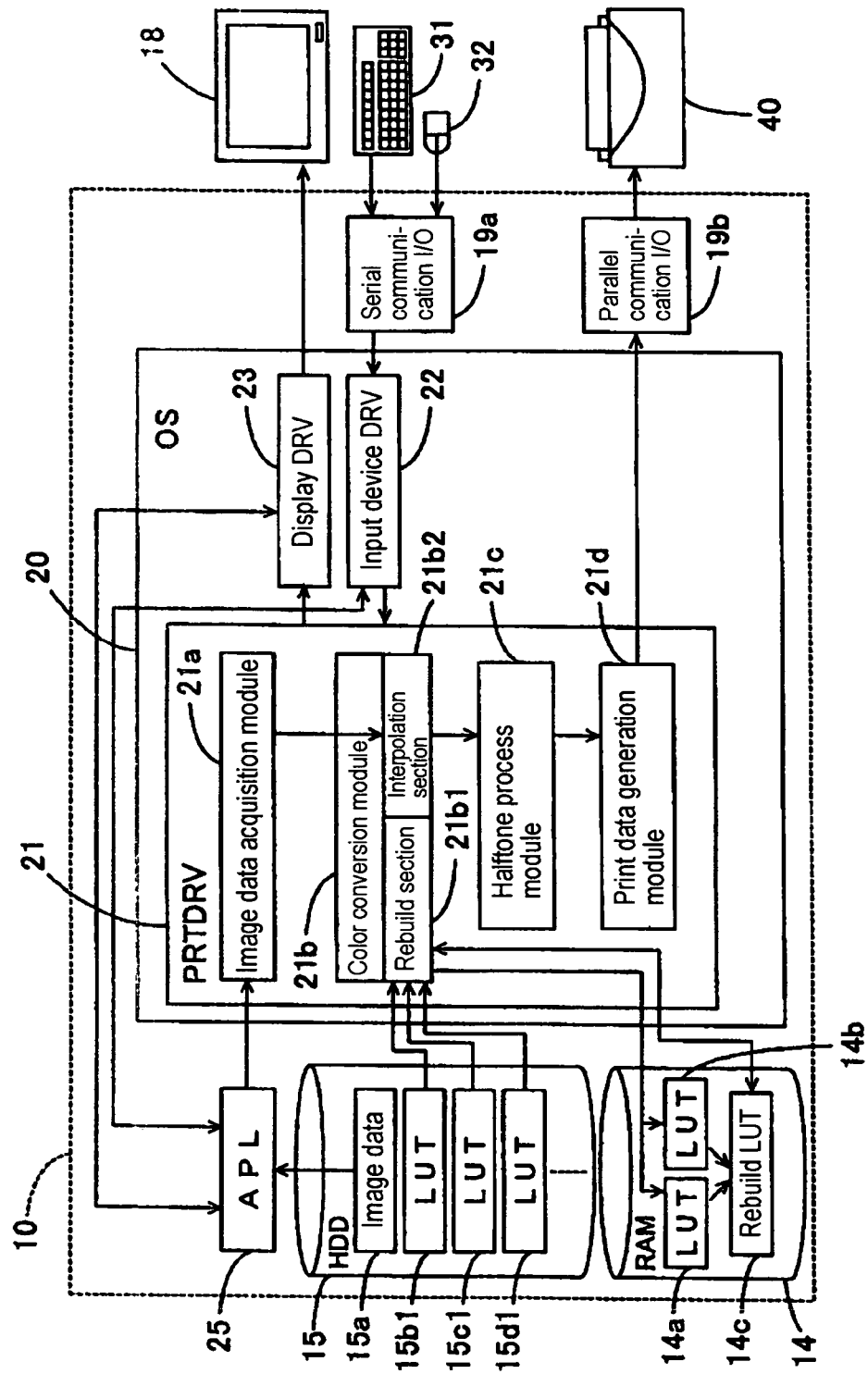
FIG. 24 shows a schematic configuration with a color conversion table creation program implemented as a color conversion module.

Further, the present invention can configure the sixth embodiment so as to suppress the necessary storage amount and enable highly accurate printing. The sixth embodiment controls printing by using data that highly accurately defines colors for part of a color space. The sixth embodiment can be implemented by a configuration similar to the hardware scheme as shown in FIG. 1. When the hardware uses the configuration in FIG. 24, it is possible to implement printing by using a color conversion table capable of highly accurate color conversion. The mutually corresponding parts in FIGS. 24 and 2 are designated by the same reference numerals. While the first embodiment has described the use of six ink colors for the printer 40, the sixth embodiment will describe the use of four ink colors.

Figure 25:
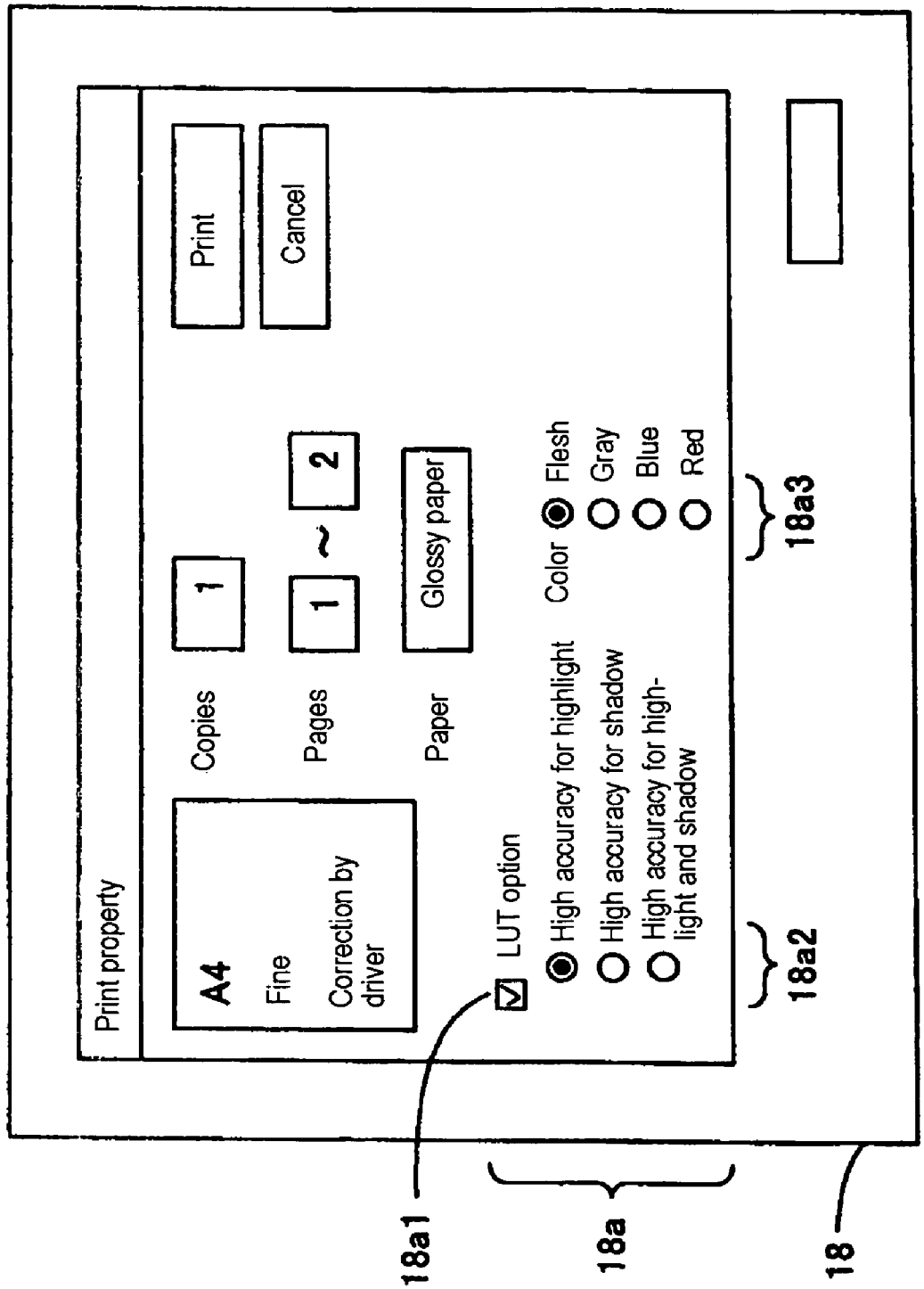
FIG. 25 shows a print property screen.

Also in the sixth embodiment, the APL 25 issues a print instruction to drive the PRTDRV 21. The PRTDRV 21 sends data to the display DRV 23 to display a UI for entering information needed for printing. FIG. 25 shows a print property screen as the UI. The PRTDRV 21 accepts various information inputs via the input device DRV 22. The print property screen in FIG. 25 allows input of various parameters to be specified for printing. The print property screen contains various input boxes for entering the number of copies and the number of pages and various buttons for performing print or cancel instructions. At the bottom of the property screen, there is provided an option selection area 18a for selecting an LUT to be used for creating a rebuild LUT.

According to the embodiment, the HDD 15 stores a plurality of LUTs 15b1 through 15n1 as the original tables. During the color conversion, the color conversion module 21b of the PRTDRV 21 creates a rebuild LUT as the color conversion table in the RAM 14 and references the rebuild LUT to perform the color conversion. By default, a rebuild LUT is created without using a highly accurate LUT. Selecting an option allows the rebuild LUT to be created through the use of a highly accurate LUT.

There is provided an LUT that specifies colors with 8-bit gradations and has 17**3 reference points evenly almost all over the color space. There is provided another LUT that is highly accurate at particular areas in the color space and specifies colors with 16-bit gradations at the particular areas. There is provided still another LUT that has a high density of reference points at the particular areas. There is provided yet another LUT that specifies colors with 16-bit gradations at particular areas and has a high density of reference points. The option selection area 18a comprises: an LUT option selection check box 18a1 to specify whether or not to create a color conversion table according to the present invention; a radio button 18a2 to select whether to use a highly accurate LUT for the highlighted portion, the shadow portion, or both; and a radio button 18a2 to select whether to use a highly accurate LUT for the flesh, gray, blue, or red color area.

As will be discussed in more detail below, selecting "high accuracy for highlight" with the radio button 18a2 uses a high accuracy LUT that specifies colors in 16-bit gradations. Selecting "high accuracy for shadow" uses a high accuracy LUT that has a high density of reference points. Selecting "high accuracy for highlight and shadow" uses a high accuracy LUT that specifies colors in 16-bit gradations and has a high density of reference points.

There is provided a plurality of high accuracy LUTs that specify the flesh, gray, blue, and red colors and the other colors included in the peripheral prescribed area. When the radio button 18a3 selects a color, a high accuracy LUT corresponding to the selected color is selected. Of course, the configuration according to the embodiment is an example. The option selection area 18a is not limited to the display contents in FIG. 25. It may be preferable to more explicitly display the 16-bit LUT, the high accuracy LUT, and the like. The configuration may be able to select a plurality of colors at a time instead of selecting a single color. Further, various configurations can be used to select the LUTs by not only using the print property screen controlled by the PRTDRV 21, but also displaying a specified setup screen as a function of the APL 25.

In any case, the embodiment can perform the color conversion using the rebuild LUT created with or without using a high accuracy LUT. The embodiment can select high accuracy LUTs to be used. The embodiment can be also configured to create different LUTs for media and ink sets available for the printer 40 and make the LUTs selectable. In the embodiment, the image data 15a is sRGB-standard compliant dot matrix data that expresses RGB color components in gradations. The LUT is a table that keeps correspondence between gradation values for the sRGB and gradation values for four CMYK colors used on the printer 40.

In the embodiment, the sRGB-standard compliant data is the first color image data used for the first image device (display 18). The CMYK data is the second color image data used for the second image device (printer 40). Each color defining the correspondence between both is a reference point in the LUT. The above-mentioned gray includes low-saturation colors, i.e., not only so-called neutral gray comprising achromatic color, but also colors having some saturation such as the warm tone or the cool tone.

(10) LUT Configuration According to the Sixth Embodiment

Figure 26:
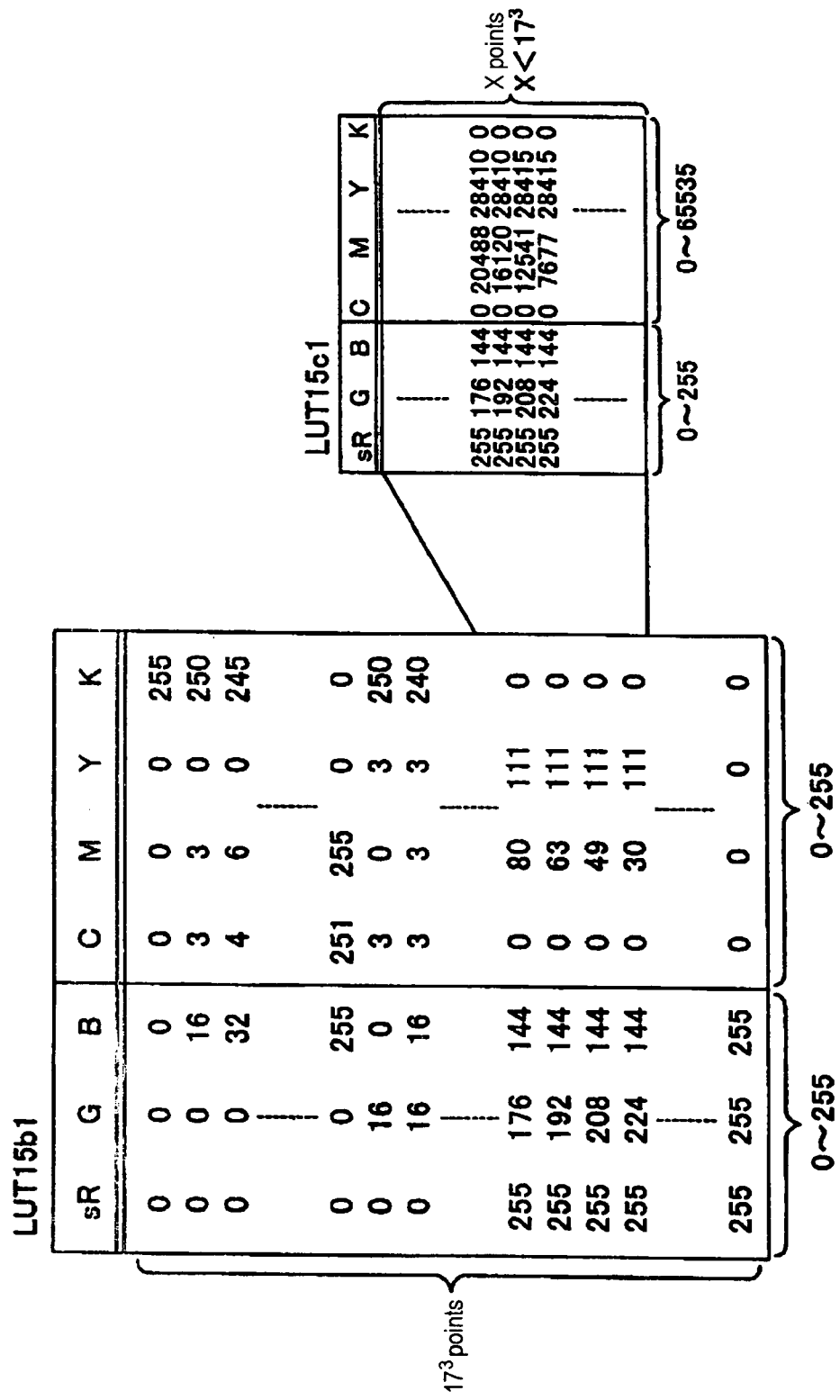
FIG. 26 shows an LUT example.

FIG. 26 exemplifies LUTs stored in the HDD 15. On the left of FIG. 26, there is shown an LUT 15b1 that specifies colors with 8-bit gradations and has 17**3 reference points. On the right of FIG. 26, there is shown an LUT 15c1 that is highly accurate on part of the color area and specifies colors with 16-bit gradations in the part of the color area. The LUT 15c1 uses 16-bit gradations to specify colors included in a flesh color area.

Figure 27:
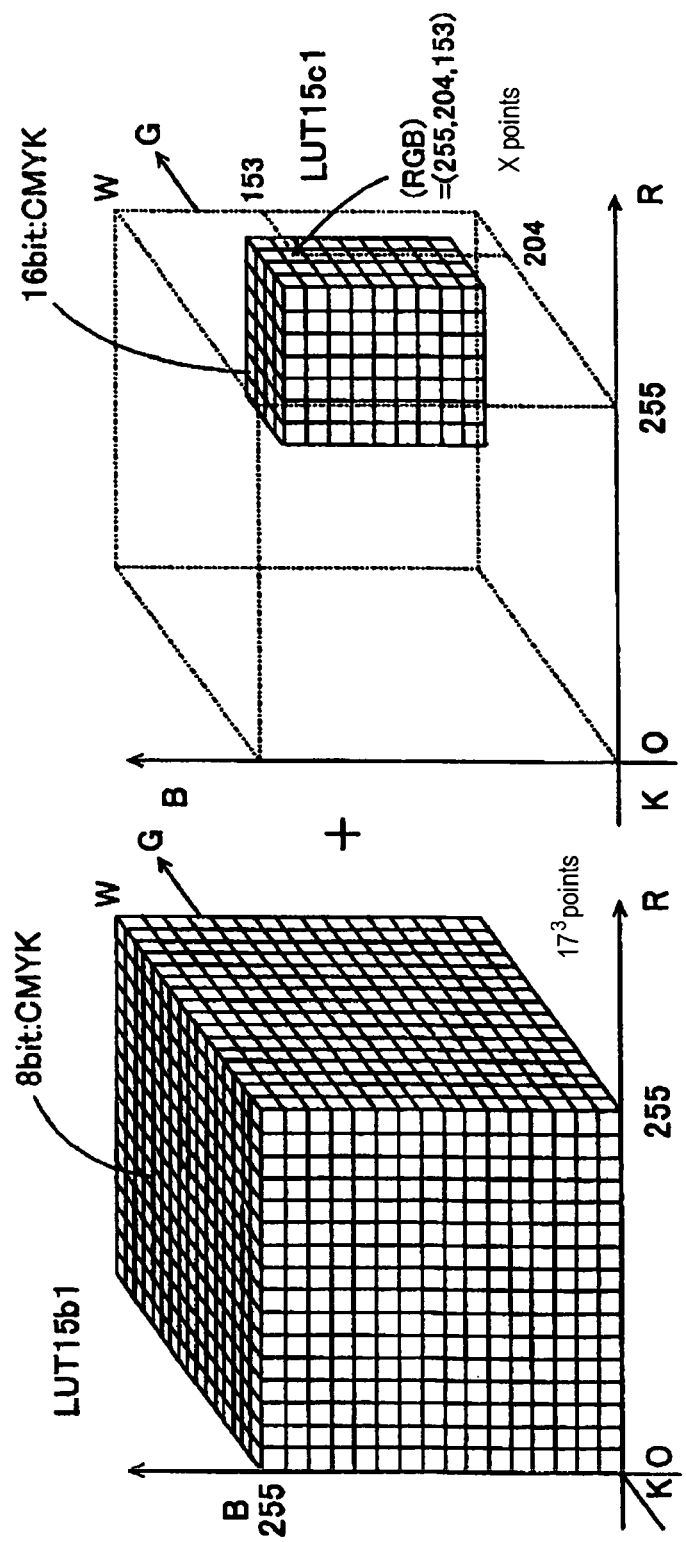
FIG. 27 is a perspective view showing a color solid in the sRGB space.

As shown in FIG. 26, the LUT 15b1 contains RGB data and CMYK data each containing values 0 through 255. Each color provides 256 gradations (8 bits). For each RGB component of sRGB data, gradation values are evenly divided into 16 to form reference points. A color solid defined in sRGB space is formed in the orthogonal space using axes corresponding to RGB colors. As shown on the left of FIG. 27, each axis of the color solid is given 17 lattice points to configure cubic lattices that work as reference points. Therefore, there are 173 reference points in total. The LUT 15b1 defines correspondence between sRGB data and CMYK data with reference to 173 colors. In FIG. 27, origin 0 indicates black point K. A vertex opposite origin 0 represents white point W. Colors along a line (gray axis) connecting both points become achromatic.

As shown on the right of FIG. 26, the LUT 15c1 maintains RGB data each containing values 0 through 255. Each color provides 256 gradations. The CMYK data is increased to have values 0 to 65535 with each color having 65536 gradations. That is to say, each CMYK color can be more finely tuned. The embodiment defines the number of reference points x in the LUT 15c1 to be x<17**3. The embodiment decreases the number of reference points instead of increasing the gradation range for the CMYK data. That is to say, this prevents an unnecessary increase of the storage capacity needed for storing the LUT 15c1.

The right side of FIG. 27 shows a solid formed in the sRGB space by plotting reference points defined for the LUT 15c1. The LUT 15c1 has the same interval between reference points as that for the LUT 15b1. As shown in FIG. 27, reference points for the LUT 15c1 distribute in the prescribed area around the flesh color (R, G, B)=(255, 204, 153). The LUT 15c1 can be used to create a rebuild LUT capable of highly accurately converting colors in the prescribed area.

Figure 28:
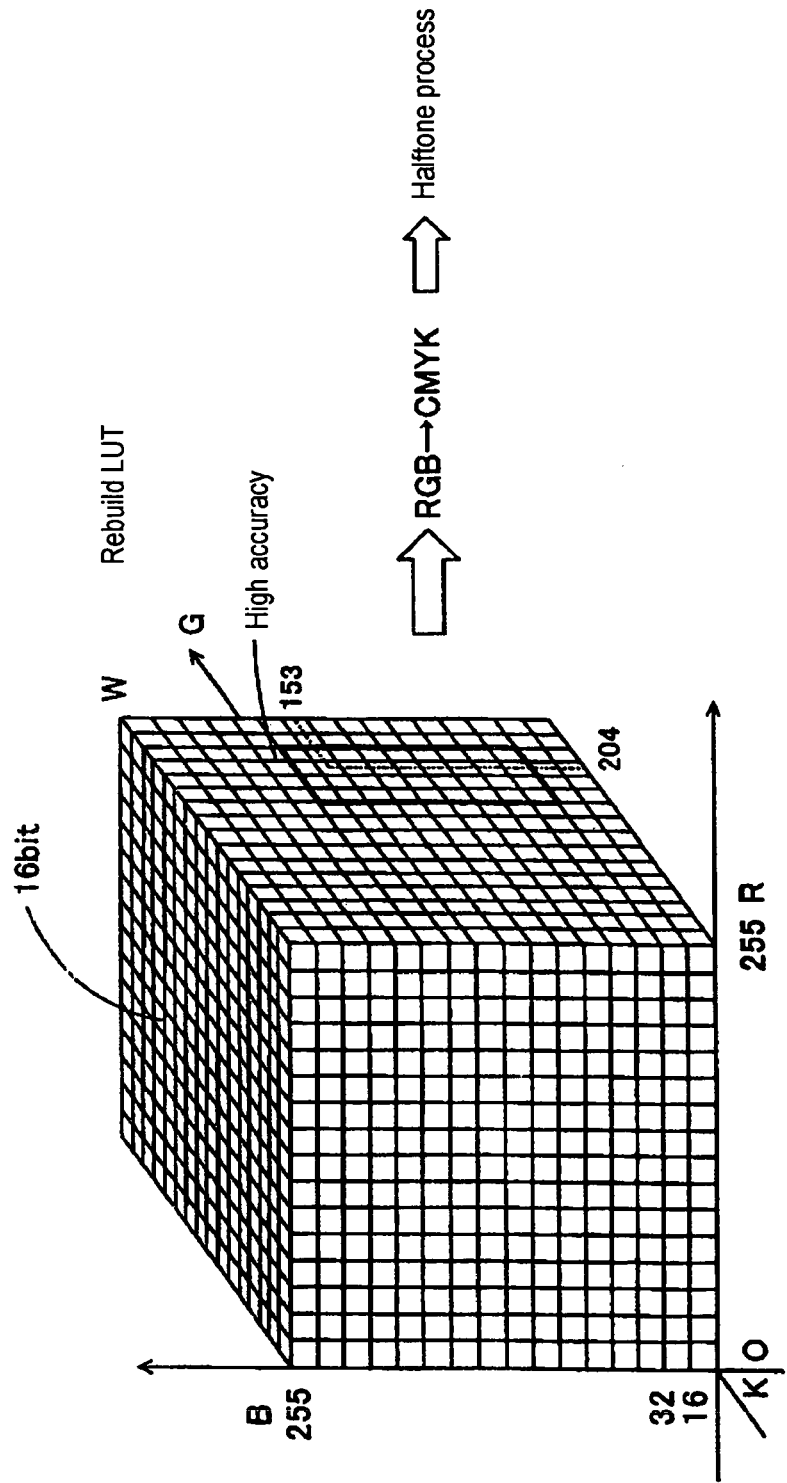
FIG. 28 is a perspective view showing a color solid in the sRGB space.

The LUTs 15b1 and 15c1 maintain the same interval between reference points and the different number of gradations for defining colors. When a rebuild LUT is created in this case, the gradation values for CMYK data defined in the LUT 15b1 are multiplied by 256 to provide apparent 16-bit gradation values for all colors. The colors defined in the LUT 15c1 are overwritten by the LUT 15c1. As a result, as shown in FIG. 28, there is created a rebuild LUT that has 173 reference points and highly accurately defines colors in the prescribed area around the flesh color. The color conversion is performed to convert sRGB data into CMYK data by referencing the rebuild LUT. Thereafter, the halftone process is performed for printing. In this manner, it is possible to print an image that represents a smooth change in the flesh color and the other colors included in the peripheral prescribed area. It may be also preferable to perform a interpolation and the like for increasing 173 reference points to 33**3 reference points and then perform the color conversion.

Figure 29:
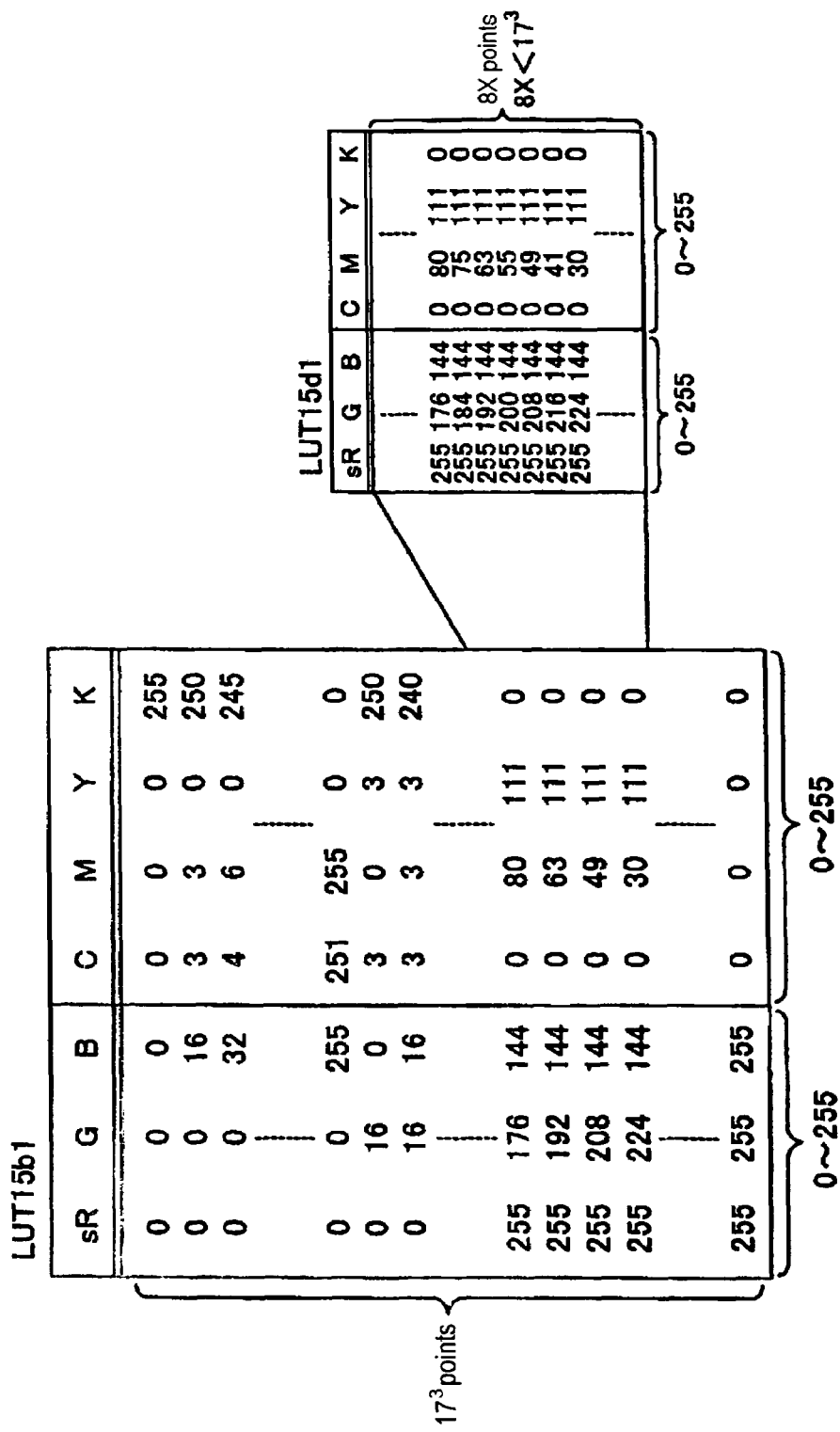
FIG. 29 shows an LUT example.

In addition to the above-mentioned LUT having increased gradations, a rebuild LUT can be created by combining an LUT 15d1 having an increased density of reference points for part of the color space with the LUT 15b1. In FIG. 29, the LUT 15b1 is shown on the left. On the right, there is shown an example of the LUT 15d1 that is highly accurate on a particular part of the color area and increases the lattice point density on that particular area. As shown on the right of FIG. 29, the LUT 15d1 contains RGB data and CMYK data each containing values 0 through 255. Each color provides 256 gradations. In addition, the reference point density increases. Compared to the LUT 15c1 on the right of FIG. 26, the LUT 15d1 contains reference points (R, G, B)=(255, 184, 144) in the middle of (R, G, B)=(255, 176, 144) and (R, G, B)=(255, 192, 144) as sRGB data. The LUT 15d1 has more reference points than the LUT 15c1.

Figure 30:
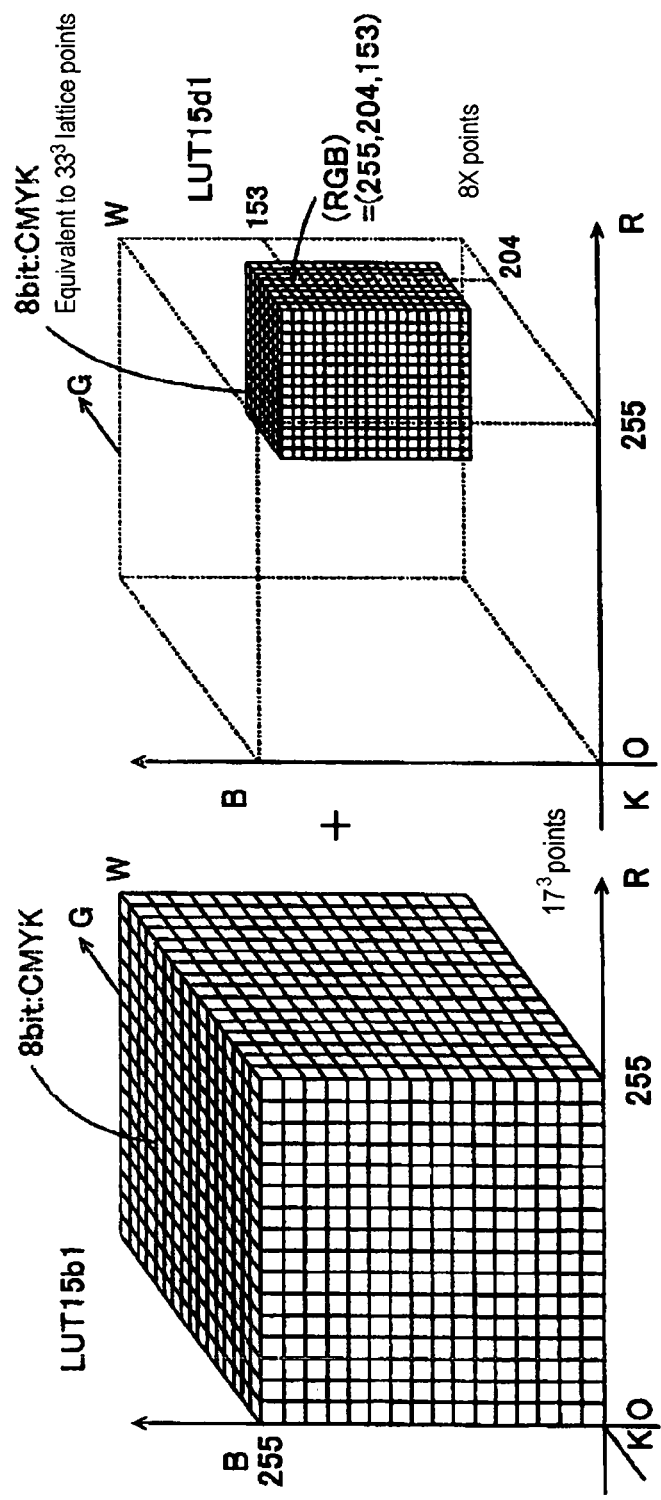
FIG. 30 is a perspective view showing a color solid in the sRGB space.

On the left of FIG. 30, there is shown a cubic lattice comprising reference points for the LUT 15b1 in the sRGB space. On the right of FIG. 30, there is shown a cubic lattice comprising reference points for the LUT 15d1 in the sRGB space. As shown on the right of FIG. 30, the cubic lattice comprising reference points for the LUT 15d1 has more constituent points in the middle of the cubic lattice comprising reference points for the LUT 15c1 shown on the right of FIG. 27, further increasing the density. That is to say, the LUT 15d1 is configured by further providing reference points at the middle along each axis for the reference points in the LUT 15c1. The entire sRGB space is provided with reference points at an interval equivalent to the cubic lattice configured by providing each axis with 33 lattice points. Accordingly, the space occupying the same area as the LUT 15c1 contains twice as many reference points along each side as the LUT 15c1, providing eight times as many reference points (8×) as the LUT 15c1 in total. It is assumed that 8×<17**3, preventing an unnecessary increase of the storage capacity needed for storing the LUT 15d1.

The LUT 15d1 can be used to create a rebuild LUT capable of highly accurately converting colors in an area containing reference points for the LUT 15d1. There may be a case where the sRGB space contains different reference point densities like the case of creating the rebuild LUT using the LUTs 15b1 and 15d1. In such case, a linear interpolation is performed to interpolate reference points having the low reference point density for the LUT 15b1 to generate 33**3 reference points in total and provide the same reference point interval as that for the LUT 15d1. The reference point data of the LUT 15d1 overwrites reference points in the interpolated LUT at the same positions as those in the LUT 15d1.

Figure 31:
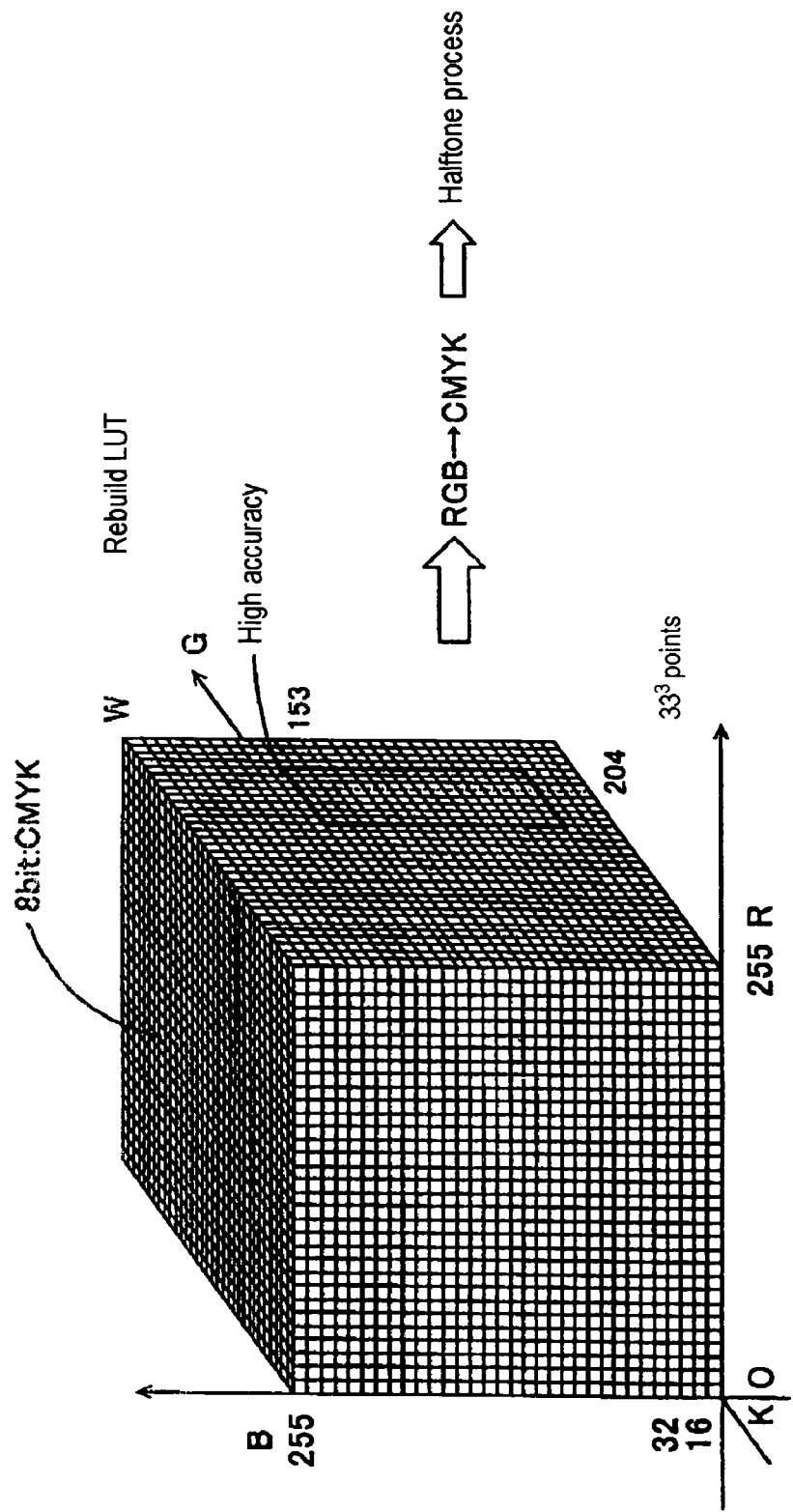
FIG. 31 is a perspective view showing a color solid in the sRGB space.

As a result, as shown in FIG. 31, there is created a rebuild LUT that has 33**3 reference points and uses each of these reference points to accurately define colors in a prescribed area near the flesh color. The color conversion is performed to convert sRGB data into CMYK data by referencing the rebuild LUT. Thereafter, the halftone process is performed for printing. In this manner, it is possible to print an image that represents a smooth change in the flesh color and the other colors included in the peripheral prescribed area.

Figure 32:
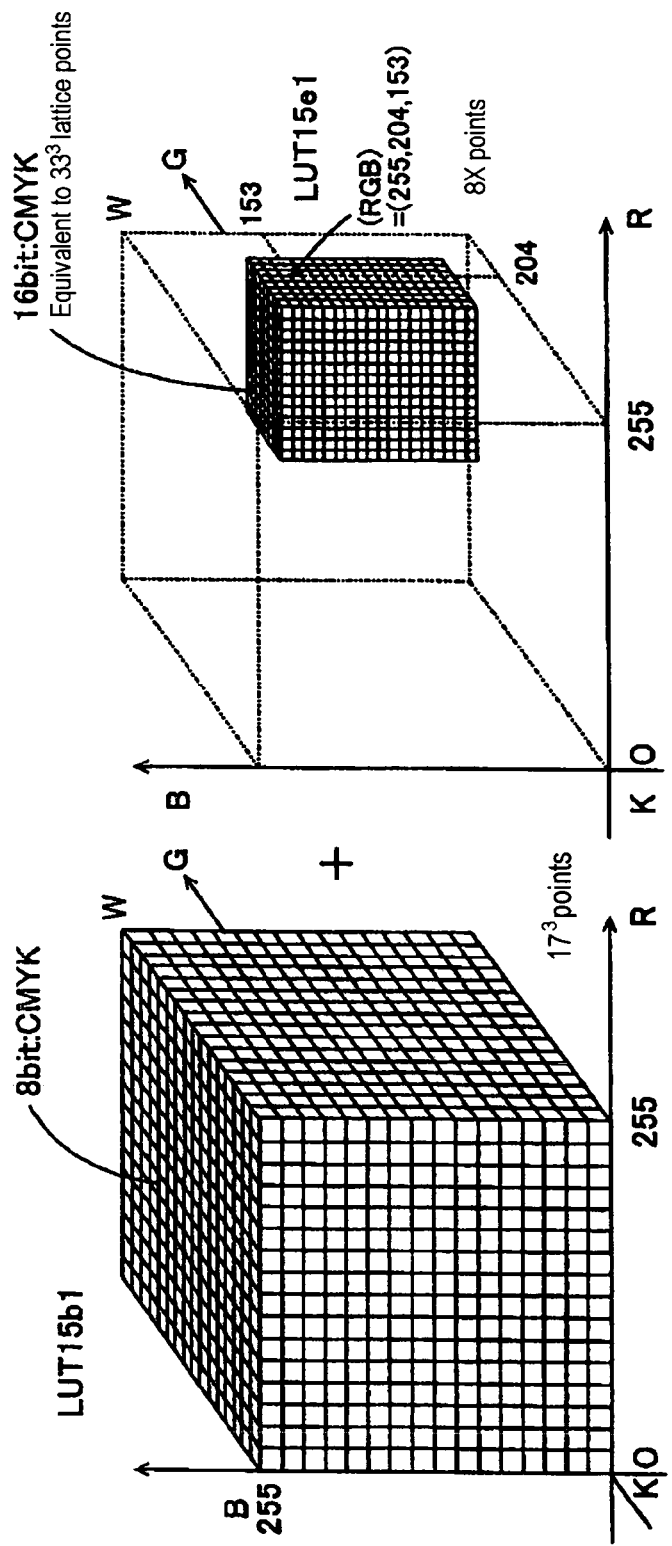
FIG. 32 is a perspective view showing a color solid in the sRGB space.

The above-mentioned LUTs 15c1 and 15d1 use 16-bit gradation values or high accuracy reference points to define the flesh color and the other colors included in the peripheral prescribed area. It may be preferable to provide a high accuracy LUT to define colors using both criteria. On the right of FIG. 32, there is shown a cube comprising reference points for an LUT 15e1 as such LUT. As shown on the right in FIG. 32, the cubic lattice comprising reference points for the LUT 15e1 has the same interval as that for the LUT 15d1 shown in FIG. 30. That is to say, the cubic lattice has an interval equivalent to the cubic lattice configured by providing 33 lattice points to each axis of the entire sRGB space. In addition, the number of 16-bit gradations is used to define CMYK data for the reference points.

When the LUTs 15b1 and 15e1 are used to create a rebuild LUT, a linear interpolation is performed to interpolate reference points having the low reference point density for the LUT 15b1 to generate 33**3 reference points in total. Further, the gradation values of CMYK data defined for the interpolated reference points are multiplied by 256 to provide apparent 16-bit gradation values for all colors. The colors defined in the LUT 15e1 are overwritten by the LUT 15e1. The rebuild LUT created in this manner is capable of the color conversion along with an advantage of increasing the number of color gradations (to be described) and an advantage of increasing the reference point density (to be described).

Figure 33:
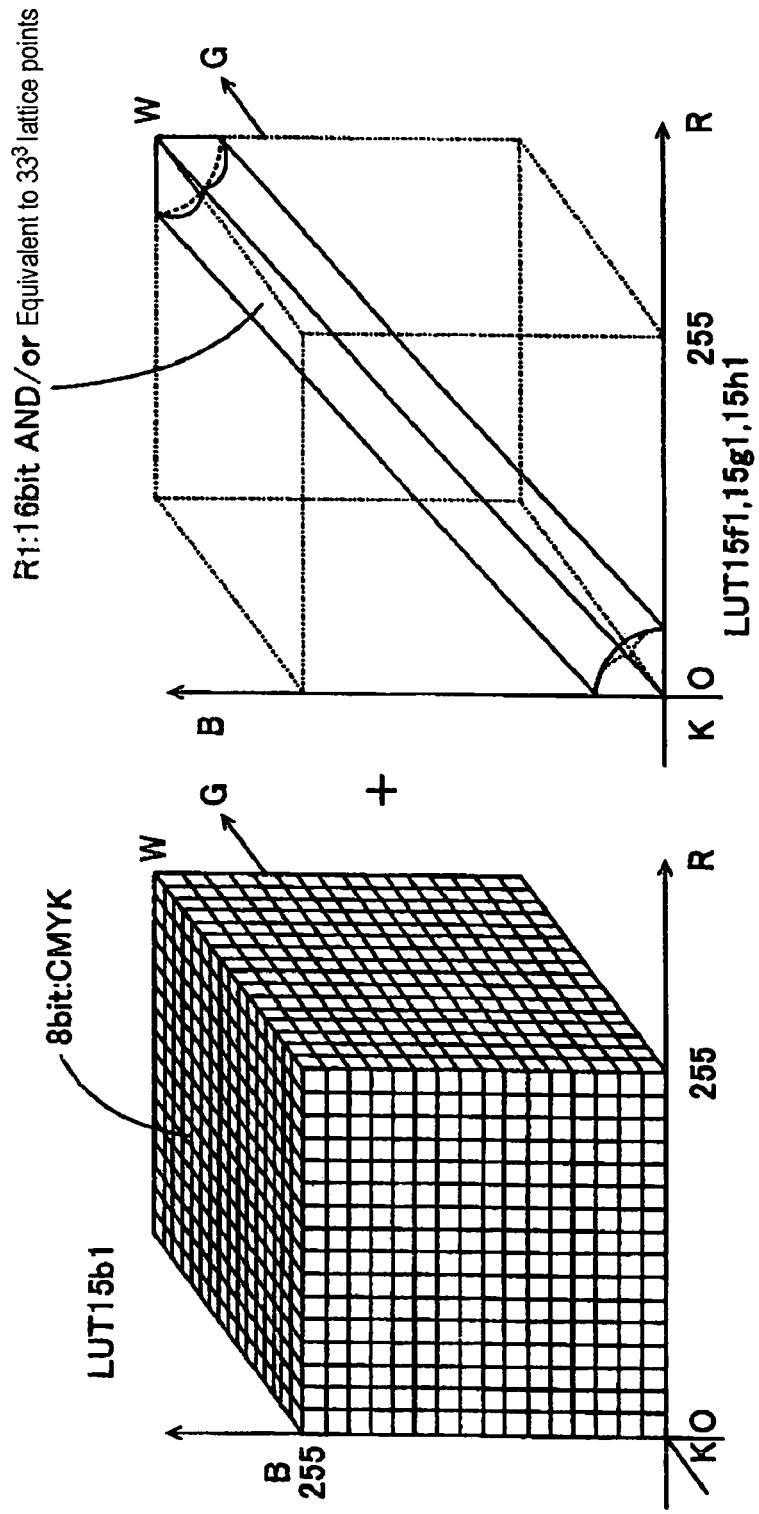
FIG. 33 is a perspective view showing a color solid in the sRGB space.
Figure 34:
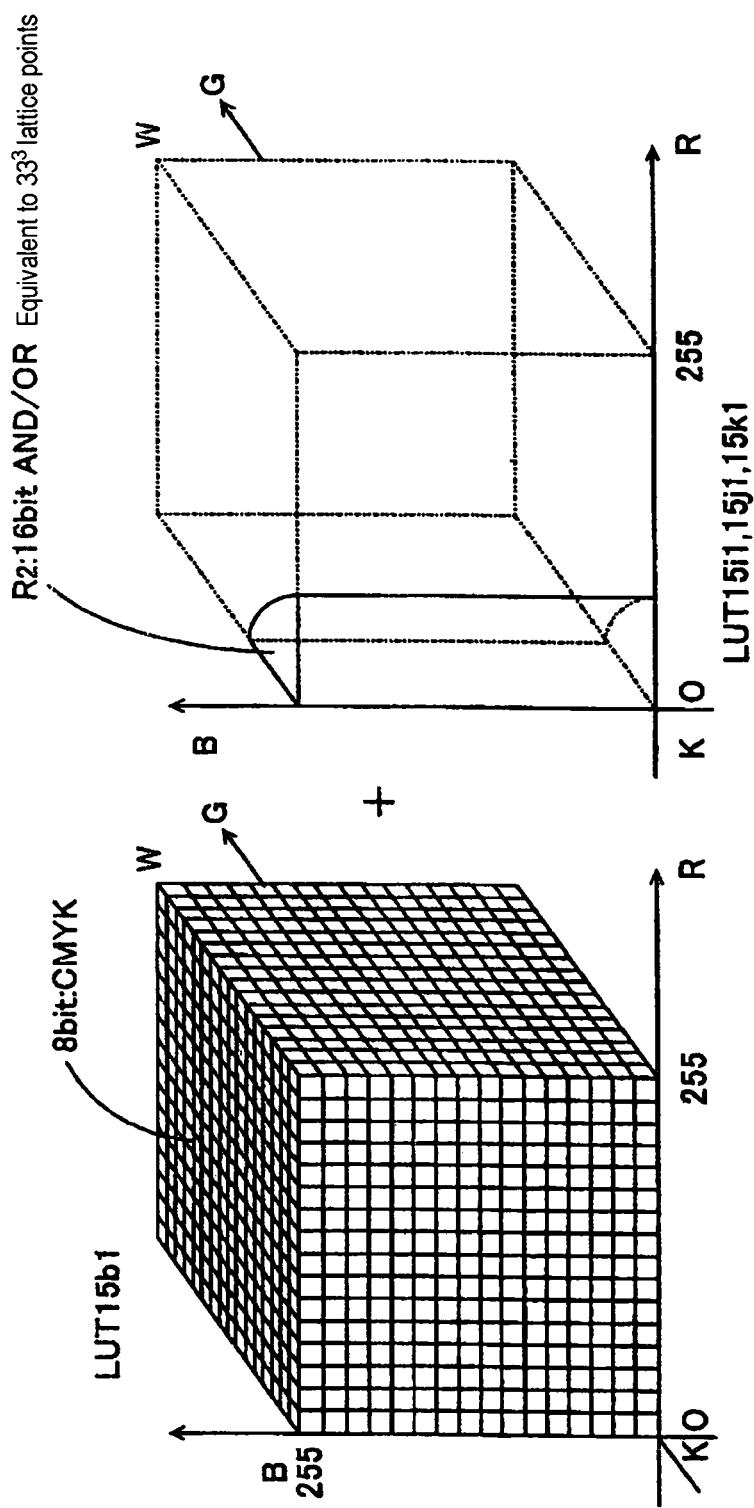
FIG. 34 is a perspective view showing a color solid in the sRGB space.
Figure 35:
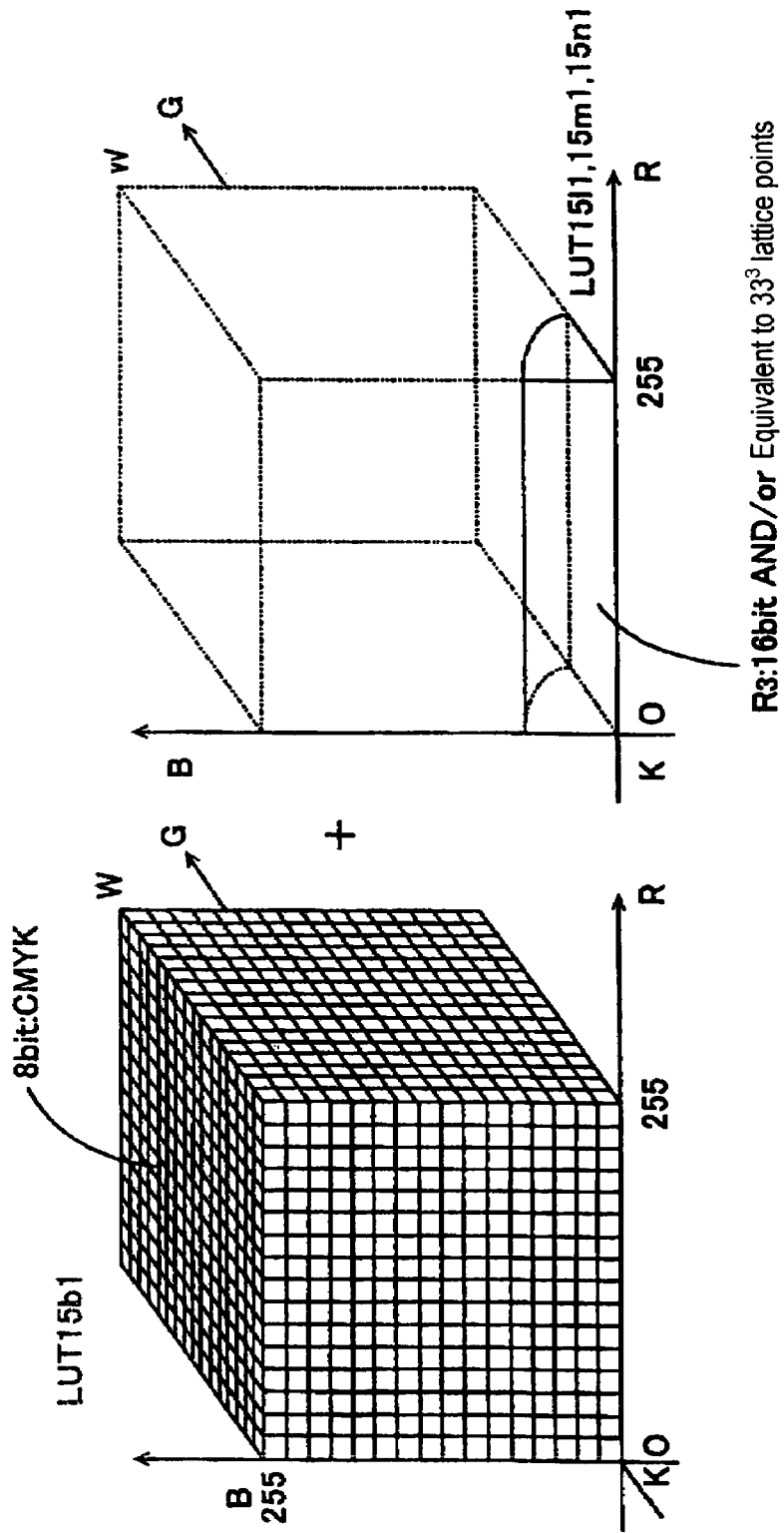
FIG. 35 is a perspective view showing a color solid in the sRGB space.

According to the embodiment, the HDD 15 stores the other LUTs than the LUTs 15c1 through 15e1 that highly accurately define colors with respect to the flesh color and its peripheral prescribed area. FIG. 33 illustrates LUTs 15f1, 15g1, and 15h1 that highly accurately define colors for the gray area. FIG. 34 illustrates LUTs 15i1, 15j1, and 15k1 that highly accurately define colors for the blue area. FIG. 35 illustrates LUTs 15l1, 15m1, and 15n1 that highly accurately define colors for the red area. In these figures, the LUT 15b1 is shown on the left. An area for each of the LUTs 15f1 through 15n1 in the sRGB space is shown on the right.

The LUTs 15f1, 15g1, and 15h1 in FIG. 33 define correspondence between sRGB data and CMYK data for colors in a prescribed area around a line connecting a black point B and a white point W in the sRGB space. The LUTs 15f1, 15g1, and 15h1 assume a specified cylinder around the line as an axis connecting the black point B and the white point W and define reference points for colors in an area R1 that belongs to the inside of the cylinder and the sRGB space. Specifically, there are assumed reference points similar to those for the LUT 15b1 shown on the left in FIG. 33. The CMYK data is defined for the reference points in the cylinder on the basis of 16-bit gradations. There are provided new reference points in the middle of the reference points in the cylinder. The CMYK data is defined for these new reference points (equivalent to 33**3 lattice points) on the basis of 16-bit gradations. Moreover, the reference point density is increased. In this manner, it is possible to provide the LUT that highly accurately defines colors in the gray area.

The LUTs 15i1, 15j1, and 15k1 in FIG. 34 define correspondence between sRGB data and CMYK data for colors in a prescribed area around the B axis in the sRGB space. The LUTs 15i1, 15j1, and 15k1 assume a specified cylinder around the B axis and define reference points for colors in an area R2 that belongs to the inside of the cylinder and the sRGB space. In this case, the area R2 has a fan-shaped section. Specifically, there are assumed reference points similar to those for the LUT 15b1 shown on the left in FIG. 34. The CMYK data is defined for the reference points in the area R2 on the basis of 16-bit gradations. There are provided new reference points in the middle of the reference points for the LUT 15b1 in the area R2. The CMYK data is defined for these new reference points (equivalent to 33**3 lattice points) on the basis of 16-bit gradations. Moreover, the reference point density is increased. In this manner, it is possible to provide the LUT that highly accurately defines colors in the blue area.

The LUTs 15/1, 15m1, and 15n1 in FIG. 35 define correspondence between sRGB data and CMYK data for colors in a prescribed area around the R axis in the sRGB space. The LUTs 15/1, 15m1, and 15n1 assume a specified cylinder around the R axis and define reference points for colors in an area R3 that belongs to the inside of the cylinder and the sRGB space. In this case, the area R3 has a fan-shaped section. Specifically, there are assumed reference points similar to those for the LUT 15b1 shown on the left in FIG. 35. The CMYK data is defined for the reference points in the area R3 on the basis of 16-bit gradations. There are provided new reference points in the middle of the reference points for the LUT 15b1 in the area R3. The CMYK data is defined for these new reference points (equivalent to 33**3 lattice points) on the basis of 16-bit gradations. Moreover, the reference point density is increased. In this manner, it is possible to provide the LUT that highly accurately defines colors in the blue area. In addition to the above-mentioned LUT examples, it is obviously possible to use various color areas, numbers of reference points, and reference point intervals.

The process to create the above-mentioned LUTs follows the same flow shown in FIG. 8. Since the sixth embodiment uses four ink colors, the process converts the CMYK color patch into coordinate values in the Lab space at step S115. The process determines reference points in the sRGB space as shown in FIGS. 27, 30, and 32 through 34 at step S100. As a result of this process, the above-mentioned LUTs can be created. Of course, defining colors in 16 bits is more accurate and is subject to less errors than defining colors in 8 bits.

(11) Print Process According to the Sixth Embodiment

According to the embodiment, the PRTDRV 21 creates a rebuild LUT using only the LUT 15b1 or using a combination of the LUT 15b1 and the LUT 15c1 or the other LUTs based on a user's selection. The PRTDRV 21 references the rebuild LUT for color conversion and allows the printer 40 to perform printing. For the purpose of printing, the PRTDRV 21 comprises the image data acquisition module 21a, the color conversion module 21b, the halftone process module 21c, and the print data generation module 21d as shown in FIG. 24. The color conversion module 21b comprises a rebuild section 21b1 and an interpolation section 21b2. The rebuild section 21b1 selectively extracts specified LUTs from the HDD 15, stores them in the RAM 14 as LUTs 14a and 14b, and performs a rebuild process for the stored LUTs 14a and 14b to create a rebuild LUT 14c. The interpolation section 21b2 references the rebuild LUT 14c stored in the RAM 14 and performs an interpolation to convert any color in the image data.

Figure 10:
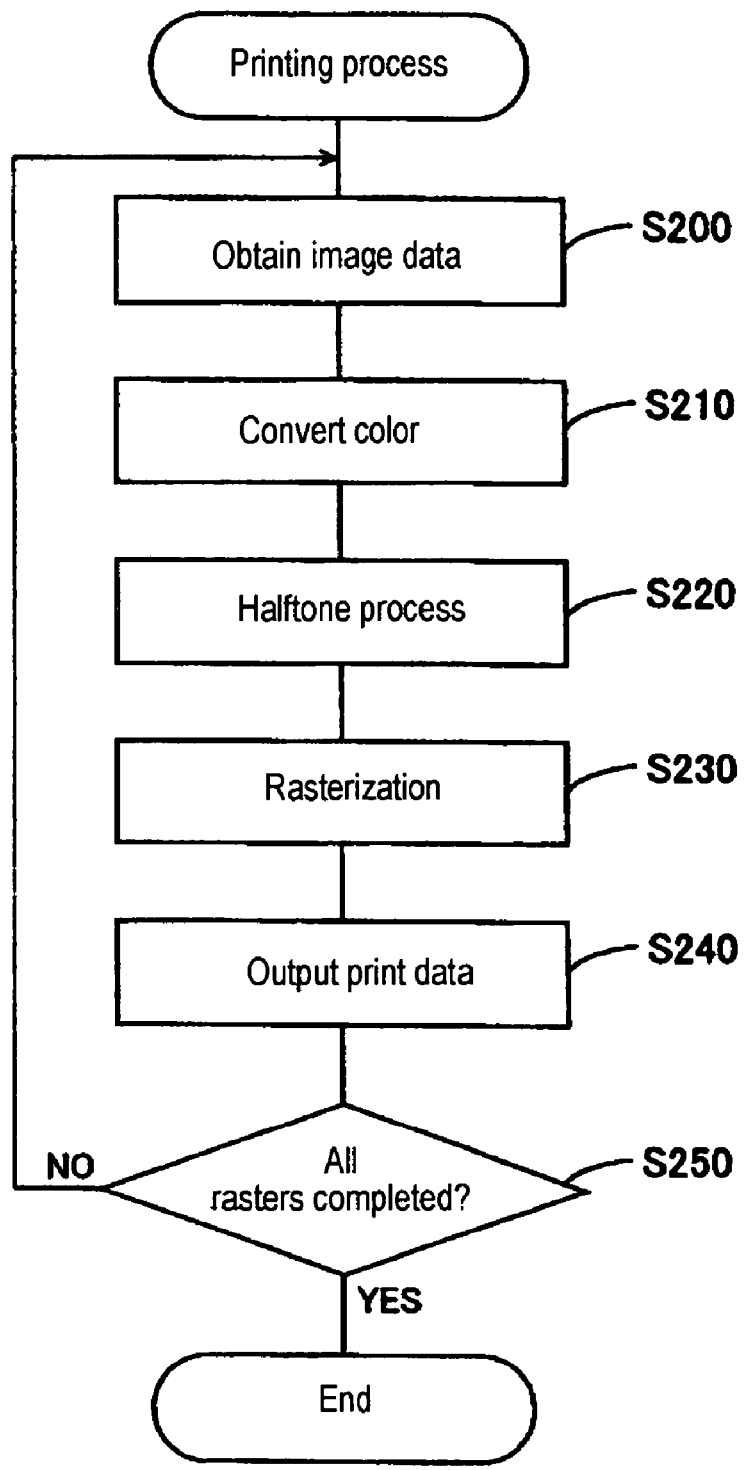
FIG. 10 is a flowchart of a printing process.

When a user clicks on a print button of the print property in FIG. 25 to start printing, a print process is executed in accordance with a flowchart almost equal to that in FIG. 10. In the sixth embodiment, however, when the print process starts, the image data acquisition module 21a obtains the image data 15a for the image stored in the RAM 14 at step S200. The image data acquisition module 21a starts the color conversion module 21b at step S210.

The color conversion module 21b performs the following operations in accordance with the flowchart to be described later. That is to say, the rebuild section 21b1 determines whether or not the user selects a rebuild process using the high accuracy LUT. If the proper rebuild process is selected, the rebuild section 21b1 then determines which LUTs are selected. The rebuild section 21b1 stores the selected LUTs as the LUTs 14a and 14b in the RAM 14 and combines them to create the rebuild LUT 14c in the RAM 14. After the rebuild section 21b1 creates the rebuild LUT 14c, the interpolation section 21b2 performs an interpolation to convert sRGB data for each dot in the image data 15a into CMYK data. After the color conversion module 21b performs the color conversion to generate the CMYK data, the process is the same as that shown in FIG. 10.

Figure 36:
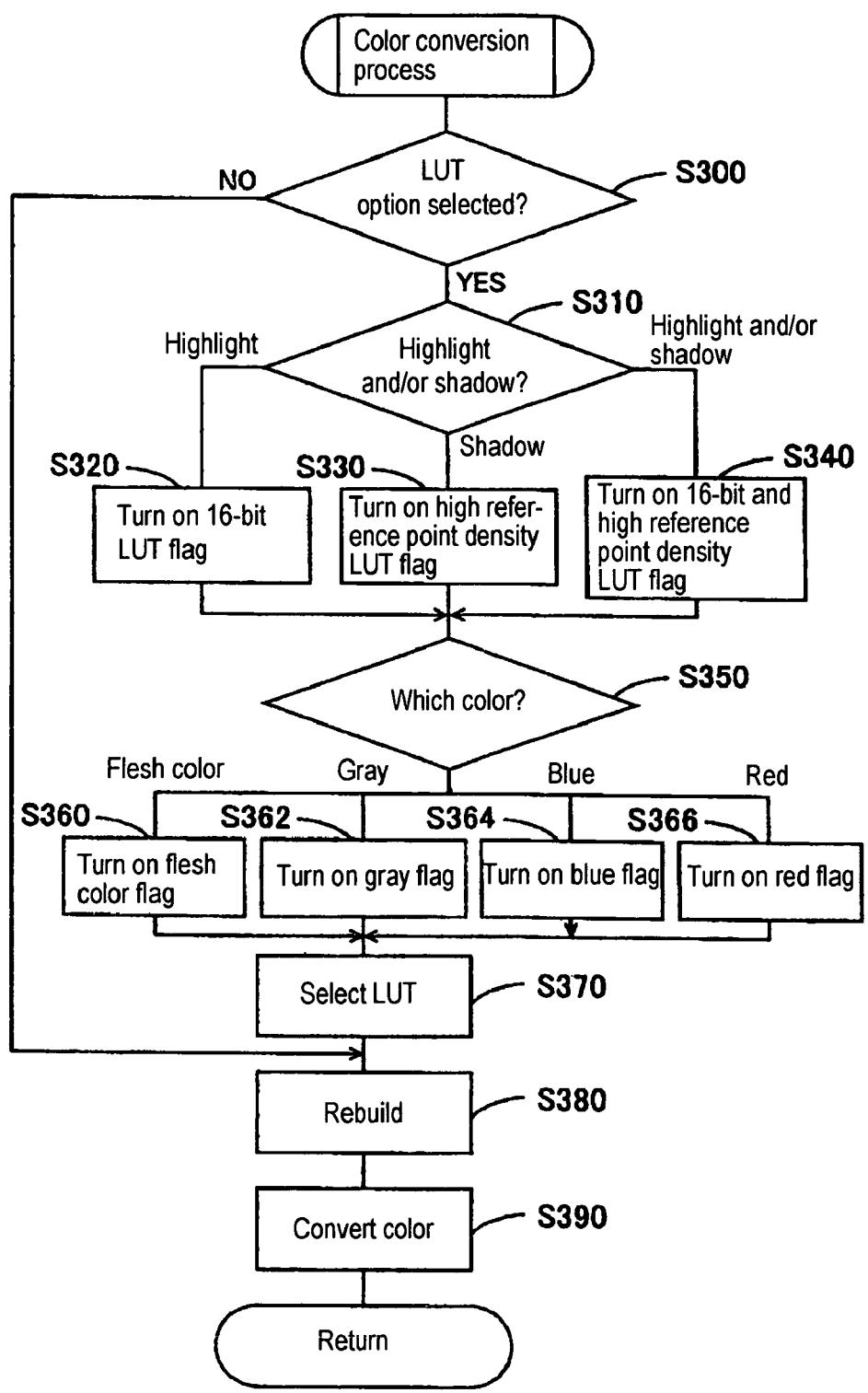
FIG. 36 is a flowchart showing a color conversion process.

The following describes the color conversion process at step S201 in more detail. FIG. 36 is a flowchart for the color conversion process. At step S300, the process determines whether or not the user checks the LUT option selection check box 18a1 to select the LUT option, i.e., whether or not the user selects to use the high accuracy LUT 15c1 and the like. If it is determined at step S300 that the LUT option is not selected, the process reads the LUT 15b1 from the HDD 15 and stores it as the LUT 14a in the RAM 14 at step S380. Using only the LUT 14a, the process performs an interpolation to create the rebuild LUT 14c having 333 reference points converted from 173 reference points.

If it is determined at step S300 that the LUT option is selected, the process determines at step S310 which of the options "high accuracy for highlight", "high accuracy for shadow", and "high accuracy for highlight and shadow" the radio button 18a2 in FIG. 25 specifies. When it is determined at step S301 that the option "high accuracy for highlight" is selected, the process, at step S320, turns on a flag indicating the use of an LUT that defines colors in 16-bit gradations. When it is determined at step S301 that the option "high accuracy for shadow" is selected, the process, at step S330, turns on a flag indicating the use of an LUT that has the high reference point density. When it is determined at step S301 that the option "high accuracy for highlight and shadow" is selected, the process, at step S340, turns on a flag indicating the use of an LUT that defines colors in 16-bit gradations and has the high reference point density.

At step S350, the process determines which of colors "flesh", "gray", "blue", and "red" the radio button 18a3 in FIG. 25 specifies. When it is determined at step S350 that "flesh" is selected, the process, at step S360, turns on a flag indicating the use of an LUT that provides high accuracy to the flesh color and its peripheral colors. When it is determined at step S350 that "gray" is selected, the process, at step S362, turns on a flag indicating the use of an LUT that provides high accuracy to the gray and its peripheral colors. When it is determined at step S350 that "blue" is selected, the process, at step S364, turns on a flag indicating the use of an LUT that provides high accuracy to the blue and its peripheral colors. When it is determined at step S350 that "red" is selected, the process, at step S366, turns on a flag indicating the use of an LUT that provides high accuracy to the red and its peripheral colors.

At step S370, the process selects LUTs based on the flags enabled at steps S320 through S340 and steps S360 through S366. Turning on the flag at step S320 selects to use any of the LUTs 15c1, 15/1, 15i1, and 15/1. Turning on the flag at step S360 selects to use the LUT 15c1. Turning on the flag at step S362 selects to use the LUT 15/1. Turning on the flag at step S364 selects to use the LUT 15i1. Turning on the flag at step S366 selects to use the LUT 15/1. The other LUTs are likewise selected based on the flags.

At step S380, the process generates the rebuild LUT 14c in the RAM 14 based on the selected LUT. If it is determined at step S300 that the LUT option is not selected, only the LUT 15b1 is used to create the rebuild LUT 14c as mentioned above. If step S380 is executed immediately after step S370, the LUT selected at step S370 is used to execute the rebuild process. When the LUT 15b1 is transferred to the RAM 14 in the LUTs 15c1, 15f1, 15i1, and 15l1 that define colors in 16-bit gradations, for example, gradation values for CMYK data are multiplied by 256 to provide apparent 16-bit gradations for all colors. The LUT 15b1 is then stored as the LUT 14a in the RAM 14. The LUTs 15c1, 15f1, 15i1, and 15l1 are intactly transferred to the RAM 14 to form the LUT 14b. Of colors defined in the LUT 14a, those defined in the LUT 14b are overwritten by the corresponding values in the LUT 14b. As a result, the rebuild LUT 14c is generated.

In the LUTs 15d1, 15g1, 15j1, and 15m1 having a high density of reference points, a linear interpolation is performed to interpolate reference points for the LUT 15b1 so that there are provided 33**3 reference points in total. In addition, the LUT 15b1 is stored as the LUT 14a in the RAM 14. The LUTs 15d1, 15g1, 15j1, and 15m1 are intactly transferred to the RAM 14 to form the LUT 14b. Of colors defined in the LUT 14a after the interpolation, those defined in the LUT 14b are overwritten by the corresponding values in the LUT 14b. As a result, the rebuild LUT 14c is generated.

The LUTs 15e1, 15h1, 15k1, and 15n1 specify colors in 16-bit gradations and have a high density of reference points. In these LUTs, a linear interpolation is performed to interpolate reference points for the LUT 15b1 so that there are provided 33**3 reference points in total. In addition, the LUT 15b1 is stored as the LUT 14a in the RAM 14 by multiplying gradation values of CMYK data defined for the reference points after the interpolation by 256. The LUTs 15e1, 15h1, 15k1, and 15n1 are intactly transferred to the RAM 14 to form the LUT 14b. Of colors defined in the LUT 14a, those defined in the LUT 14b are overwritten by the corresponding values in the LUT 14b. As a result, the rebuild LUT 14c is generated. After the rebuild LUT 14c is created in the RAM 14 at step S380, the process references the rebuild LUT 14c at step S390 to perform the color conversion for the image data 15a.

(12) Printing an Image According to the Sixth Embodiment

Figure 37:
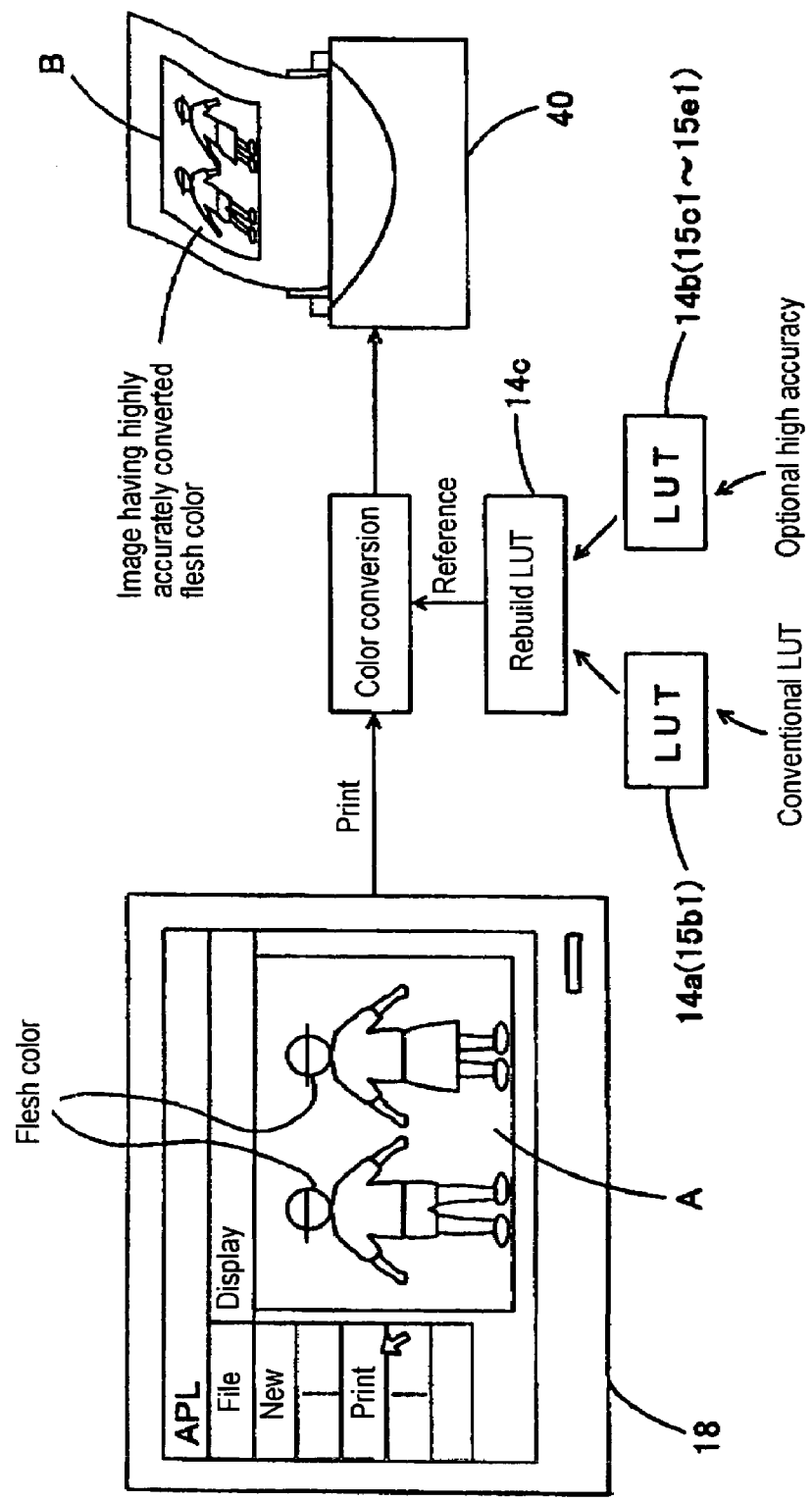
FIG. 37 shows an operation concept of the present invention.

The following describes operations for printing a monochrome image according to the above-mentioned configuration based on a schematic operation diagram in FIG. 37. The display 18 in FIG. 37 displays a screen for executing the APL 25. When the APL 25 reads the image data 15a, the image data 15a is stored in the RAM 14. A process by the display DRV 23 displays an image A based on the image data 15a on the display 18. The APL 25 is capable of performing various retouches for the image A displayed on the display 18 and giving an instruction to print the image A. The screen for executing the APL 25 in FIG. 37 shows a situation to read the image data 15a stored in the HDD 15 and issue a print instruction. Using the mouse 32, a user can select the print tab from the file menu and issue the print instruction.

Let us consider that the user executes the APL 25 to print the image A containing the human being's flesh color. After the print instruction is specified for the APL 25, the print property screen in FIG. 25 is displayed. Using this screen, the user can select the LUT option. The development of the flesh color affects the quality of the image A that contains the human being's flesh color. The image quality may give very different impressions. That is to say, the subdued flesh color of the human being gives a very unhealthy appearance to the human being. By contrast, the reddish flesh color gives a healthy appearance. As a result, the development of the flesh color may greatly affect the image quality. Consequently, if the flesh color can be highly accurately converted, the original image's flesh color an be reproduced faithfully. It is possible to prevent an impression of deteriorated image quality due to the color conversion.

Let us assume that the user checks the LUT option selection box 18a1 in FIG. 25 to select the LUT option, makes a selection for the radio button 18a2, and selects the flesh color using the radio button 18a3. In this case, as mentioned above, the rebuild section 21b1 of the PRTDRV 21 combines the conventional LUT 14a (15b1) with the LUT 14b (15c1 through 15e1) highly accurately defining the flesh color to generate the rebuild LUT 14c. Since the rebuild LUT 14c highly accurately defines the flesh color and its peripheral colors, the high accuracy color conversion is available for printing the image A. Accordingly, the flesh color is highly accurately converted on an image B printed from the printer 40.

Any of the LUTs 15c1 through 15n1 improves the conversion accuracy for all colors in the LUTs. Different color areas remarkably exhibit an effect of improving the conversion accuracy depending on whether to define colors with 16-bit gradations or a high density of reference points as mentioned above. Since a highlight expresses colors with a small amount of ink, it is necessary to express color changes in accordance with changes in gradation values of CMYK data by varying a small amount of ink. It is preferable to define colors in 16-bit gradations in order to more accurately define the amount of ink for a given gradation value. At a shadow portion, a color variation drastically decreases as the amount of ink increases. In this manner, when the color variation easily responds to a gradation change, increasing a distance between an interpolation point and the reference point increases an error between the ideal color and an interpolated color obtained by the linear interpolation. Accordingly, it is preferable to increase the reference point density at the shadow portion.

(13) Highly Accurate Color Conversion According to the Sixth Embodiment

Figure 38:
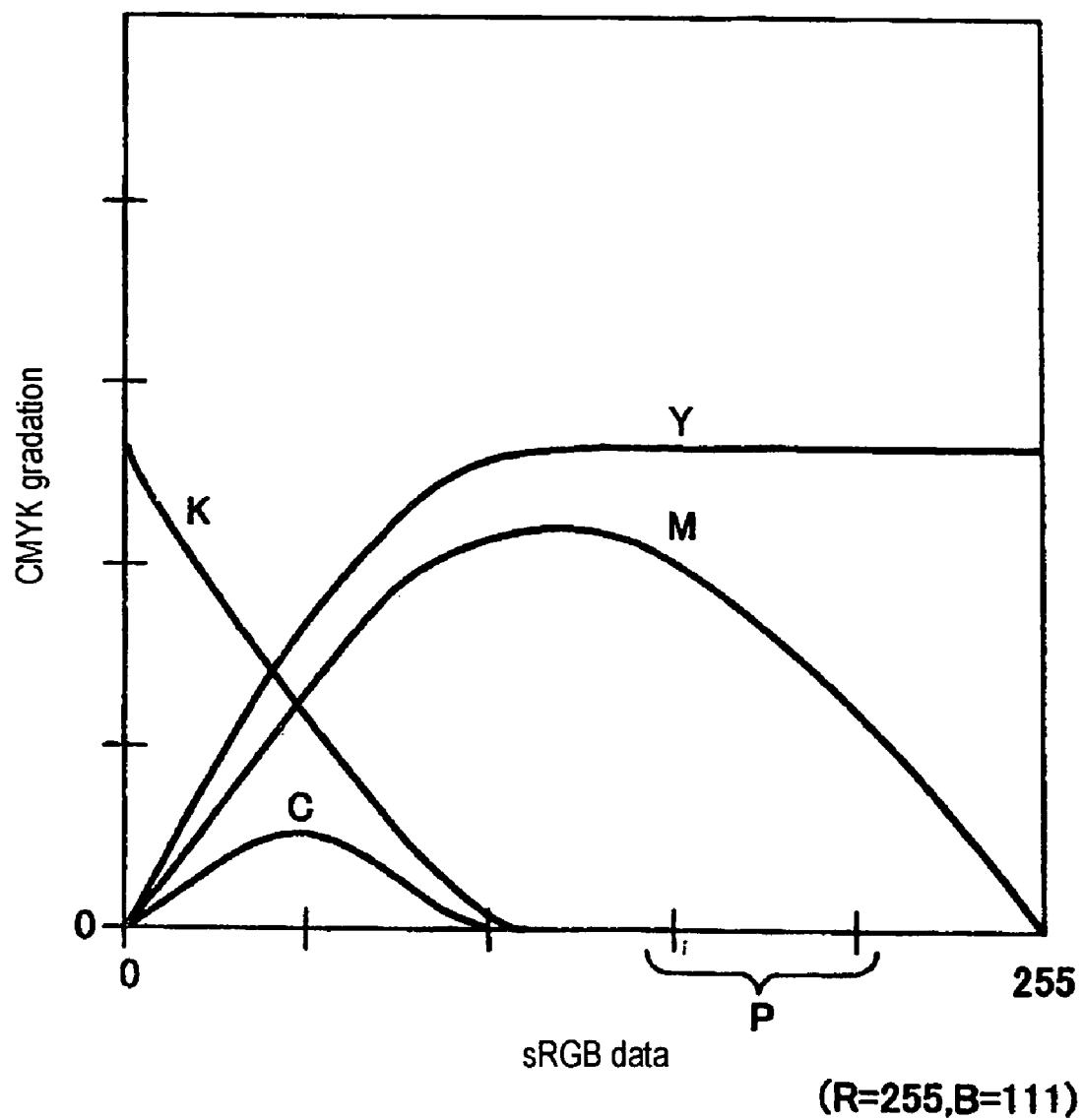
FIG. 38 exemplifies ideal CMYK gradation changes.

As mentioned above, some LUTs highly accurately define colors for part of the color area. When a color conversion is performed by using a rebuild LUT that is created based on such LUTs, it is possible to print the image by faithfully reproducing colors on the display 18. FIG. 38 exemplifies an ideal CMYK gradation change with reference to sRGB data comprising R=255, B=111, and G set to any value. Part of this sRGB data, i.e., the color with a range P is included in the flesh color defined by the LUTs 15c1 through 15e1 and its peripheral colors. The following description uses this flesh color area as an example.

Figure 39:
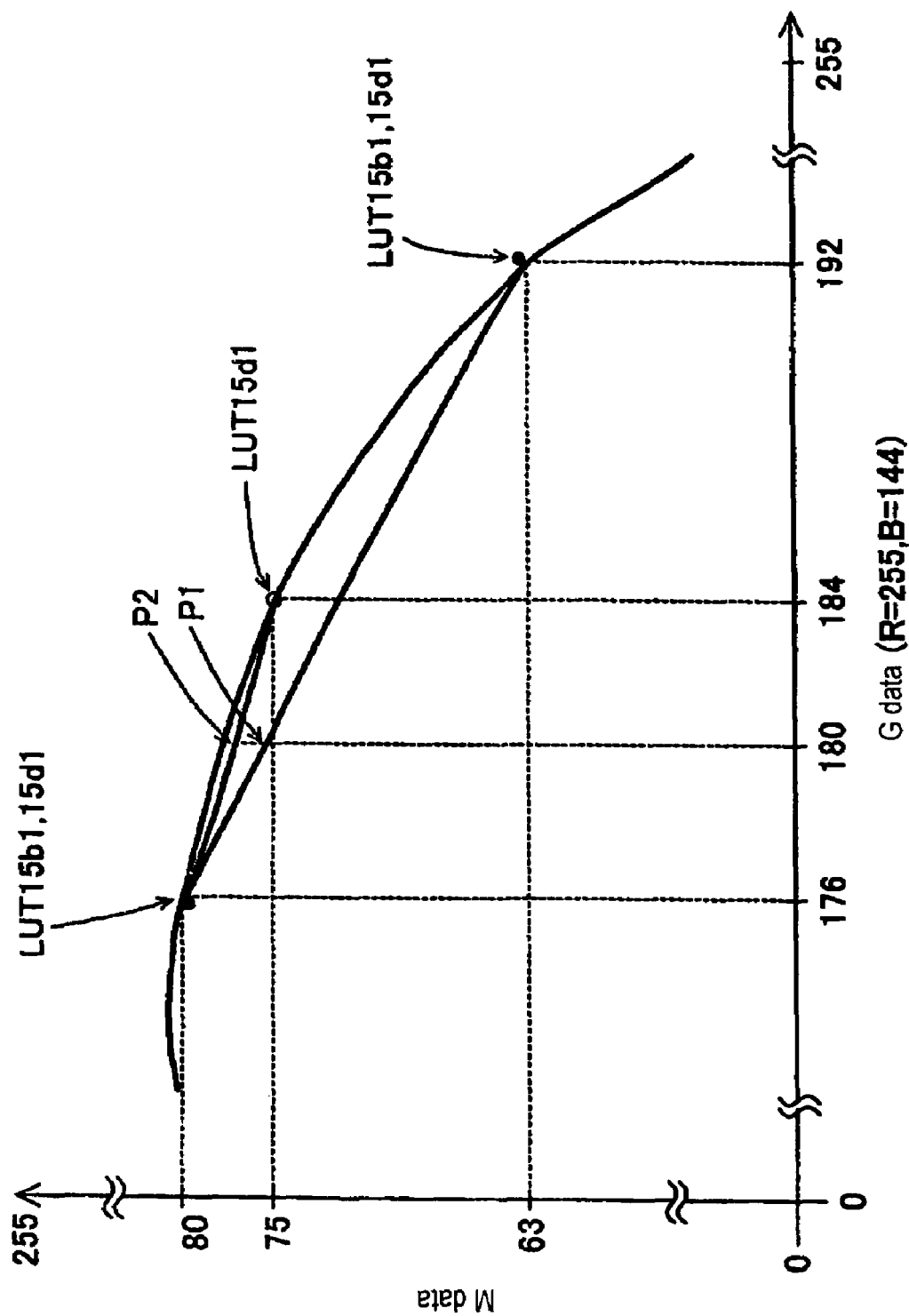
FIG. 39 is an explanatory diagram showing how the highly accurate color conversion is available.

FIG. 39 illustrates availability of a high accuracy color conversion through the use of an LUT having a high density of reference points such as the LUT 15d1. FIG. 39 enlarges the M data in the LUTs 15b1 and 15d1 for part of the range P. A black dot indicates the reference point defined by both the LUT 15b1 and the LUT 15d1, maintaining correspondence between G=176 and M=80 and between G=192 and M=63. On the other hand, a white dot denotes the reference point defined by the LUT 15d1, maintaining correspondence between G=184 and M=75. Though omitted here, each reference point is obviously provided with values of the other color components such as RG and CYK.

Since the LUT 15b1 and the LUT 15d1 have different reference points, an interpolation, if performed by referencing these LUTs, causes a remarkable difference in the interpolation accuracies. The correspondence for any color is determined by three-dimensionally observing LUT reference points and performing a linear interpolation using a triangular pyramid comprising the reference points. The two-dimensional description is provided here based on FIG. 39 for simplicity. When the M data for G=180 is to be interpolated, the operation references two points most approximate to G=180, i.e., G=176 and 192. Relative differences between these points and G=180 are used as weights to find a weighted average of the M data (80, 63) for the corresponding points. As a result, an interpolation point is obtained at an intersecting point P1 between a line connecting the above-mentioned two black dots and a perpendicular line drawn from G=180.

While the same interpolation technique is used for the LUT 15d1, two points most approximate to G=180 become G=176 an G=184. An interpolation is performed by referencing these points to obtain an interpolation point at point P2. When the points P1 and P2 are compared, the point P2 is more approximate to the ideal M gradation mentioned above and is capable of more accurate interpolation. Therefore, the flesh color area is capable of a high accuracy interpolation also in the rebuild LUT 14c that is created by combining the LUTs 15b1 and 15d1. It is possible to perform printing so as to faithfully reproducing the image color.

Figure 40:
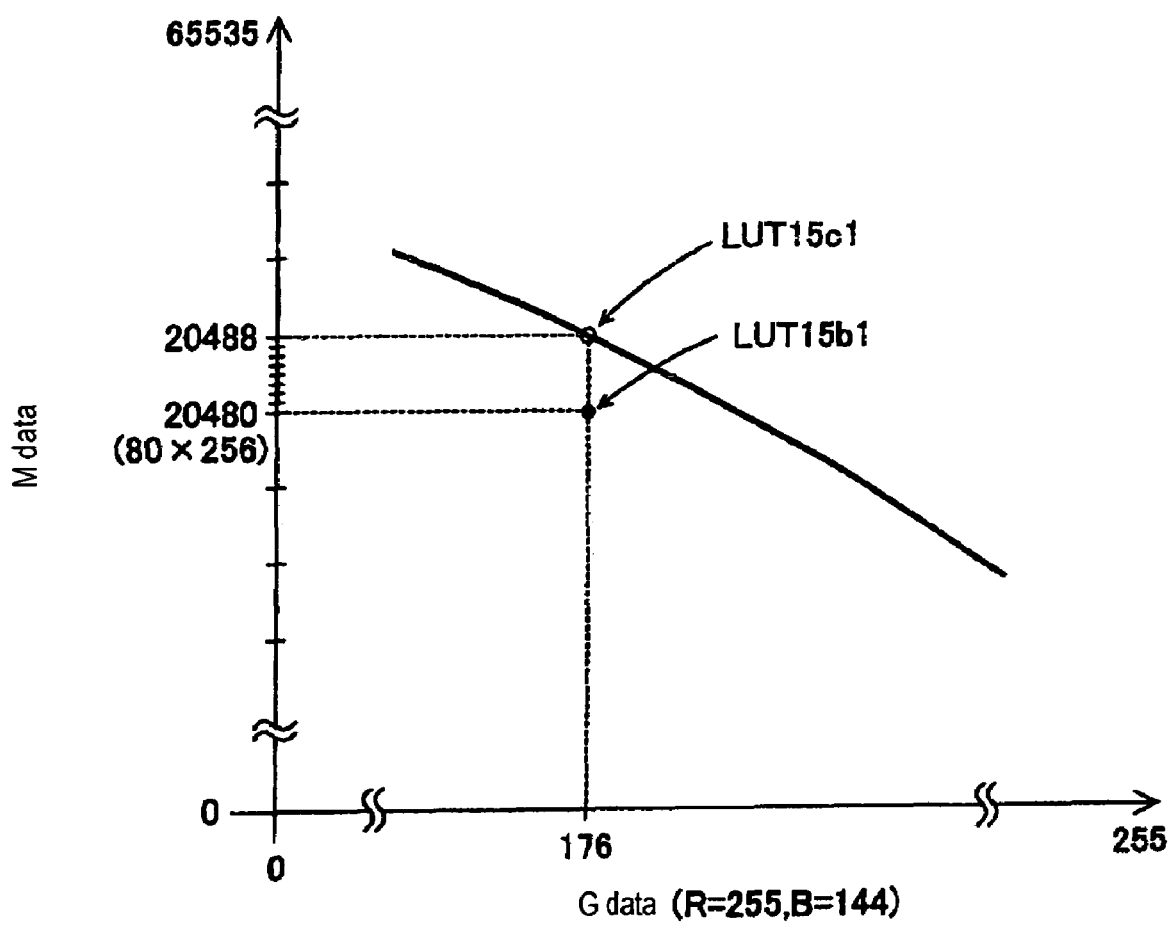
FIG. 40 is an enlarged explanatory diagram for the highly accurate color conversion.

FIG. 40 illustrates availability of a high accuracy color conversion through the use of an LUT having many color gradations such as the LUT 15c1. FIG. 40 further enlarges G=176 and vicinity in FIG. 39. In FIG. 40, a black dot represents the reference point defined in the LUT 15b1. A white dot represents the reference point defined in the LUT 15c1. FIG. 40 multiplies gradation values for M data in the LUT 15b1 by 256 in order to use the same scale for showing the M data in the LUTs 15b1 and 15c1. If the CMYK gradations can be changed freely, it is possible to determine the ideal CMYK gradation for a given sRGB value. Since the LUT 15b1 provides 256 CMYK gradations, however, an error occurs for the M data corresponding to G=176, for example. Though the M data for G=176 represented by a black dot in FIG. 40 approximates to the ideal M gradation (a curve in FIG. 40), the example shows a slight deviation from the ideal gradation. Despite such deviation, there is no way but to define the black dot in units of 256 along the ordinate scale (equivalent to one gradation in 8-bit data).

By contrast, the LUT 15c1 provides 65536 gradations, making it possible to determine a value for the M data 256 times more accurately than the LUT 15b1. As indicated by a white dot, it is possible to provide a value that is almost the same as the ideal gradation for the M data. Therefore, the flesh color area is capable of defining a color according to the ideal gradation also in the rebuild LUT 14c that is created by combining the LUTs 15b1 and 15d1. It is possible to perform printing so as to faithfully reproducing the image color. Of course, accurately defining colors improves the interpolation accuracy.

Figure 41:
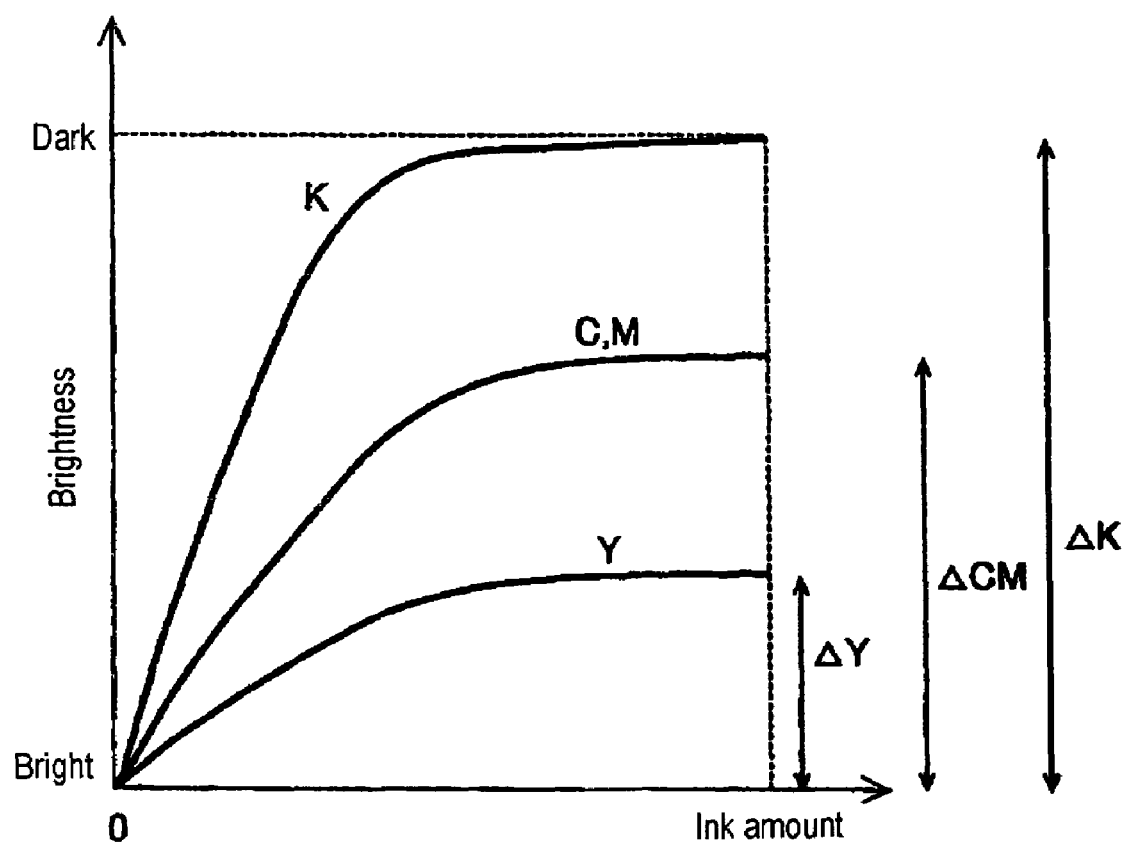
FIG. 41 is an explanatory diagram explaining an effect of improving the accuracy.

The following describes the fact of remarkably improving the color conversion accuracy by defining colors with 16-bit gradations at a highlighted portion and by increasing the reference point density at a shadow portion. FIG. 41 diagrams an effect of improving the accuracy when colors are defined in 16-bit gradations. The abscissa indicates the ink ejection amount. The ordinate indicates the brightness of printout on white paper with the corresponding ink ejection amount for each of CMYK inks. As shown in FIG. 41, decreasing the ink amount increases the brightness. Increasing the ink ejection amount decreases the brightness. The variation graph shows an upward parabola for each of all the ink colors. At a high brightness area, a slight increase in the ink ejection amount rapidly increases the brightness. However, a low brightness area suddenly causes very small changes in the brightness variation against an increase in the ink ejection amount.

Figure 42:
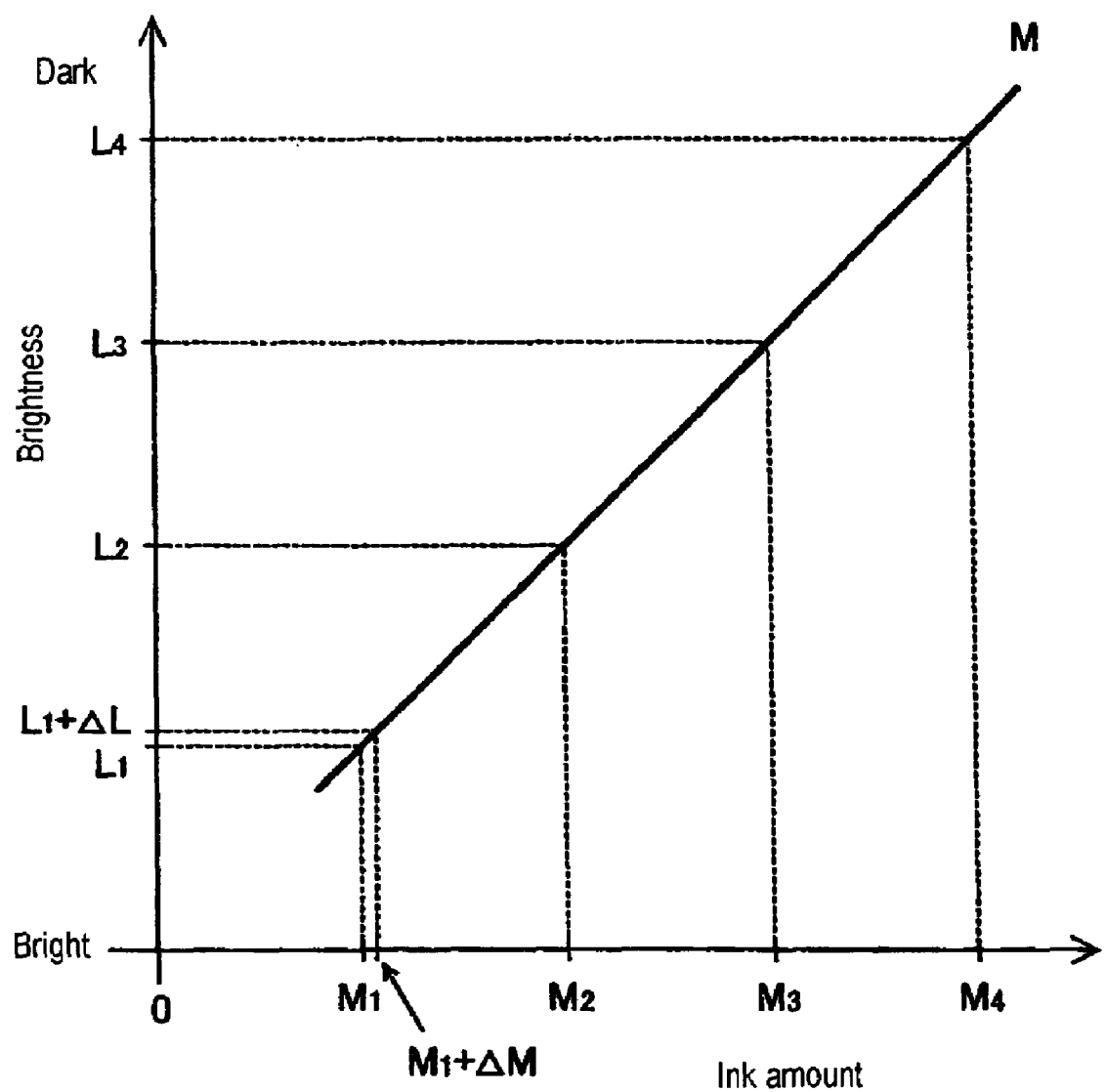
FIG. 42 shows an enlarged detail of M ink in a high brightness area.

FIG. 42 enlarges the M ink in the high brightness area in FIG. 41. Ink amounts M1 through M4 in FIG. 42 show minimum increments of the ink amount ejected for 256-gradation data defined in the LUT 15b1. The ink amounts M1 through M4 correspond to brightnesses L1 through L4 for printout, respectively. Since the ink amounts M1 through M4 each represent the minimum increment in the LUT 15b1, an interval for the L1 through the L4 becomes the minimum brightness increment in the LUT 15b1. As shown in FIG. 41, decreasing the brightness increases the increment.

A large brightness increment decreases the accuracy of defining a color itself by data from the LUT 15b1 and the accuracy of interpolation. If the rebuild LUT 14c is created by combining the LUT 15b1 with a high accuracy LUT for the high brightness color, the color conversion is available by maintaining the color conversion accuracy for high brightness without degrading the image quality. For example, the LUT 15c1 using 16-bit gradations especially can define the ink amount in increments of ΔM that is one 256th of an interval between the ink amounts M1 and M2. As a result, the brightness can be changed in increments of ΔL that is one 256th of an interval between the ink amounts L1 and L2, making it possible to more accurately define colors.

Of course, it is impossible to change the brightness by using so fine an increment as to exceed the performance limit of the printer 40. The brightness can be changed on the basis of a fine increment within limits of possible expression capability of the printer 40. Like the LUT 15c1, an LUT using 16-bit gradations very effectively contributes to improvement of the accuracy in high brightness areas. On the contrary, as shown in FIG. 41, low brightness colors are subject to smaller brightness changes against ink amount changes than those in the highlighted portion. Accordingly, a brightness change for the minimum increment M of ink amount is much smaller than the highlighted portion. A much smaller ink amount increment cannot provide a sufficient effect compared to the highlighted portion. The embodiment solves this problem as follows. When the radio button 18a2 in FIG. 25 is used to select the option "high accuracy for highlight", the process, at step S320 as mentioned above, turns on a flag indicating the use of an LUT that defines colors in 16-bit gradations.

Figure 43:
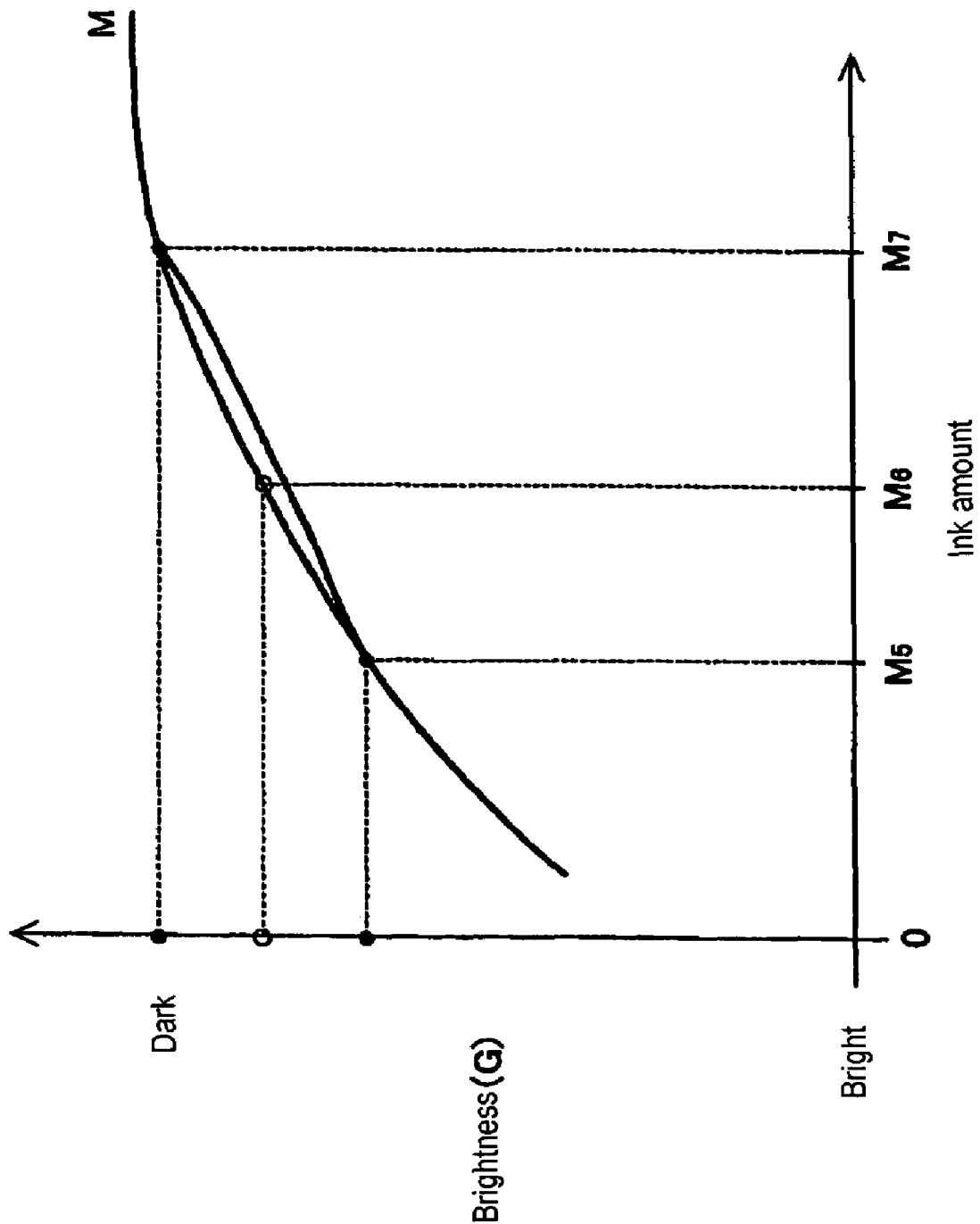
FIG. 43 shows an enlarged detail of M ink in a low brightness area.

FIG. 43 shows an enlarged detail of M ink in the low brightness area in FIG. 41. According to the embodiment, the CMYK data defines the amount of ink to define subtractive colors. The RGB data corresponds to each color on the display according to additive color mixing. Consequently, the RGB data maintains almost linear relationship between a gradation change and a brightness change. From a qualitative viewpoint, the brightness change along the ordinate in FIG. 43 can be assumed to be the gradation change for the G data. As shown in FIG. 27, the LUT 15b1 uses reference points comprising lattice points formed by equally dividing each axis. For this reason, the G axis also contains reference points at equal intervals. FIG. 43 shows reference points using black dots along the ordinate. While the LUT 15d1 also contains reference points at equal intervals, this interval is half that of the LUT 15b1. The LUT 15d1 contains reference points not only at black dots, but also white dots therebetween.

A curve in FIG. 43 shows an ideal gradation change of M data. The LUT 15b1 uses values M5 and M7 for M data as reference points. It is obvious that RB data and CYK data are also defined. To determine the values M5 and M7, a line is extended from the black dot on the ordinate parallel to the abscissa until the line intersects the curve. The intersecting point is defined as M5 or M7. The following provides two-dimensional description about a linear interpolation using these black dots in the same manner as mentioned above. An interpolation point generated from these black dots is found on a line connecting these black dots. On the other hand, the LUT 15*d*1 contains white dots as reference points. The linear interpolation can be performed to define interpolation points corresponding to values on a line connecting a white dot and a black dot. This makes it possible to perform the interpolation very highly accurately compared to the LUT 15*b*1.

By contrast, the highlighted portion is subject to a linear change in the ink amount and the brightness as shown in FIG. 41. Compared to the low brightness area as shown in FIG. 43, the highlighted portion makes it difficult to provide the effect of improving the accuracy by increasing the reference point density. The embodiment solves this problem as follows. When the radio button 18*a*2 in FIG. 25 is used to select the option "high accuracy for shadow", the process, at step S330 as mentioned above, turns on a flag indicating the use of an LUT that defines colors in 16-bit gradations.

(14) Seventh Embodiment

The high accuracy LUT according to the above-mentioned embodiments ensures high accuracy for all color components contained in the LUT. It is also possible to employ a configuration that defines colors in more gradations than 256 gradations so that only specific colors, instead of all colors, can be defined highly accurately. This configuration can use the same hardware and almost the same process as for the first embodiment with different contents prepared in the LUT 15*c*1 and the like. There are various criteria to select colors for the configuration that highly accurately defines specific colors. It is possible to determine colors to be defined highly accurately based on the relationship between the ink ejection amount and the brightness.

As shown in FIG. 41, the respective inks have different relationships between the ejection amount and the brightness. When the ink ejection amount is varied from the minimum to the maximum, the Y ink shows the smallest brightness variation ($\Delta Y$). The CM inks each have the same brightness variation ($\Delta CM$) that is greater than that of the Y ink. The K ink shows the largest brightness variation ($\Delta K$). As shown in FIG. 41, $\Delta CM$ is approximately twice as great as $\Delta Y$; $\Delta K$ is approximately three times as great as $\Delta Y$. When the CMYK inks are provided with data defined in the same number of gradations, the brightness variation per gradation is smallest for $\Delta Y$ and increases for $\Delta CM$ and $\Delta K$ in this order.

When the brightness variation per gradation increases, the accuracy for defining colors decreases accordingly. When the number of gradations is assumed to be the same, the accuracy for the K ink is lowest, followed by that of the CM inks. In consideration of this, the high accuracy LUT 150*c* according to the present invention is configured to define colors for one of or a combination of the CMK inks in 16-bit gradations. These colors can be accurately defined without degrading the accuracy relative to the other colors. When the rebuild LUT 14*c* is to be created, 8-bit data is multiplied by 256 to provide 16-bit data for the high accuracy LUT 150*c* according to the present invention and the LUT 15*b*1. It just needs to perform a process such as overwriting some reference points in the LUT after being multiplied by 256 with data for the reference point defined in the LUT 150*c*.

Figure 44:
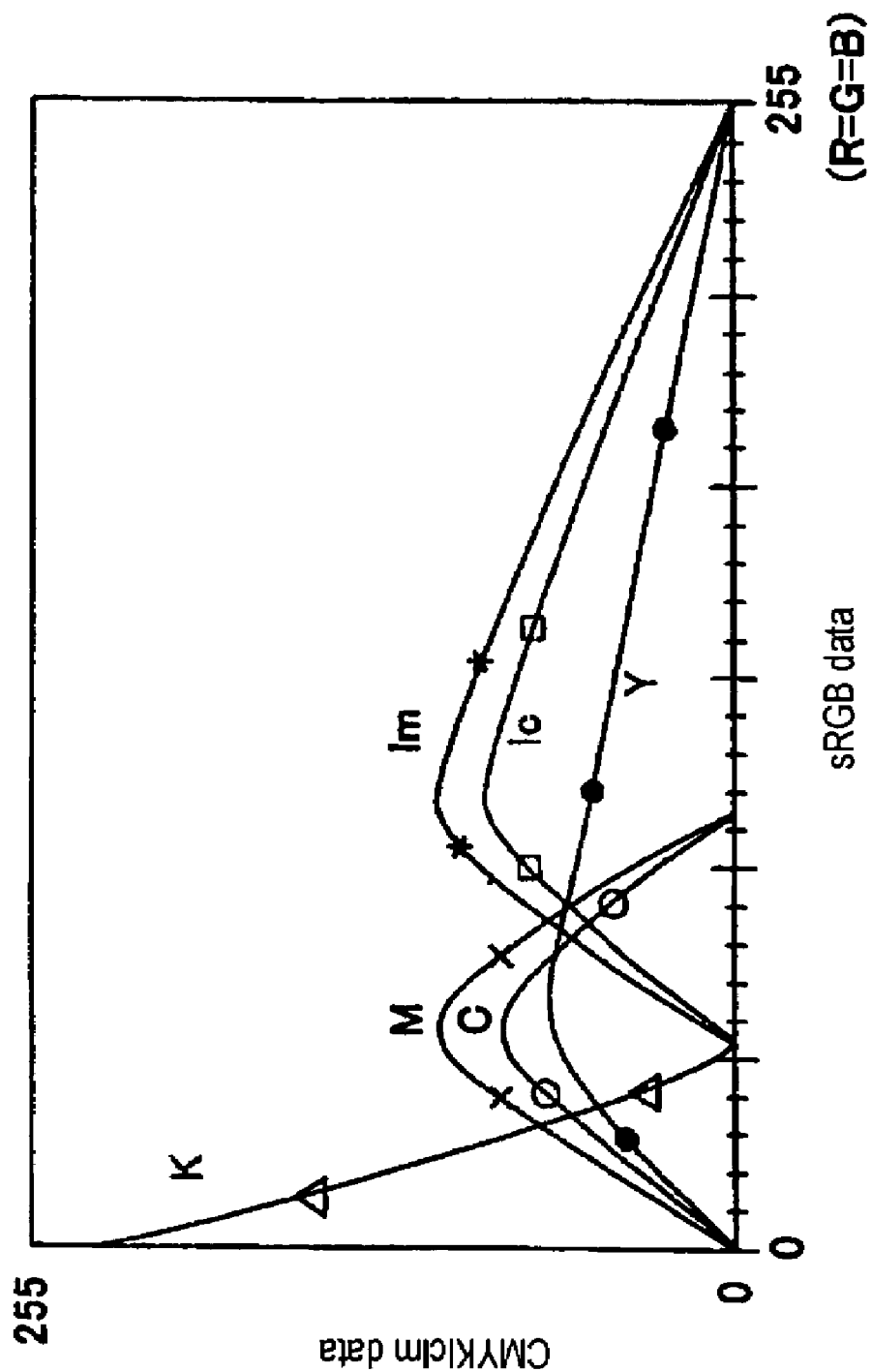
FIG. 44 exemplifies relationship between sRGB data and CMYKlclm data.

In addition to the above-mentioned embodiments, there are available criteria to select colors for the configuration that highly accurately defines specific colors. While the printer 40 can use four colors of ink according to the above-mentioned embodiments, some models of recent printers can use more colors of ink. For example, there is a model that can use a total of six colors of ink including lclm inks in addition to the CMYK inks. In such model, the LUT defines the correspondence between sRGB data and CMYKlclm data. FIG. 44 exemplifies the correspondence between sRGB data and CMYKlclm data in the conventional LUT 150*b* for such model. FIG. 44 shows the gray axis that uses the same value for all color components in the sRGB data.

When a printer supports six ink colors, the LUT 150*b* for such printer provides a dark ink (CM) and a light ink (lclm) for the magenta and cyan inks as shown in FIG. 44. It is possible to accurately define colors for the sRGB data by combining the dark and light inks. However, the Y ink supports all gradation values of the sRGB data by ejecting a single color, making it difficult to finely define colors compared to the magenta and cyan inks.

If the high accuracy LUT 150*d* according to the present invention is configured to define colors in 16-bit gradations, the colors can be accurately defined without degrading the accuracy relative to the other colors. When the rebuild LUT 14*c* is to be created, 8-bit data is multiplied by 256 to provide 16-bit data for the high accuracy LUT 150*d* according to the present invention and the LUT 15*b*1. It just needs to perform a process such as overwriting some reference points in the LUT after being multiplied by 256 with data for the Y ink defined in the LUT 150*d*.

While the LUT 150*c* or the like highly accurately defines specific colors, the use of such LUT can surely improve the image quality for the entire image as a result the high accuracy color conversion. The CMYK ink or the lclm ink is contained in any of the gray area, an area including the flesh color and its peripheral colors, an area including the blue color and its peripheral colors, and an area including the red color and its peripheral colors. In consideration for this, it is a good practice to define colors of the CMYK ink or the Y ink with more gradations than 256 gradations. This technique improves the color conversion accuracy for a color component defined with more gradations. It is possible to use the gray or the other colors including this color component to faithfully express colors based on the original image data.

(15) Eighth Embodiment

The above-mentioned embodiments use a linear interpolation so that the rebuild section 21*b*1 can combine the LUT 14*a* with the LUT 14*b* and the like, or the interpolation section 21*b*2 can reference the rebuild LUT 14*c* to perform the color conversion. When a nonlinear relationship is maintained between gradation values of colors defined for a plurality of reference points that are referenced during the interpolation, the use of a spline interpolation better improves the interpolation accuracy. Accordingly, it may be preferable to perform a spline interpolation for the interpolation in the rebuild section 21*b* or the interpolation section 21*b*2.

Figure 45:
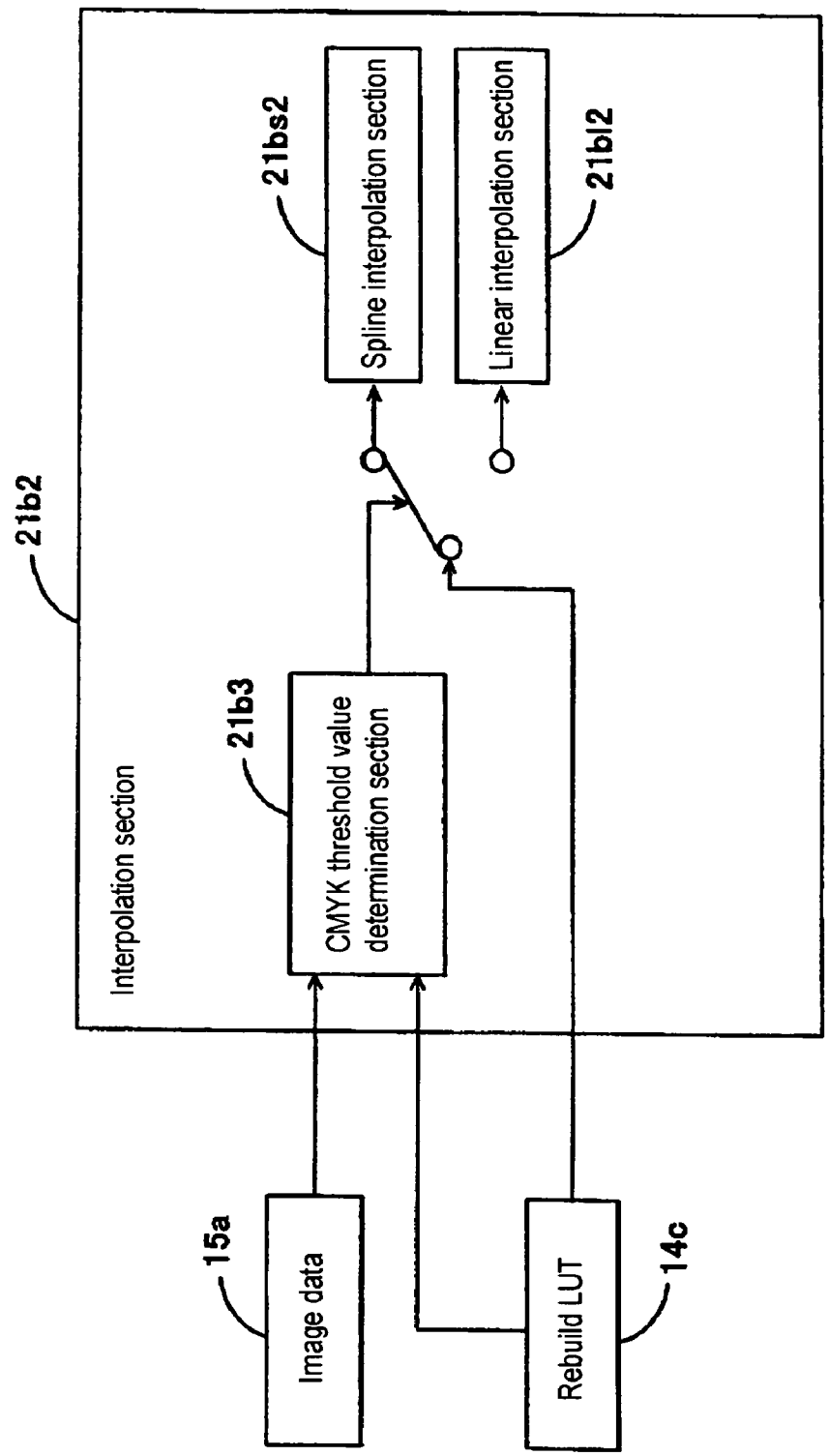
FIG. 45 is a block diagram showing a configuration for changing interpolation techniques.

While the spline interpolation ensures more accuracy improvement than the linear interpolation in many cases, the spline interpolation consumes more time than the linear interpolation. It is possible to adopt a configuration that appropriately selects an optimal interpolation technique by balancing an effect of accuracy improvement and an operation speed. FIG. 45 is a block diagram showing a configuration that selects interpolation techniques according to colors for reference points referenced by the interpolation section 21*b*2 during interpolation. The embodiment is available according to the hardware configuration and the software configuration almost equal to those used for the above-mentioned embodiments with a different configuration for the color conversion module 21*b*.

The following describes the same configuration as for the above-mentioned embodiments using the same reference numerals. The interpolation section 21b2 of the color conversion module 21b according to the embodiment comprises a spline interpolation section 21bs2 capable of spline interpolation; a linear interpolation section 21b12 capable of linear interpolation; and a CMYK threshold value determination section capable of determining CMYK data based on a threshold value for reference points referenced during interpolation of image data. The CMYK threshold value determination section 21b obtains the image data 15a, references rebuild LUT 14c when converting RGB data into CMYK data, references CMYK data for reference points used for the interpolation, and determines an ink ejection amount for each CMYK color component.

The CMYK threshold value determination section 21b determines whether or not there is available an ink whose ejection amount is 50% or more of the maximum ejection amount. If there is available an ink whose ejection amount is 50% or more of the maximum ejection amount, the CMYK threshold value determination section 21b is configured so that the spline interpolation section 21bs2 performs an interpolation for the corresponding RGB data to convert it into CMYK data. If there is not available an ink whose ejection amount is 50% or more of the maximum ejection amount, the CMYK threshold value determination section 21b is configured so that the linear interpolation section 21b12 performs an interpolation for the corresponding RGB data to convert it into CMYK data. Of course, both interpolations reference the rebuild LUT 14c.

This configuration performs the color conversion using a spline interpolation for pixels with a somewhat large amount of ink ejection, i.e., pixels corresponding to a low brightness color or using a linear interpolation for pixels corresponding to a high brightness color. In many cases, low brightness colors show nonlinear relationship between the ink amount and the brightness. The spline interpolation can provide high accuracy color conversion. On the other hand, the linear interpolation can be used to fast convert highlighted colors.

Of course, the above-mentioned threshold value is an example. Each CMYK color is not checked against the threshold value. For example, the embodiment can be also configured to perform a spline interpolation based on a criterion of X % or more (X<100) of a duty limit in consideration for a plurality of colors or a combination of all colors. Not only the interpolation section 21b2, but also the rebuild section 21b1 can be used to select interpolation techniques. For example, a spline interpolation can be used to generate reference points for the LUT 15b1. A linear interpolation can be used to generate reference points for the LUT 15c1. When the reference point density of the LUT 15d1 falls short of the reference point density of the rebuild LUT 14c, a linear interpolation can be used to generate reference points for the LUT 15d1. In such configuration, the LUTs 15c1 and 15d1 provide 16-bit gradations or a high density of reference points. Accordingly, a linear interpolation is performed on the assumption that the sufficient color conversion accuracy is ensured. For the other reference points, a spline interpolation is performed to ensure the accuracy.

(16) Other Embodiments

The above-mentioned embodiments prepare the LUTs 15b1 through 15n1 in advance. The print property screen in FIG. 25 can be used to select which LUT should be used as an option. Obviously, these LUTs are an example. It may be also preferable to prepare an LUT that highly accurately defines the other colors or to predefine some of the LUTs 15b1 through 15n1 to be selectable. For example, it may be preferable to predetermine any of the LUT defining colors in 16-bit gradations, the LUT having high density reference points, and the LUT having both characteristics, instead of selecting any of these. In this case, the print property can be configured to just specify whether or not to enable the high accuracy.

The LUT defining colors in 16-bit gradations and the LUT having high density reference points provide remarkable effects at the highlighted portion and the shadow portion, respectively. In addition, the LUT defining colors in 16-bit gradations also improves the color conversion accuracy at the shadow portion. The LUT having high density reference points also improves the color conversion accuracy at the highlighted portion. Accordingly, the display contents of the print property are not limited to the category of the highlight, the shadow, and the like as shown in FIG. 25. Instead, it may be preferable to allow not only selection of the high accuracy as mentioned above, but also selection of a 16-bit LUT, a high density LUT, and the like more explicitly. Of course, it may be preferable to be able to select not only four color areas, but also more or fewer areas. Reference points to be defined in the LUT are not limited to those described above. It is possible to change the number of reference points, use unevenly spaced lattice points in the color space as reference points, etc.

Further, it is possible to select a high accuracy LUT not only based on a user's selection, but also automatically in accordance with the contents of image data. The high accuracy LUT defines colors for a specific area in the color space. The effect of applying the present invention improves in proportion to an increase in the number of pixels belonging to the specific area out of all pixels. When the image data acquisition module 21a or the color conversion module 21b obtains image data, a process is performed to compute the number of pixels for a color belonging to the same area as for the color defined in a specific LUT, and then to compute a ratio of these pixels to all the pixels. When the ratio exceeds a specified threshold value, the above-mentioned specific LUT can be used to create a rebuild LUT. In this manner, it is possible to reliably and automatically ensure the good quality of an image targeted for the color conversion.

When the above-mentioned threshold value is determined, it may be obviously preferable to compute a histogram corresponding to each color component for pixels in the image data and select a high accuracy LUT in accordance with a distribution state in the histogram corresponding to each color component. In this case, it is possible to adopt a configuration to select an LUT highly accurately defining the gray when the histogram for the RGB data shows no unevenness in gradation values. Alternatively, it is possible to adopt a configuration to select an LUT highly accurately defining the blue area or the red area when the B or R histogram shows many integration values.

INDUSTRIAL APPLICABILITY

As mentioned above, embodiments of the present invention can provide a medium recording a color conversion program, a medium recording color conversion table data, a color conversion apparatus, a color conversion method, a color conversion program, a color conversion table, a medium recording a color conversion table creation program, a medium recording a interpolation program, a color conversion table creation program, an interpolation program, and a color conversion table creation apparatus capable of increasing color matching capability and the number of gradations and suppressing the necessary storage capacity at the same time and performing color conversion at a high precision.

The present invention can highly accurately perform a color conversion for a monochrome image containing a low brightness area.

The present invention can highly accurately perform a color conversion for an image containing a flesh color or its peripheral colors.

The present invention can highly accurately perform a color conversion for an image containing a blue color or its peripheral colors.

The present invention can easily create a color conversion table that covers colors contained in a specific image.

The present invention can easily extract reference color image data.

The present invention can easily extract reference color image data in a prescribed area.

The present invention is capable of color conversion in accordance with a requested accuracy.

The present invention can faithfully reproduce fine color variations in a high brightness area.

The present invention can control fine brightness gradations.

The present invention can improve color conversion accuracy of a general-purpose image device.

The present invention can allow a second image device to accurately reflect an effect of high accuracy color conversion according to the present invention.

Further, embodiments of the present invention can provide a medium recording a color conversion table creation program, a color conversion table creation program, a color conversion table creation apparatus, a color conversion table creation method, a partial color conversion table, a color conversion apparatus, a color conversion method, a printing apparatus, and a printing method capable of suppressing a storage capacity and improving conversion accuracy at a time, creating color conversion table, and performing color conversion and printing.

The present invention can create a color conversion table that can highly accurately convert a specific color defined in a specified original table.

The present invention can create a color conversion table that can highly accurately convert a specific color defined in a specified original table.

The present invention can create an original table with a sufficiently increased reference point density.

The present invention can generate a color conversion table capable of high accuracy color conversion for an ink that uses neither dark nor light ink.

The present invention can generate a color conversion table appropriately usable for printout on many printing apparatuses.

The present invention can generate a color conversion table capable of high accuracy color conversion for a color that is particularly nonlinear in the relationship between ink ejection amount and brightness.

The present invention can generate a color conversion table capable of accurately expressing fine changes in high brightness colors.

The present invention can generate a color conversion table capable of accurately expressing fine changes in low brightness colors.

The present invention can generate a color conversion table capable of accurately expressing fine changes in low saturation colors.

The present invention can generate a color conversion table capable of accurately expressing fine changes in a color that is remarkably sensitive to an effect of highly accurately defining the color correspondence.

The present invention can satisfy various needs of users.

The present invention can allow a user to select a color conversion table from various choices in accordance with the required color conversion accuracy.

The present invention can automatically perform a high accuracy color conversion for a specific color.

Moreover, embodiments of the present invention can provide a medium recording an interpolation program, an interpolation program, an interpolation apparatus, an interpolation method, a printing apparatus, and a printing method capable of performing high accuracy color conversion for an entire image without decreasing a computation speed.

The present invention can easily select interpolation techniques in accordance with high or low brightness of colors.

Furthermore, embodiments of the present invention can provide a medium recording an interpolation program, an interpolation program, an interpolation apparatus, an interpolation method, a printing apparatus, and a printing method capable of performing high accuracy color conversion for an entire image without decreasing a computation speed.

The invention claimed is:

1. A computer-readable medium storing a color conversion program which allows a computer to perform a color conversion function for a purpose of converting first color image data used for a first image device into second color image data used for a second image device in such a manner as to previously store reference color image data as a color conversion table defining correspondence between both color image data in a specified storage area and to perform color conversion by referencing the color conversion table, wherein the color conversion function exclusively uses a specified monochrome area including a gray axis in a color space for making correspondence between the first color image data and the second color image data and performs color conversion by referencing a color conversion table which has increased gradation of data after conversion with respect to a plurality of reference points within the area; and an interval between the reference points in the specified monochrome area is narrowed as the reference points approach both ends of the gray axis.

2. The computer-readable medium storing a color conversion program according to claim 1, wherein there are several to over ten pieces of the reference color image data around the gray axis in the specified color space.

3. The computer-readable medium storing a color conversion program according to claim 1, wherein the reference color image data distributes from the gray axis in a specified color space a within the specified gradation value.

4. The computer-readable medium storing a color conversion program according to claim 1, wherein the first color image data and the second color image data contain gradation value data for color components either or both the first color image data and the second color image data have a larger gradation range than 256 gradations.

5. The computer-readable medium storing a color conversion program according to claim 1, wherein the second image device is a printing apparatus and the second color image data defines an ink ejection amount of the printing apparatus.

6. A computer-readable medium storing a color conversion program which allows a computer to perform a color conversion function of referencing a color conversion table comprising a specified total information amount to convert first color image data used for a first image device into second color image data used for a second image device, wherein the color conversion table has gradation data after conversion with respect to a plurality of reference points which define correspondence between the first color image data and the second color image data;

the color conversion function distributes the reference color image data over a specified monochrome area including a gray axis in a specified color space and performs color conversion by referencing a color conversion table which has increased gradation of data after conversion with respect to a plurality of reference points within a limit of the specified total information amount; and an interval between the reference points in the specified monochrome area is narrowed as the reference points approach both ends of the gray axis.

7. A computer-readable medium storing color conversion table data which defines correspondence between first color image data used for a first image device and second color image data used for a second image device and is referenced when the first color image data is converted into the second color image data, wherein a color space contains a specified monochrome area including a gray axis for making correspondence between the first color image data and the second color image data and gradation of data after conversion with respect to a plurality of reference points is increased within the specified monochrome area; and an interval between the reference points in the specified monochrome area is narrowed as the reference points approach both ends of the gray axis.

8. A computer-readable medium storing color conversion table data which is referenced during conversion from first color image data used for a first image device into second color image data used for a second image device, wherein the color conversion table data has gradation data after conversion with respect to a plurality of reference points which define correspondence between the first color image data and the second color image data;

the color conversion table data has a specified total information amount;

the reference color image data is distributed over a specified monochrome area including a gray axis in a specified color space to increase gradation of data after conversion with respect to a plurality of reference points within a limit of the specified total information amount; and an interval between the reference points in the specified monochrome area is narrowed as the reference points approach both ends of the gray axis.

9. A color conversion apparatus for a purpose of converting first color image data used for a first image device into second color image data used for a second image device in such a manner as to previously store reference color image data as a color conversion table defining correspondence between both color image data in a specified storage area and to perform color conversion by referencing the color conversion table, wherein the apparatus exclusively uses a specified monochrome area including a gray axis in a color space for making correspondence between the first color image data and the second color image data and performs color conversion by referencing a color conversion table which has increased gradation of data after conversion with respect to a plurality of reference points within the specified monochrome area; and an interval between the reference points in the specified monochrome area is narrowed as the reference points approach both ends of the gray axis.

10. A color conversion apparatus which references a color conversion table comprising a specified total information amount to convert first color image data used for a first image device into second color image data used for a second image device, wherein the color conversion table has gradation data after conversion with respect to a plurality of reference points which define correspondence between the first color image data and the second color image data the apparatus distributes the reference color image data over a specified monochrome area including a gray axis in a specified color space and performs color conversion by referencing a color conversion table which has increased gradation of data after conversion with respect to a plurality of reference points within a limit of the specified total information amount; and an interval between the reference points in the specified monochrome area is narrowed as the reference points approach both ends of the gray axis.

11. A color conversion method for a purpose of converting first color image data used for a first image device into second color image data used for a second image device in such a manner as to previously store reference color image data as a color conversion table defining correspondence between both color image data in a specified storage area and to perform color conversion by referencing the color conversion table wherein, the method exclusively uses a specified monochrome area including a gray axis in a color space for making correspondence between the first color image data and the second color image data and performs color conversion by referencing a color conversion table which has increased gradation of data after conversion with respect to a plurality of reference points within the specified monochrome area; and an interval between the reference points in the specified monochrome area is narrowed as the reference points approach both ends of the gray axis.

12. A color conversion method which references a color conversion table comprising a specified total information amount to convert first color image data used for a first image device into second color image data used for a second image device, wherein the color conversion table has gradation data after conversion with respect to a plurality of reference points which define correspondence between the first color image data and the second color image data;

the method distributes the reference color image data over a specified monochrome area including a gray axis in a specified color space and performs color conversion by referencing a color conversion table which has increased gradation of data after conversion with respect to a plurality of reference points within a limit of the specified total information amount; and an interval between the reference points in the specified monochrome area is narrowed as the reference points approach both ends of the gray axis.

13. A color conversion apparatus to enter first color image data used for a first image device and to convert the first color image data into second color image data used for a second image device, comprising:

a color conversion unit for using a first original table which defines correspondence between the first color image data and the second color image data with respect to a plurality of first reference points, using a second original table which defines correspondence between the first color image data and the second color image data with respect to a plurality of second reference points in a specified monochrome area including a gray axis and improves color accuracy, referencing a color conversion table generated by combining the first original table and the second original table and interpolating information missing from a plurality of reference points of the conversion table, and converting the first color image data into the second color image data; and an interval between the second reference points in the specified monochrome area is narrowed as the second reference points approach both ends of the gray axis.

14. A color conversion method of entering first color image data used for a first image device and converting the first color image data into second color image data used for a second image device, comprising:

using a first original table which defines correspondence between the first color image data and the second color image data with respect to a plurality of first reference points, using a second original table which defines correspondence between the first color image data and the second color image data with respect to a plurality of second reference points in a specified monochrome area including a gray axis and improves color accuracy, referencing a color conversion table generated by combining the first original table and the second original table and interpolating information missing from a plurality of reference points of the conversion table, and converting the first color image data into the second color image data; and an interval between the second reference points in the specified monochrome area is narrowed as the second reference points approach both ends of the gray axis.

* * * * *